US012732967B2

(12) United States Patent
Cai et al.

(10) Patent No.: US 12,732,967 B2
(45) Date of Patent: Sep. 8, 2026

(54) COMMUNICATION METHOD, APPARATUS, AND SYSTEM FOR SENDING DATA IN SIDELINK DISCONTINUOUS RECEPTION-ACTIVE TIME OF SECOND TERMINAL

(71) Applicant: Huawei Technologies Co., Ltd., Shenzhen (CN)

(72) Inventors: Yu Cai, Shenzhen (CN); Haibo Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 537 days.

(21) Appl. No.: 18/246,774

(22) PCT Filed: Sep. 14, 2021

(86) PCT No.: PCT/CN2021/118339
§ 371 (c)(1),
(2) Date: Mar. 27, 2023

(87) PCT Pub. No.: WO2022/062973
PCT Pub. Date: Mar. 31, 2022

(65) Prior Publication Data

US 2023/0371005 A1 Nov. 16, 2023

(30) Foreign Application Priority Data

Sep. 28, 2020 (CN) ......................... 202011042899.5
Oct. 16, 2020 (CN) ......................... 202011116071.X

(51) Int. Cl.
*H04W 72/02* (2009.01)
*H04W 76/28* (2018.01)

(52) U.S. Cl.
CPC .......... *H04W 72/02* (2013.01); *H04W 76/28* (2018.02)

(58) Field of Classification Search
CPC ..... H04W 72/02; H04W 76/28; H04W 76/14; H04W 72/25; H04W 76/23; Y02D 30/70
See application file for complete search history.

(56) References Cited

U.S. PATENT DOCUMENTS

2019/0306835 A1 10/2019 Hoang et al.
2020/0275474 A1* 8/2020 Chen ..................... H04L 1/1607
2021/0037468 A1* 2/2021 Huang ................ H04W 72/044

FOREIGN PATENT DOCUMENTS

CN 111148193 A 5/2020
CN 111480391 A 7/2020
(Continued)

OTHER PUBLICATIONS

OPPO: "Power saving mechanisms for NR SL", 3GPP Draft; R1-2006009. 3rd Generation Partnership Project (3GPP), Mobile Competence Centre; 650, Route Des Lucioles; F-06921 Sophia-Antipolis Cedex; France, vol. RAN WG1, No. e-Meeting; Aug. 17, 2020-Aug. 28, 2020 Aug. 7, 2020 (Aug. 7, 2020) , XP051915125, total 5 pages.

(Continued)

*Primary Examiner* — Ayanah S George
(74) *Attorney, Agent, or Firm* — Slater Matsil, LLP

(57) ABSTRACT

A first terminal determines one or more sidelink resources. The one or more sidelink resources include at least a sidelink resource located in sidelink discontinuous reception-active time of a second terminal. The first terminal sends data to the second terminal on a first sidelink resource in the one or more sidelink resources. The first sidelink resource is located in the sidelink discontinuous reception-active time of the second terminal.

20 Claims, 10 Drawing Sheets

(56) References Cited

FOREIGN PATENT DOCUMENTS

| | | | |
|---|---|---|---|
| JP | 2019525615 | A | 9/2019 |
| WO | 2020035142 | A1 | 2/2020 |
| WO | 2020173536 | A1 | 9/2020 |

OTHER PUBLICATIONS

3GPP TS 38.331 V16.1.0 (Jul. 2020), "3rd Generation Partnership Project; Technical Specification Group Radio Access Network; NR; Radio Resource Control (RRC) protocol specification (Release 16)", Jul. 2020, total 906 pages.

3GPP TSG RAN WG1#102-e, R1-2005839, 3GPP, "Sidelink resource allocation for Power saving", Lenovo, Motorola Mobility, Aug. 7, 2020, total 9 pages.

Huawei et al: "Discussion on remaining MAC open issues for 5G V2X with NR SL", 3GPP Draft; R2-2005492, 3rd Generation Partnership Project (3GPP), Mobile Competence Centre; 650, Route Des Lucioles; F-06921 Sophia-Antipolis Cedex; France, vol. RAN WG2, No. electronic; Jun. 1, 2020-Jun. 12, 2020 May 22, 2020 (May 22, 2020), XP052358505, total 44 pages.

3GPP TS 36.331 V16.1.1 (Jul. 2020), "3rd Generation Partnership Project; Technical Specification Group Radio Access Network; Evolved Universal Terrestrial Radio Access (E-UTRA); Radio Resource Control (RRC); Protocol specification (Release 16)", Jul. 2020, total 1078 pages.

3GPP TSG RAN WG1#102-e, R1-2005403, 3GPP, "Resource allocation for sidelink power saving", vivo, Aug. 17-28, 2020, total 8 pages.

3GPP TSG RAN WG2#109bis-e, R2-2003524, 3GPP, "Remaining V2X Mac Issues", LG Electronics Inc.(Rapporteur), Apr. 20-30, 2020, total 15 pages.

* cited by examiner

COMMUNICATION METHOD, APPARATUS, AND SYSTEM FOR SENDING DATA IN SIDELINK DISCONTINUOUS RECEPTION-ACTIVE TIME OF SECOND TERMINAL

CROSS-REFERENCE TO RELATED APPLICATIONS

This application is a National Stage of International Application No. PCT/CN2021/118339, filed on Sep. 14, 2021, which claims priority to Chinese Patent Application No. 202011116071.X, filed on Oct. 16, 2020 and Chinese Patent Application No. 202011042899.5, filed on Sep. 28, 2020. All of the aforementioned patent applications are hereby incorporated by reference in their entireties.

TECHNICAL FIELD

Embodiments of this application relate to the field of communication technologies, and in particular, to a communication method, an apparatus, and a system.

BACKGROUND

With the evolution of communication technologies, the Internet of everything is accelerating. During Release 14 (Release, Rel-14) and Release 15, the 3rd generation partnership project (3rd Generation Partnership Project, 3GPP) introduces support to vehicle-to-vehicle (vehicle-to-vehicle, V2V) and vehicle-to-everything (vehicle-to-everything, V2X) services in long term evolution (Long Term Evolution, LTE), to extend the 3GPP platform to the automobile industry. In a sensing mechanism proposed in Rel-14 V2X, a terminal senses spectrum usage, and uses the spectrum usage as a basis for selecting a sidelink resource when the terminal subsequently transmits data on sidelink resources.

A sender terminal may obtain one or more sidelink resources by sensing sidelink resources. Then, the sender terminal may determine, from the one or more sidelink resources, a sidelink resource for carrying data when the data is sent to a receiver terminal. However, when selecting the sidelink resource, the sender terminal mostly considers a transmission requirement of the sender terminal. Although the sender terminal can successfully send the data, the receiver terminal may fail to receive the data due to various factors. This inevitably wastes power consumption of the sender terminal.

SUMMARY

Embodiments of this application provide a communication method, an apparatus, and a system. The method is used to resolve a problem of how to avoid a data packet transmission failure and avoid a waste of power consumption of a sender terminal.

To resolve the foregoing technical problem, embodiments of this application provide the following technical solutions.

According to a first aspect, an embodiment of this application provides a communication method. The method is applied to a first terminal. The method includes: The first terminal determines one or more sidelink resources. The one or more sidelink resources include at least a sidelink resource located in sidelink discontinuous reception-active time of a second terminal. The first terminal sends data to the second terminal on a first sidelink resource in the one or more sidelink resources. The first sidelink resource is located in the sidelink discontinuous reception-active time.

This embodiment of this application provides the communication method. In the method, a first terminal first determines one or more sidelink resources. Then, the first terminal sends data to a second terminal on a first sidelink resource in the one or more sidelink resources. The first sidelink resource is located in sidelink discontinuous reception-active time of the second terminal, and the second terminal is in an activated state in the sidelink discontinuous reception-active time of the second terminal. Therefore, it can be ensured that when the first terminal sends the data on the first sidelink resource, the second terminal is in a state in which the data can be received. This not only can avoid a data transmission failure, but also can avoid wasting power consumption caused when the first terminal sends the data.

In a possible implementation of this application, a quantity of sidelink resources, located in a first time period, in the one or more sidelink resources is greater than or equal to a first threshold. A start moment of the first time period is a start moment corresponding to a candidate resource set, or a start moment of the first time period is a start moment of the sidelink discontinuous reception-active time. An end moment of the first time period is end time of the sidelink discontinuous reception-active time. Therefore, it can be ensured that a specific quantity of sidelink resources are available in the sidelink discontinuous reception-active time for the first terminal to select a resource used to transmit the data.

In a possible implementation of this application, the one or more sidelink resources are sidelink resources determined from the candidate resource set. The start moment corresponding to the candidate resource set is later than or equal to start time of the sidelink discontinuous reception-active time. Because the start moment corresponding to the candidate resource set is later than or equal to the start time of the sidelink discontinuous reception-active time, it can be ensured that a sidelink resource in the candidate resource set is located after the start time of the sidelink discontinuous reception-active time. In addition, the one or more sidelink resources are sidelink resources determined from the candidate resource set, so that it can be ensured that the one or more sidelink resources determined by the first terminal include a resource located in the sidelink discontinuous reception-active time.

In a possible implementation of this application, an end moment corresponding to the candidate resource set is later than or equal to end time of the sidelink discontinuous reception-active time. Therefore, it can be ensured that the one or more sidelink resources determined by the first terminal include a resource located in the sidelink discontinuous reception-active time.

In a possible implementation of this application, the one or more sidelink resources are sidelink resources determined from the candidate resource set. An end moment corresponding to the candidate resource set is earlier than or equal to retransmission end time of the data. Because the end moment corresponding to the candidate resource set is earlier than or equal to the retransmission end time of the data, it can be ensured that the first terminal selects, from the candidate resource set, a resource used to retransmit the data.

In a possible implementation of this application, that the first terminal determines one or more sidelink resources includes: A physical layer of the first terminal determines the one or more sidelink resources from a candidate sidelink resource. The physical layer reports the one or more sidelink resources to a medium access control entity of the first terminal. The method provided in this embodiment of this application may further include: The medium access control entity selects, from the one or more sidelink resources, the first sidelink resource located in the sidelink discontinuous reception-active time of the second terminal.

In a possible implementation of this application, the method provided in this embodiment of this application further includes: The medium access control entity sends first information to the physical layer. The first information includes information used to indicate the end time of the sidelink discontinuous reception-active time or information used to indicate remaining time of the sidelink discontinuous reception-active time. That a physical layer of the first terminal determines the one or more sidelink resources from a candidate sidelink resource includes: The physical layer determines the one or more sidelink resources from the candidate sidelink resource based on the first information. In this way, the physical layer of the first terminal refers to the first information when reporting the one or more sidelink resources to the medium access control entity of the first terminal, so that the reported one or more sidelink resources include the sidelink resource located in the sidelink discontinuous reception-active time.

In a possible implementation of this application, that the medium access control entity sends first information to the physical layer includes: When the remaining time of the sidelink discontinuous reception-active time is less than or equal to a remaining packet delay budget, the medium access control entity sends the first information to the physical layer.

In a possible implementation of this application, the medium access control entity does not send the first information to the physical layer. In this way, the physical layer may determine the candidate sidelink resource based on the candidate resource set, and then determine the one or more sidelink resources from the candidate sidelink resource. In this case, because the physical layer does not refer to the first information when reporting the one or more sidelink resources, the one or more sidelink resources may include the resource located in the sidelink discontinuous reception-active time, or may not include the resource located in the sidelink discontinuous reception-active time. The medium access control entity determines, based on the sidelink discontinuous reception-active time of the second terminal, whether the resource located in the sidelink discontinuous reception-active time is included.

In a possible implementation of this application, when the remaining time of the sidelink discontinuous reception-active time is greater than or equal to the remaining packet delay budget, the medium access control entity does not send the first information to the physical layer.

In a possible implementation of this application, the first information further includes information used to indicate the start time of the sidelink discontinuous reception-active time. This helps the physical layer determine the start time of the sidelink discontinuous reception-active time, so as to ensure, as far as possible, that the sidelink resource reported to the medium access control entity is in the sidelink discontinuous reception-active time. For example, the one or more sidelink resources include a resource whose distance from the start time of the sidelink discontinuous reception-active time is less than a first time threshold.

In a possible implementation of this application, when a time unit 1 is earlier than the start time of the sidelink discontinuous reception-active time, the medium access control entity of the first terminal sends, to the physical layer of the first terminal, the information used to indicate the start time of the sidelink discontinuous reception-active time. The time unit 1 is a moment at which the physical layer of the first terminal determines to sense sidelink resources.

In a possible implementation of this application, the method provided in this embodiment of this application further includes: The medium access control entity of the first terminal does not send, to the physical layer of the first terminal, the information used to indicate the start time of the sidelink discontinuous reception-active time.

In a possible implementation of this application, when a time unit 1 is located in the start time of the sidelink discontinuous reception-active time, the medium access control entity of the first terminal does not send, to the physical layer of the first terminal, the information used to indicate the start time of the sidelink discontinuous reception-active time. The time unit 1 is a moment at which the physical layer of the first terminal determines to sense sidelink resources.

In a possible implementation of this application, the method provided in this application may further include: The first terminal determines the retransmission end time of the data or remaining retransmission time of the data. The first terminal determines, based on the retransmission end time or the remaining retransmission time, the end moment corresponding to the candidate resource set. The end moment corresponding to the candidate resource set is earlier than or equal to the remaining retransmission time.

In a possible implementation of this application, the method provided in this application may further include: The medium access control entity of the first terminal sends second information to the physical layer. The second information is used to indicate the retransmission end time of the data or used to indicate the remaining retransmission time of the data. That the first terminal determines the retransmission end time of the data or remaining retransmission time of the data includes: The physical layer of the first terminal determines the retransmission end time or the remaining retransmission time based on the second information.

In a possible implementation of this application, the second information is the retransmission end time or the remaining retransmission time. A process in which the physical layer calculates the retransmission end time or the remaining retransmission time is omitted.

In a possible implementation of this application, the second information is at least one of a quantity of retransmission times of the data, duration of an RTT timer, and duration of a retransmission timer. In this solution, the physical layer calculates the retransmission end time or the remaining retransmission time.

In a possible implementation of this application, the retransmission end time is equal to the end time of the sidelink discontinuous reception-active time+(the duration of the RTT timer+the duration of the retransmission timer)*the quantity of retransmission times. Alternatively, the retransmission end time is equal to the end time of the sidelink discontinuous reception-active time+the duration of the retransmission timer+the quantity of retransmission times.

In a possible implementation of this application, if the remaining packet delay budget is less than a first value, or the remaining packet delay budget is less than the remaining retransmission time, the medium access control entity provides a minimum value in the remaining packet delay budget and the retransmission end time for the physical layer.

In a possible implementation of this application, the method provided in this embodiment of this application further includes: if the quantity of sidelink resources located in the first time period is less than or equal to a first threshold, updating a threshold indicating whether the candidate sidelink resource is excluded. The first terminal determines the one or more sidelink resources from the candidate sidelink resource based on an updated threshold. This can ensure that the quantity of sidelink resources located in the first time period is greater than or equal to the first threshold.

In a possible implementation of this application, a quantity of sidelink resources, located in a second time period, in the one or more sidelink resources is greater than or equal to a second threshold. The second time period is determined based on an end moment of the sidelink discontinuous reception-active time and the end moment corresponding to the candidate resource set.

In a possible implementation of this application, the first sidelink resource is used to initially transmit the data. The method provided in this embodiment of this application further includes: The first terminal determines a second sidelink resource used to retransmit the data. The second sidelink resource is located in the sidelink discontinuous reception-active time or a third time period. The third time period is determined based on the first sidelink resource. This can ensure that when to-be-transmitted data fails to be transmitted, the first terminal can retransmit the data by using the second sidelink resource, thereby improving a data transmission success rate.

In a possible implementation of this application, a time interval between the first sidelink resource and the second sidelink resource is greater than or equal to a minimum time interval.

In a possible implementation of this application, when a resource pool in which the first sidelink resource and the second sidelink resource are located is configured with a physical sidelink feedback control channel resource, a time interval between the first sidelink resource and the second sidelink resource is greater than or equal to a minimum time interval.

In a possible implementation of this application, when there is no sidelink resource used to transmit the data in the sidelink discontinuous reception-active time, the first terminal triggers a sidelink resource selection/reselection process.

In a possible implementation of this application, when there is no sidelink resource used to transmit the data and no sidelink resource for data retransmission in the sidelink discontinuous reception-active time, the first terminal triggers a sidelink resource selection/reselection process.

In a possible implementation of this application, when there is no sidelink resource for data retransmission in the sidelink discontinuous reception-active time, the first terminal triggers a sidelink resource selection/reselection process.

In a possible implementation of this application, if the sidelink resource used to initially transmit the data is not located in the sidelink discontinuous reception-active time, the first sidelink resource is a sidelink resource used to retransmit the data.

In a possible implementation of this application, the method provided in this embodiment of this application further includes: If the sidelink resource used to initially transmit the data is not located in the sidelink discontinuous reception-active time, the first terminal stops sending the data on the sidelink resource used to initially transmit the data and the second sidelink resource used to retransmit the data.

In a possible implementation of this application, the method provided in this embodiment of this application further includes: The first terminal determines the second terminal.

In a possible implementation of this application, that the first terminal determines the second terminal includes: The first terminal determines the second terminal from a plurality of terminals that need to receive the data sent by the first terminal.

In a possible implementation, the second terminal is a terminal with a highest priority in the plurality of terminals. Alternatively, a priority of the data sent by the first terminal to the second terminal is higher than that of data sent by the first terminal to a terminal in the plurality of terminals except the second terminal.

In a possible implementation of this application, that the first terminal determines the second terminal includes: The first terminal determines the first sidelink resource from the one or more sidelink resources. The first terminal determines the second terminal based on the first sidelink resource.

In a possible implementation of this application, that the first terminal determines the second terminal based on the first sidelink resource includes: The first terminal determines a terminal whose sidelink discontinuous reception-active time includes a time domain location of the first sidelink resource as the second terminal.

According to a second aspect, an embodiment of this application provides a method. The method includes: A first terminal determines a first sidelink resource used to initially transmit data. If the first terminal determines that the first sidelink resource is not located in sidelink DRX-active time of a second terminal, the first terminal stops sending the data to the second terminal on a second sidelink resource used to retransmit the data.

In this embodiment of this application, the stopping sending the data to the second terminal on a second sidelink resource used to retransmit the data may also be understood as not using a sidelink grant, which means that the data is not sent on the second sidelink resource indicated by the sidelink grant (for example, a PSCCH and/or a PSSCH).

A first grant is an initial transmission grant. For example, a sidelink resource determined by the first grant is used to initially transmit the data. The second grant is a retransmission grant. A sidelink resource indicated by the second grant is used to retransmit the data. The second grant corresponding to the first grant is a grant used to transmit a same MAC PDU/transport block as the initial transmission grant.

In a possible implementation of this application, that the first terminal determines a first sidelink resource used to initially transmit data may include: The first terminal determines a first grant used to initially transmit the data. The first terminal determines a sidelink resource indicated by the first grant as the first sidelink resource used to initially transmit the data.

In a possible implementation of this application, the method provided in this embodiment of this application may further include: The first terminal determines the second sidelink resource.

In a possible implementation of this application, that the first terminal determines the second sidelink resource includes: The first terminal determines a second grant corresponding to the first grant. The first terminal determines a sidelink resource indicated by the second grant as the second sidelink resource.

In a possible implementation of this application, that the first terminal stops sending the data to the second terminal on a second sidelink resource used to retransmit the data includes: If the second sidelink resource is not located in the DRX-active time of the second terminal, the first terminal stops sending the data to the second terminal on the sidelink resource indicated by the second grant corresponding to the first grant.

In a possible implementation of this application, the method provided in this embodiment of this application may further include: If the first terminal determines that the second sidelink resource is located in the DRX-active time of the second terminal, the first terminal sends the data to the second terminal on the second sidelink resource used to retransmit the data.

In a possible implementation of this application, the second terminal is any one of a plurality of terminals to which data is to be transmitted, or the second terminal is a terminal with a highest priority in a plurality of terminals to which data is to be transmitted.

According to a third aspect, an embodiment of this application provides a method. The method includes: A first terminal determines a first sidelink resource used to initially transmit data. If the first terminal determines that the first sidelink resource is not located in sidelink DRX-active time of a second terminal, the first terminal sends the data to the second terminal on a second sidelink resource used to retransmit the data.

In a possible implementation of this application, that the first terminal determines a first sidelink resource used to initially transmit data may include: The first terminal determines a first grant used to initially transmit the data. The first terminal determines a sidelink resource indicated by the first grant as the first sidelink resource used to initially transmit the data.

In a possible implementation of this application, the method provided in this embodiment of this application may further include: The first terminal determines the second sidelink resource.

In a possible implementation of this application, that the first terminal determines the second sidelink resource includes: The first terminal determines a second grant corresponding to the first grant. The first terminal determines a sidelink resource indicated by the second grant as the second sidelink resource.

The first grant is an initial transmission grant. For example, the sidelink resource determined by the first grant is used to initially transmit the data. The second grant is a retransmission grant. The sidelink resource indicated by the second grant is used to retransmit the data. The second grant corresponding to the first grant is a grant used to transmit a same MAC PDU/transport block as the initial transmission grant.

In a possible implementation of this application, that the first terminal sends the data to a second terminal on a second sidelink resource used to retransmit the data includes: If the second sidelink resource is located in the DRX-active time of the second terminal, the first terminal sends the data to the second terminal on the second sidelink resource.

In a possible implementation of this application, the second terminal is any one of a plurality of terminals that need to receive the data sent by the first terminal, or the second terminal is a terminal with a highest priority in a plurality of terminals that need to receive the data sent by the first terminal.

According to a fourth aspect, an embodiment of this application provides a method. The method includes: If there is no sidelink resource used to retransmit data and/or no sidelink resource used to initially transmit the data in sidelink discontinuous reception-active time of a second terminal, a first terminal triggers a sidelink resource selection/reselection process.

It should be noted that the technical solutions described in the first aspect to the fourth aspect may be used in combination, or may be used independently. This is not limited in embodiments of this application.

According to a fifth aspect, an embodiment of this application provides a computer-readable storage medium. The computer-readable storage medium stores a computer program or instructions. When the computer program or the instructions run on a computer, the computer is enabled to perform the communication method described in the first aspect to any possible implementation of the first aspect. The computer may be a first terminal.

According to a sixth aspect, an embodiment of this application provides a computer-readable storage medium. The computer-readable storage medium stores a computer program or instructions. When the computer program or the instructions run on a computer, the computer is enabled to perform the communication method described in the second aspect to any possible implementation of the second aspect. The computer may be a first terminal.

According to a seventh aspect, an embodiment of this application provides a computer-readable storage medium. The computer-readable storage medium stores a computer program or instructions. When the computer program or the instructions run on a computer, the computer is enabled to perform the communication method described in the third aspect to any possible implementation of the third aspect. The computer may be a first terminal.

According to an eighth aspect, an embodiment of this application provides a computer-readable storage medium. The computer-readable storage medium stores a computer program or instructions. When the computer program or the instructions run on a computer, the computer is enabled to perform the communication method described in the fourth aspect to any possible implementation of the fourth aspect. The computer may be a first terminal.

According to a ninth aspect, an embodiment of this application provides a computer program product including instructions. When the instructions run on a computer, the computer is enabled to perform the communication method described in the first aspect or various possible implementations of the first aspect.

According to a tenth aspect, an embodiment of this application provides a computer program product including instructions. When the instructions run on a computer, the computer is enabled to perform the communication method described in the second aspect or various possible implementations of the second aspect.

According to an eleventh aspect, an embodiment of this application provides a computer program product including instructions. When the instructions run on a computer, the computer is enabled to perform the communication method described in the third aspect or various possible implementations of the third aspect.

According to a twelfth aspect, an embodiment of this application provides a computer program product including instructions. When the instructions run on a computer, the computer is enabled to perform the communication method described in the fourth aspect or various possible implementations of the fourth aspect.

According to a thirteenth aspect, an embodiment of this application provides a communication apparatus, configured to implement various methods in the first aspect to any possible design of the first aspect. The communication apparatus may be the foregoing first terminal, or an apparatus including the foregoing first terminal, or a component (for example, a chip) applied to the first terminal. The communication apparatus includes corresponding modules and units for implementing the foregoing methods. The modules and the units may be implemented by hardware or software, or may be implemented by hardware executing corresponding software. The hardware or the software includes one or more modules or units corresponding to the foregoing functions.

According to a fourteenth aspect, an embodiment of this application provides a communication apparatus, configured to implement various methods in the second aspect to any possible design of the second aspect. The communication apparatus may be the foregoing first terminal, or an apparatus including the foregoing first terminal, or a component (for example, a chip) applied to the first terminal. The communication apparatus includes corresponding modules and units for implementing the foregoing methods. The modules and the units may be implemented by hardware or software, or may be implemented by hardware executing corresponding software. The hardware or the software includes one or more modules or units corresponding to the foregoing functions.

According to a fifteenth aspect, an embodiment of this application provides a communication apparatus, configured to implement various methods in the third aspect to any possible design of the third aspect. The communication apparatus may be the foregoing first terminal, or an apparatus including the foregoing first terminal, or a component (for example, a chip) applied to the first terminal. The communication apparatus includes corresponding modules and units for implementing the foregoing methods. The modules and the units may be implemented by hardware or software, or may be implemented by hardware executing corresponding software. The hardware or the software includes one or more modules or units corresponding to the foregoing functions.

According to a sixteenth aspect, an embodiment of this application provides a communication apparatus, configured to implement various methods in the third aspect to any possible design of the third aspect. The communication apparatus may be the foregoing first terminal, or an apparatus including the foregoing first terminal, or a component (for example, a chip) applied to the first terminal. The communication apparatus includes corresponding modules and units for implementing the foregoing methods. The modules and the units may be implemented by hardware or software, or may be implemented by hardware executing corresponding software. The hardware or the software includes one or more modules or units corresponding to the foregoing functions.

According to a seventeenth aspect, an embodiment of this application provides a communication apparatus. The communication apparatus includes a transceiver and at least one processor. The at least one processor communicates with the transceiver. When the communication apparatus runs, the at least one processor executes computer executable instructions or program stored in the memory, so that the communication apparatus performs the method according to the first aspect or any possible design of the first aspect. For example, the communication apparatus may be a first terminal, or a chip applied to the first terminal.

According to an eighteenth aspect, an embodiment of this application provides a communication apparatus. The communication apparatus includes a transceiver and at least one processor. The at least one processor is coupled to the transceiver. When the communication apparatus runs, the at least one processor executes computer executable instructions or program stored in the memory, so that the communication apparatus performs the method according to the second aspect or any possible design of the second aspect. For example, the communication apparatus may be a first terminal, or a chip applied to the first terminal.

According to a nineteenth aspect, an embodiment of this application provides a communication apparatus. The communication apparatus includes a transceiver and at least one processor. The at least one processor is coupled to the transceiver. When the communication apparatus runs, the at least one processor executes computer executable instructions or program stored in the memory, so that the communication apparatus performs the method according to the third aspect or any possible design of the third aspect. For example, the communication apparatus may be a first terminal, or a chip applied to the first terminal.

According to a twentieth aspect, an embodiment of this application provides a communication apparatus. The communication apparatus includes a transceiver and at least one processor. The at least one processor is coupled to the transceiver. When the communication apparatus runs, the at least one processor executes computer executable instructions or program stored in the memory, so that the communication apparatus performs the method according to the fourth aspect or any possible design of the fourth aspect. For example, the communication apparatus may be a first terminal, or a chip applied to the first terminal.

In a possible implementation, the communication apparatus described in the seventeenth aspect and the eighteenth aspect may further include a memory. The memory is configured to store the computer executable instructions or program.

The memory described in any one of the seventeenth aspect to the twentieth aspect may be alternatively replaced with a storage medium. This is not limited in embodiments of this application.

In a possible implementation, the memory described in any one of the seventeenth aspect and the eighteenth aspect may be a memory inside the communication apparatus. Certainly, the memory may be alternatively located outside the communication apparatus, but the at least one processor may still execute the computer executable instructions or program stored in the memory.

According to a twenty-first aspect, an embodiment of this application provides a communication apparatus. The communication apparatus includes one or more modules, configured to implement the method in any one of the first aspect, the second aspect, the third aspect, and the fourth aspect. The one or more modules may correspond to the steps in the method in any one of the first aspect, the second aspect, the third aspect, and the fourth aspect.

According to a twenty-second aspect, an embodiment of this application provides a chip. The chip includes a processor. The processor is configured to read and execute a computer program stored in a memory to perform the method in the first aspect and any possible implementation of the first aspect.

According to a twenty-third aspect, an embodiment of this application provides a chip. The chip includes a processor. The processor is configured to read and execute a computer program stored in a memory to perform the method in the second aspect and any possible implementation of the second aspect.

According to a twenty-fourth aspect, an embodiment of this application provides a chip. The chip includes a processor. The processor is configured to read and execute a computer program stored in a memory to perform the method in the third aspect and any possible implementation of the third aspect.

According to a twenty-fifth aspect, an embodiment of this application provides a chip. The chip includes a processor. The processor is configured to read and execute a computer program stored in a memory to perform the method in the fourth aspect and any possible implementation of the fourth aspect.

Optionally, the chip may be a single chip, or a chip module including a plurality of chips.

Optionally, a chip further includes a memory. The memory is connected to the processor through a circuit or a wire.

Further, optionally, the chip system further includes a communication interface. The communication interface is configured to communicate with another module other than the chip.

According to a twenty-sixth aspect, an embodiment of this application provides a communication system. The communication system includes a first terminal and a second terminal. The first terminal is configured to perform the method in any one of the first aspect and the possible implementations of the first aspect. The second terminal is configured to receive data from the first terminal on a first sidelink resource located in sidelink discontinuous reception-active time of the second terminal.

Any apparatus, computer-readable storage medium, computer program product, chip, or communication system provided above is configured to perform a corresponding method provided above. Therefore, for beneficial effects that can be achieved by the apparatus, the computer-readable storage medium, the computer program product, the chip, or the communication system, refer to beneficial effects of a corresponding solution in the corresponding method provided above. Details are not described herein again.

DETAILED DESCRIPTION OF ILLUSTRATIVE EMBODIMENTS

Figure 1:
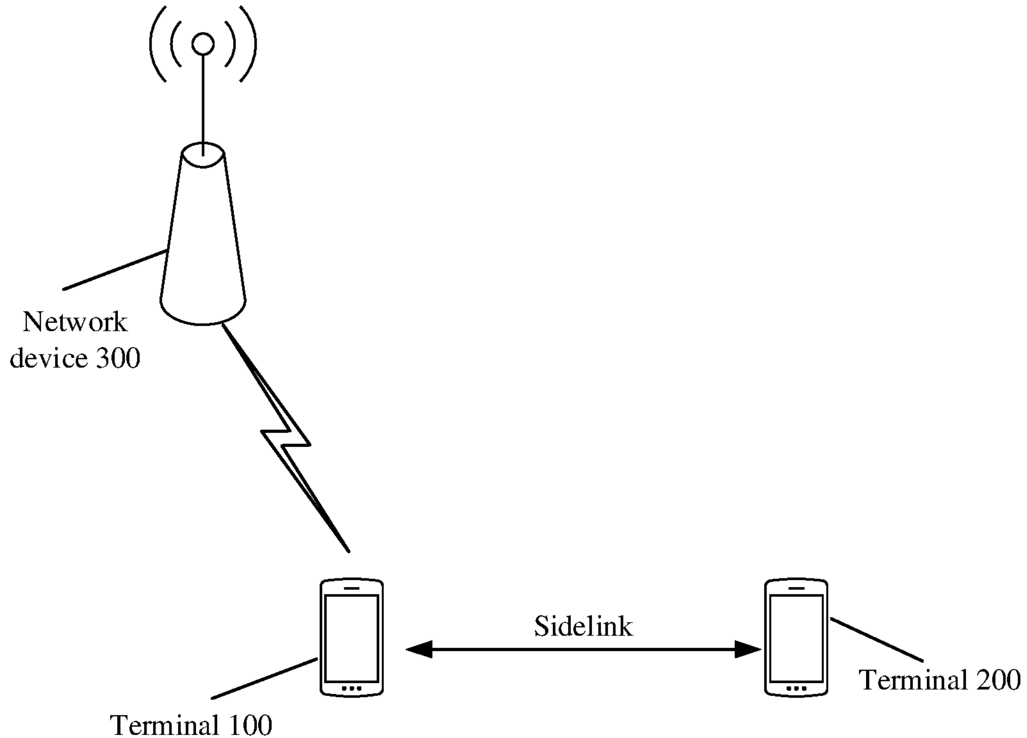
FIG. 1 is an architectural diagram of a communication system according to an embodiment of this application.

Currently, two terminals may directly perform data transmission with each other on a sidelink without relaying by a base station. For example, the two terminals are a terminal A and a terminal B. Before the terminal A sends data to the terminal B on the sidelink, the terminal A may sense sidelink resources, and then select a sidelink resource from sensed sidelink resources. Then, the terminal A sends the data to the terminal B on the selected sidelink resource through the sidelink. Currently, to reduce power consumption of the terminal B, a DRX mechanism may be configured for the terminal B. To be specific, the terminal B is in an activated state and can receive data in a time period, and is in a DRX off state in another time period. When the terminal B is in the DRX off state, the terminal B may not receive data sent by another terminal to the terminal B. Therefore, if a time range indicated by the sidelink resource selected by the terminal A is in the time period in which the terminal B is in the DRX off state, when the terminal A sends the data to the terminal B on the selected sidelink resource, the terminal B may not correctly receive the data, consequently, data sent by the terminal A to the terminal B fails to be transmitted, and power consumption caused when the terminal A sends the data is wasted.

Based on this, embodiments of this application provide a communication method. In the method, a first terminal first determines one or more sidelink resources. Then, the first terminal sends data to a second terminal on a first sidelink resource in the one or more sidelink resources. The first sidelink resource is located in discontinuous reception-active time of the second terminal, and the second terminal is in an activated state in the discontinuous reception-active time of the second terminal. Therefore, it can be ensured that when the first terminal sends the data on the first sidelink resource, the second terminal is in a state in which the data can be received. This not only can avoid a data transmission failure, but also can avoid wasting power consumption caused when the first terminal sends the data.

To clearly describe the technical solutions in embodiments of this application, terms such as “first” and “second” are used in embodiments of this application to distinguish between same items or similar items that provide basically same functions or purposes. For example, the first terminal and the second terminal are merely intended to distinguish between different terminals, and a sequence of the first terminal and the second terminal is not limited. A person skilled in the art may understand that the terms such as “first” and “second” do not limit a quantity or an execution sequence, and the terms such as “first” and “second” do not indicate a definite difference.

It should be noted that, in this application, the word “example” or “for example” is used to represent giving an example, an illustration, or a description. Any embodiment or design scheme described as “example” or “for example” in this application should not be explained as being more preferred or having more advantages than another embodiment or design scheme. Exactly, use of the word “example”, “for example”, or the like is intended to present a related concept in a specific manner.

In this application, “at least one” means one or more, and “a plurality of” means two or more. “And/or” describes an association relationship between associated objects, and represents that three relationships may exist. For example, A and/or B may represent the following cases: Only A exists, both A and B exist, and only B exists, where A and B may be singular or plural. The character “/” usually indicates an “or” relationship between associated objects. “At least one of the following items (pieces)” or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

The technical solutions of this application may be applied to various communication systems, for example, a long time evolution (long time evolution, LTE) system, an LTE frequency division duplex (frequency division duplex, FDD) system, an LTE time division duplex (time division duplex, TDD) system, and a universal mobile telecommunications system (universal mobile telecommunications system, UMTS), a worldwide interoperability for microwave access (worldwide interoperability for microwave access, WiMAX) communication system, a public land mobile network (public land mobile network, PLMN) system, a device to device (device to device, D2D) network system or a machine to machine (machine to machine, M2M) network system, and a fifth-generation mobile communication technology (the 5th generation, 5G) system.

A system architecture and a service scenario described in embodiments of this application are intended to describe the technical solutions in embodiments of this application more clearly, and do not constitute any limitation on the technical solutions provided in embodiments of this application. A person of ordinary skill in the art may know that with evolution of the network architecture and emergence of a new service scenario, the technical solutions provided in embodiments of this application are also applicable to similar technical problems.

Before embodiments of this application are described, nouns involved in embodiments of this application are first described.

(1) A sidelink (sidelink, SL) is defined for direct communication between terminals, and is a link for direct communication between the terminals without forwarding by a base station.

(2) A sidelink resource is a resource used by a terminal 1 to transmit sidelink information with a terminal 2 on a sidelink.

(3) Sidelink information is sidelink data or control information transmitted by any two terminals on a sidelink, and may also be referred to as a data packet or a V2X service.

(4) Discontinuous reception (discontinuous reception, DRX) means that a receiver of a terminal is turned on to enter an activated state (which may also be referred to as an active state) only at necessary time, so as to receive data and signaling. The receiver is turned off to enter a DRX off state (which may also be referred to as a non-active state) at other time. When the terminal is in the DRX off state, the terminal stops receiving the data and the signaling. DRX is a working mode of the terminal in which power consumption of the terminal is reduced. DRX is classified into idle mode DRX and connected mode DRX. Idle mode DRX is implemented through paging channel sensing because there is no RRC connection or terminal-specific bearer. For example, the DRX mechanism is a DRX mechanism on Uu. Connected mode DRX refers to a DRX characteristic when the terminal is in an RRC connected mode, and is implemented by listening to a physical downlink control channel (Physical downlink control channel, PDCCH).

DRX includes the following several types of typical application scenarios: delay-insensitive services that do not need data to be received and sent at most time, such as web browsing, email, and FTP; services in which a few small packets are generated, such as presence (Presence) services; and periodic and continuous small-packet services, such as VoIP (Voice over IP) services and automatic neighbor relation (Automatic Neighbour Relation, ANR) measurement.

For example, the DRX mechanism is a DRX mechanism on Uu. The terminal listens to the PDCCH in active time, including running time of a drx-onDurationTimer runs at the beginning of a DRX cycle, defined in a standard, and the terminal is in the activated state (which may also be referred to as an awake state or the active state) in the active time.

For example, the DRX mechanism is a DRX mechanism on Uu. The terminal may not listen to the PDCCH in non-active time (which may also be referred to as a dormant period), and the terminal may be in an unactivated state (which may also be referred to as the DRX off state or the non-active state) in the non-active time.

(5) Activated state: Taking that the DRX mechanism is a DRX mechanism on Uu as an example, the activated state is a state in which the terminal is able to monitor service data/PDCCH, that is, a state in which the terminal receives the data/PDCCH, and is a variable concept. In the activated state, the terminal needs to detect the PDCCH.

(6) DRX off state: Taking that the DRX mechanism is a DRX mechanism on Uu as an example, the DRX off state indicates that the terminal cannot monitor service data/PDCCH. The terminal does not perform PDCCH detection in the DRX off state, to save power.

Cellular network-based device-to-device (Device-to-Device, D2D) communication, also referred to as proximity service (Proximity Service, ProSe) in 3GPP, is a technology in which terminals directly communicate with each other under control of a network, which can increase a spectrum efficiency of a cellular communication system, reduce transmit power of the terminal, and resolve the problem of insufficient spectrum resources of a wireless communication system to some extent.

ProSe direct communication (Direct Communication): Two or more pieces of neighboring ProSe UE directly communicate with each other without any network node.

ProSe direct communication is implemented through a sidelink communication (sidelink communication) access layer function. Sidelink communication refers to direct communication between two or more neighboring terminals without any network node. ProSe direct communication is implemented by establishing a direct link (direct link) between two terminals through a PC5 interface.

Sidelink communication uses an E-UTRA technology or an NR technology. NR sidelink communication refers to sidelink communication using the NR technology, and enables a V2X communication access layer function. NR sidelink communication may further enable ProSe direct communication, including 5G ProSe direct communication.

V2X communication is communication supporting V2X service through Uu and/or PC5 reference points/interfaces. The V2X service is implemented through various types of V2X applications, such as vehicle-to-vehicle (Vehicle-to-Vehicle, V2V), vehicle-to-pedestrian (Vehicle-to-Pedestrian, V2P), vehicle-to-infrastructure (Vehicle-to-Infrastructure, V2I), and vehicle-to-network (Vehicle-to-Network, V2N). V2X communication is implemented through the sidelink communication access layer function.

To improve security and intelligence of a traffic system, the concept of intelligent traffic system gradually emerges. In a recent phase, development of intelligent traffic systems mainly focuses on a field of intelligent highway traffic systems, that is, vehicle to everything (vehicle to everything, V2X). V2X communication includes vehicle-to-vehicle (Vehicle to Vehicle, V2V) communication, vehicle-to-roadside infrastructure (Vehicle to Infrastructure, V2I) communication, and vehicle-to-pedestrian (Vehicle to People, V2P) communication. Application of V2X can improve driving safety, reduce congestion and vehicle energy consumption, and improve traffic efficiency, for example, communication with traffic lights, campuses, and railway crossings. A vehicle-to-everything system is a sidelink transmission technology based on long term evolution (Long Term Evaluation, LTE) V2V or new radio V2V. Unlike a manner in which communication data is received or sent through a network device in a conventional LTE system or NR, the vehicle-to-everything system uses a terminal-to-terminal direct communication manner.

FIG. 1 shows a communication system to which a communication method is applicable according to an embodiment of this application. The system includes a terminal 100 and a terminal 200. The terminal 100 and the terminal 200 may perform data transmission on a sidelink between the terminal 100 and the terminal 200 by using a sidelink resource.

Optionally, the system may further include a network device 300. The terminal 100 communicates with the network device 300 through a Uu interface. The network device 300 may allocate, to the terminal 100, a sidelink resource for sidelink transmission.

The terminal 200 is a terminal that performs sidelink communication with the terminal 100. The terminal 200 may be considered as a receiver terminal (Rx UE), and the terminal 100 may be considered as a sender terminal (Tx UE).

There is a first interface for direct communication between the terminal 100 and the terminal 200. The first interface may be referred to as a PC5 interface. A transmission link, for communication between the terminal 100 and the terminal 200, on the PC5 interface may be referred to as a sidelink.

For example, the PC5 interface may use a dedicated frequency band (for example, 5.9 GHz).

The terminal 100 may directly communicate with the terminal 200 through the PC5 interface. Sidelink communication and/or sidelink discovery (discovery) are/is performed between the terminal 200 and the terminal 100. The terminal 200 may also be in connection/communication with the network device, or may not be in connection/communication with the network device. The terminal 100 may further perform SL communication with another terminal other than the terminal 200. A scenario in which the another terminal is Rx UE and the terminal 100 is Tx UE is considered. The terminal 100 may directly communicate with the another terminal through a PC5 interface. The terminal 100 performs sidelink communication and/or sidelink discovery with the another terminal. The another terminal is a terminal outside a coverage area of the network device 300. For a manner of establishing the sidelink between the terminal 100 and the terminal 200, refer to descriptions in a conventional technology. Details are not described herein again.

Sidelink transmission is performed between a pair of devices: a source (source) and a destination (destination). The source may be identified by a source layer (layer)-2 ID. The destination may be identified by a destination layer-2 ID. The source layer-2 ID identifies a sender (sender) of data in sidelink communication. The destination layer-2 ID identifies a target (target) or a receiving end of the data in sidelink communication.

For example, the terminal 100 is a sender terminal, and the terminal 200 is a receiver terminal. In other words, the terminal 100 is a source of sidelink communication (or a MAC PDU), and the receiver terminal is a destination of sidelink communication (or a MAC PDU).

A PC5-radio resource control (radio resource control, RRC) connection is a logical connection between two terminals corresponding to a source and destination pair. After a PC5 unicast link (PC5 unicast link) is established, a corresponding PC5 RRC connection is established. The PC5-RRC connection and the PC5 unicast link are in a one-to-one correspondence. The PC5-RRC connection may be used by a sender terminal to transmit a capability and/or a sidelink configuration of the sender terminal, for example, an SL-data radio bearer (data radio bearer, DRB) configuration, to a receiver terminal in a PC5-RRC process.

The terminal 10 or the terminal 20 is a device with a wireless communication function, and may be deployed on land, including an indoor or outdoor scenario and a handheld or in-vehicle scenario, or may be deployed on water (for example, on a steamship), or may be deployed in the air (for example, on an airplane, a balloon, or a satellite). The terminal is also referred to as user equipment (user equipment, UE), a mobile station (mobile station, MS), a mobile terminal (mobile terminal, MT), a terminal device, or the like, and is a device that provides voice and/or data connectivity for a user. For example, the terminal includes a handheld device with a wireless connection function, an in-vehicle device, or the like. Currently, the terminal may be a mobile phone (mobile phone), a tablet computer, a notebook computer, a palmtop computer, a mobile Internet device (mobile internet device, MID), a wearable device (for example, a smartwatch, a smart band, or a pedometer), an in-vehicle device (for example, an automobile, a bicycle, an electromobile, an airplane, a ship, a train, or a high-speed train), a virtual reality (virtual reality, VR) device, an augmented reality (augmented reality, AR) device, a wireless terminal in industrial control (industrial control), a smart home device (for example, a refrigerator, a television, an air conditioner, or a power meter), an intelligent robot, a workshop device, a wireless terminal in self-driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or a flight device (for example, an intelligent robot, a hot air balloon, an unmanned aerial vehicle, or an airplane). In a possible application scenario of this application, the terminal is a terminal that often works on the ground, for example, an in-vehicle device. In this application, for ease of description, a chip deployed in the foregoing device, for example, a system on chip (System-On-a-Chip, SOC) or a baseband chip, or another chip with a communication function, may also be referred to as a terminal.

The terminal may be a vehicle with a corresponding communication function, or an in-vehicle communication apparatus, or another embedded communication apparatus, or may be a handheld communication device of a user, including a mobile phone, a tablet computer, or the like.

In an example, in embodiments of this application, the terminal may alternatively be a wearable device. The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

When applied to a V2X scenario, the solutions described in embodiments of this application may be applied to the following fields: unmanned driving (unmanned driving), self-driving (automated driving/ADS), assisted driving (driver assistance/ADAS), intelligent driving (intelligent driving), connected driving, intelligent connected driving (Intelligent network driving), and car sharing. Certainly, the solutions described in embodiments of this application may also be applied to interaction between a band and a mobile phone and between VR glasses and a mobile phone.

The terminal 100 may communicate with the terminal 200 on the sidelink between the terminal 100 and the terminal 200 through a resource. In this embodiment of this application, a scenario in which the terminal 100 communicates with the terminal 200 on the sidelink may be referred to as a sidelink communication scenario. As an example, in this embodiment of this application, the resource used for communication between the terminal 100 and the terminal 200 on the sidelink may be referred to as a sidelink resource. A specific name of the resource is not limited in this embodiment of this application, and may be set based on a requirement.

A sidelink resource is required when terminals communicate with each other on a sidelink. For example, the terminal 100 sends data to the terminal 200 by using the sidelink resource. In this case, the terminal 100 may currently obtain the sidelink resource in the following manner.

Manner 1 (Mode 1) is a resource allocation mode based on scheduling of a base station, that is, the sidelink resource of the terminal 100 is received by the terminal 100 from the base station. For example, the base station sends a sidelink grant (SL grant) to the terminal 100. The SL grant includes information such as sidelink resource allocation. The terminal 100 may perform transmission on the SL by using the sidelink resource indicated/allocated by the SL grant. The SL grant includes/indicates/schedules a time-frequency resource for transmitting a physical sidelink control channel (Physical sidelink control channel, PSCCH) and/or a physical sidelink shared channel (Physical sidelink shared channel, PSSCH). For example, one SL grant may include information about at least one sidelink resource.

Mode 1: The terminal 100 performs data transmission with the network device in a radio resource control (radio resource control, RRC) connected mode. In this case, the network device communicating with the terminal 100 may schedule, for the terminal 100, a sidelink resource used to transmit sidelink service data. For example, the terminal 100 sends a scheduling request (scheduling request, SR) and a sidelink buffer status reporting (buffer status reporting, BSR) to the network device. The sidelink BSR is used to determine a sidelink communication data volume of the terminal 100. The network device may determine, based on the sidelink BSR, the sidelink communication data volume of the terminal 100, and schedule, for the terminal 100, the sidelink resource required for transmitting the sidelink service data. The network device schedules, by using a configured sidelink radio network temporary identifier (SL-radio network temporary identity, SL-RNTI), a sidelink resource for sidelink communication.

In Mode 1, a physical downlink control channel (physical downlink control channel, PDCCH) may be used to schedule transmission of the terminal on the SL. Downlink control information (down control information, DCI) on the PDCCH includes the SL grant. In Mode 1, a dynamic grant is supported, a configured grant type (configured grant type) 1, and a configured grant type 2 are supported. The dynamic grant means that the SL grant is dynamically received by the terminal on the PDCCH. The configured grant type 1 and the configured grant type 2 refer to that the base station semi-statically configures a configured grant configuration for the terminal through RRC signaling. The base station may configure a plurality of SL configured grant configurations (SL-ConfiguredGrantConfig) for the terminal. For example, the base station configures an SL configured grant configuration list for the terminal. The SL configured grant configuration list includes an SL configured grant configuration that is releasable, addable, or modifiable. Each SL configured grant configuration corresponds to an index, and the index may be included in the SL configured grant configuration. The SL configured grant configuration includes SL configured grant period indication information. For the configured grant type 1, the configured grant configuration includes time domain resource location information, frequency domain resource location information, and the like of the SL grant. Therefore, the terminal may determine a time domain location and a frequency domain location of the SL grant. The SL configured grant period indication information is used to indicate a period of the SL grant.

For the configured grant type 2, the configured SL grant is activated/deactivated through the DCI transmitted on the PDCCH. The DCI includes configured grant configuration index information, and time domain resource location information, frequency domain resource location information, and the like of the SL grant.

It should be noted that, for the configured grant type 2, the configured SL grant is activated through the DCI when the base station determines that the terminal needs to use the configured SL grant, and after activation, the terminal may use the activated configured SL grant.

Manner 2 (Mode 2) is a resource selection mode based on autonomous selection of the terminal, which means that the SL grant is autonomously selected by the terminal. The SL grant includes information such as resource allocation. The terminal may perform transmission on the SL by using the sidelink resource indicated/allocated by the SL grant. The SL grant includes/indicates/schedules a time-frequency resource for transmitting a physical sidelink control channel (physical sidelink control channel, PSCCH) and/or a physical sidelink shared channel (physical sidelink shared channel, PSSCH).

Mode 2: The terminal 100 selects the sidelink resource from one or more sidelink resources usually included in a resource pool. To be specific, the terminal 100 selects the SL grant from one or more SL grants, and determines the sidelink resource based on the selected SL grant.

For example, when the terminal 100 is in the network coverage area, the resource pool is a resource broadcast by the network device in system information. When the terminal 100 is outside the network coverage area, the resource pool is a resource preconfigured for the terminal 100. The resource pool may be a specific resource pool for the terminal 100. In other words, only the terminal 100 may select the sidelink resource from the resource pool. Alternatively, the resource pool may be a resource pool shared by a plurality of terminals including the terminal 100. In other words, another terminal other than the terminal 100 may also select a resource from the resource pool. For the latter, when the terminal 100 autonomously selects the resource in the resource pool, the terminal 10 may perform listening on the resource pool to select the sidelink resource.

Sidelink transmission is based on a resource pool. Resource pool is a logical concept. A resource pool includes a plurality of physical resources, and any one of the physical resources is used to transmit data. When performing data transmission, a terminal may perform transmission by using one resource in a resource pool.

Specifically, to ensure quality of the sidelink resource for the sidelink service data sent by the terminal 100, and avoid a resource collision caused by random selection of the sidelink resource by a plurality of terminals from the resource pool when the terminal 100 autonomously selects the sidelink resource, that is, avoid communication quality reduction caused by occupation of the resource selected by the terminal 100 by a plurality of other terminals, the terminal 100 may predict usage of the sidelink resource in a future time period 1 through listening, and use the usage of the sidelink resource in the time period 1 as a listening result. The usage of the sidelink resource may include: information indicating whether another terminal occupies the sidelink resource in the future time period 1, and/or receive power or receive strength of a signal sent by the another terminal that occupies the sidelink resource in the future time period 1. Therefore, based on the listening result, the terminal 100 may select or reserve a sidelink resource in the time period 1 to ensure its own communication quality. In addition, the sidelink resource reserved by the terminal 100 through listening has time validity. For example, in 5G NR, time validity of a listening result of a periodic service is different from that of a listening result of an aperiodic service, and both are in a specific millisecond time.

In LTE- or NR-based V2X communication, the terminal 100 may obtain the listening result by using or based on a listening process defined in the LTE release (Release) 14 standard protocol. For example, the listening result of the sidelink resource may be used to indicate any one or more of the following: an identifier or a location of the specific sidelink resource in the resource pool, signal strength on the sidelink resource, signal power on the sidelink resource, or a channel busy ratio (channel busy ratio, CBR) of the sidelink resource.

For Mode 2, for each sidelink process (process), after there is data on a logical channel, resource selection/reselection check is triggered. If a check result is to trigger resource selection/reselection, a MAC entity of the terminal notifies a PHY layer of the terminal to provide a group of sidelink resources. Then, the MAC entity randomly selects one sidelink resource from the group of sidelink resources provided by the PHY layer. If the MAC entity selects at least one reselection, the MAC entity continues to randomly select a sidelink resource from another resource other than the selected sidelink resource in the group of sidelink resources provided by the PHY layer. The earliest sidelink resource in time domain in a plurality of sidelink resources selected by the MAC entity is an initial transmission resource, and the sidelink resource located after the initial transmission resource may be considered as a retransmission resource. Transmission opportunities corresponding to the plurality of sidelink resources selected by the MAC entity are selected SL grants. If the MAC entity selects to create selected SL grants for transmission of a plurality of MAC PDUs, the MAC entity selects a sidelink resource A from the group of sidelink resources provided by the PHY layer. The MAC entity determines a group of periodic sidelink resources based on the sidelink resource A. Transmission opportunities corresponding to the sidelink resource A and the group of periodic resources selected based on the resource A are used as the selected SL grants. Each transmission opportunity corresponds to one SL grant. For each SL grant, the MAC entity submits, to a sidelink HARQ entity, each SL grant, a modulation and coding scheme (modulation and coding scheme, MCS), and hybrid automatic repeat request (hybrid automatic repeat request, HARQ) information associated with each SL grant.

For each SL grant, if the SL grant is used for initial transmission, the sidelink HARQ entity obtains a to-be-sent MAC PDU from a multiplexing and assembly (Multiplexing and assembly) entity. If obtaining the MAC protocol data unit (protocol data unit, PDU), the sidelink HARQ entity sends the MAC PDU, the SL grant, and sidelink transmission information to an associated sidelink process (sidelink process). The sidelink HARQ entity notifies the sidelink process to trigger a new transmission (the new transmission refers to triggering transmission of a data packet, and the data packet is a data packet transmitted for the first time/initially). If the sidelink HARQ entity does not obtain the MAC PDU, a HARQ buffer (buffer) of the sidelink process is overwritten. If the SL grant is used for retransmission, the sidelink HARQ entity submits the SL grant to the sidelink process associated with the SL grant to notify the sidelink process to trigger a retransmission (the retransmission refers to triggering transmission of a data packet, and the data packet is a data packet transmitted for the eh time, where c is an integer greater than or equal to 2, and c is less than or equal to a maximum quantity of retransmission times of the terminal, or c is less than or equal to a maximum quantity of retransmission times of a sidelink HARQ process of the data packet).

The sidelink process is associated with a HARQ buffer. If the sidelink HARQ entity requires a new transmission, the sidelink process stores a MAC PDU in the associated HARQ buffer, stores an SL grant, and generates a transmission. If the sidelink HARQ entity requires a retransmission, the sidelink process stores an SL grant, and generates a transmission. That the sidelink process generates a transmission includes: notifying the physical layer to transmit sidelink control information (sidelink control information, SCI) based on the stored SL grant, and generating the transmission.

That the sidelink HARQ entity obtains a to-be-sent MAC PDU from a multiplexing and assembly entity specifically includes: for each piece of SCI corresponding to a new transmission, the multiplexing and assembly entity selects, according to a rule, a destination for an SL grant associated with the SCI. Then, the multiplexing and assembly entity selects a logical channel that belongs to the destination. The multiplexing and assembly entity allocates a resource to the selected logical channel. The rule for selecting the destination is that a priority of at least one of the logical channel (logical channel, LCH) and a medium access control (medium access control, MAC) control element (control element, CE) of the destination is highest in all logical channels and MAC CEs that meet a condition. There may be one or more LCHs for each destination, and each LCH has a corresponding priority (priority). The MAC CE also has a corresponding priority.

Figure 2:
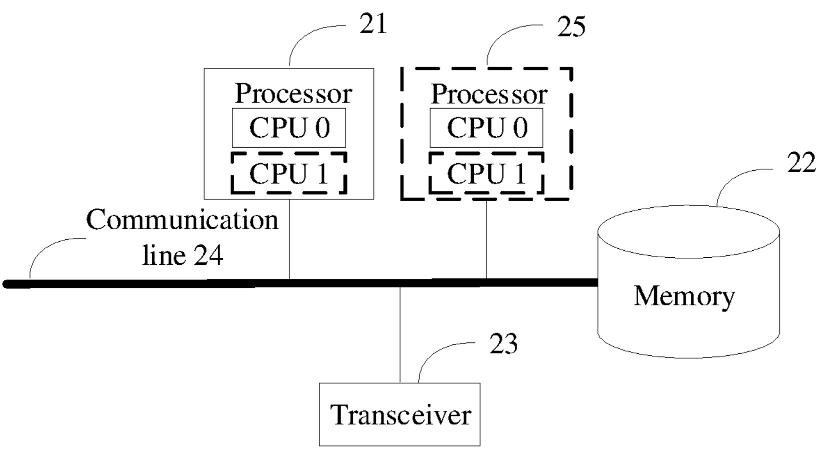
FIG. 2 is a schematic diagram depicting a structure of a communication device according to an embodiment of this application.

FIG. 2 is a schematic diagram of a hardware structure of a communication device according to an embodiment of this application. For hardware structures of a first terminal and a second terminal in embodiments of this application, refer to the structure shown in FIG. 2. The communication device includes a processor 21, a communication line 24, and at least one transceiver (FIG. 2 is described merely by using an example in which a transceiver 23 is included).

The processor 21 may be a general-purpose central processing unit (central processing unit, CPU), a microprocessor, an application-specific integrated circuit (application-specific integrated circuit, ASIC), or one or more integrated circuits configured to control program execution in the solutions of this application.

The communication line 24 may include a conducting path for transmitting information between the foregoing components.

The transceiver 23 is configured to communicate, by using any apparatus like a transceiver, with another device or a communication network, such as Ethernet, a radio access network (radio access network, RAN), or a wireless local area network (wireless local area network, WLAN).

Optionally, the communication device may further include a memory 22.

The memory 22 may be a read-only memory (read-only memory, ROM) or another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM) or a compact disc read-only memory (compact disc read-only memory, CD-ROM) or other optical disk storage, optical disc storage (including a compressed optical disc, a laser disc, an optical disc, a digital versatile optical disc, a Blu-ray disc, and the like), a magnetic disk storage medium or another magnetic storage device, or any other medium capable of carrying or storing desired program code in the form of instructions or data structures and capable of being accessed by a computer, but not limited thereto. The memory may exist independently, and is connected to the processor through the communication line 24. Alternatively, the memory 22 may be integrated with the processor 21.

The memory 22 is configured to store computer executable instructions for performing the solutions of this application, and the processor 21 controls the execution. The processor 21 is configured to execute the computer executable instructions stored in the memory 22, so as to implement a communication method provided in the following embodiments of this application.

Optionally, the computer executable instruction in this embodiment of this application may also be referred to as application program code. This is not specifically limited in this embodiment of this application.

In specific implementation, in an embodiment, the processor 21 may include one or more CPUs, for example, a CPU 0 and a CPU 1 in FIG. 2.

In specific implementation, in an embodiment, the communication device may include a plurality of processors, such as the processor 21 and a processor 25 in FIG. 2. Each of the processors may be a single-core (single-CPU) processor or a multi-core (multi-CPU) processor. The processor herein may be one or more devices, circuits, and/or processing cores configured to process data (such as a computer program instruction).

The following describes a process in which a terminal senses and selects a sidelink resource in this application.

A PHY layer of the terminal receives, in n time units (for example, slots), a notification of a MAC entity for requesting to determine a group of sidelink resources. The physical layer uses sidelink resources that are in sensed sidelink resources and located in [n+T1, n+T2] as candidate sidelink resources. The candidate sidelink resources located in [n+T1, n+T2] constitute a candidate resource set.

It may be understood that [n+T1, n+T2] is a resource selection window of the terminal.

T1 meets $$0 \le T1 \le T^{SL}_{proc,1},$$

and a value of T1 depends on implementation of the terminal. A unit of $T^{SL}_{proc,1}$ is slot, as defined in the following Table 1, where $\mu_{SL}$ is an SCS configuration. If a minimum value of T2 is less than a remaining (remaining) packet delay budget (PDB) (in units of slots), a value of T2 depends on implementation of the terminal. If T2 min≤T2≤P is met, P represents the remaining PDB. Otherwise, T2 is equal to the remaining PDB. The remaining PDB is provided by the MAC entity for the PHY layer.

TABLE 1

| $\mu_{SL}$ | $T^{SL}_{proc,1}$ $T^{SL}_{proc,1}$ [slots] |
|---|---|
| 0 | 3 |
| 1 | 5 |
| 2 | 9 |
| 3 | 17 |

The physical layer determines one or more sidelink resources from the candidate resource set according to a specific rule, and reports the one or more sidelink resources to the MAC entity.

In an example, a sidelink resource m in the one or more sidelink resources is used as an example. The terminal determines, based on reference signal receiving power (reference signal receiving power, RSRP) of a demodulation reference signal (demodulation reference signal, DMRS) of a PSCCH/PSSCH received on the sidelink resource m, whether a sidelink resource k in the candidate resource set is excluded, where k is determined by m.

For example, the RSRP of the DMRS of the PSCCH/PSSCH received on the sidelink resource m is greater than a threshold 1, and another condition is met. In this case, the physical layer of the terminal determines that the sidelink resource k should be excluded. Finally, the physical layer determines that the one or more sidelink resources do not include the sidelink resource k. If a quantity of the one or more sidelink resources finally determined by the physical layer is less than a total quantity of sidelink resources in the candidate resource set times M, the terminal determines, based on a threshold 2, whether the sidelink resource k should be excluded. The threshold 2 is greater than the threshold 1. For example, the threshold 2 is the threshold 1 plus a preset value. For example, the preset value is 3 dB.

Currently, when a terminal communicates with a network device, to reduce unnecessary power consumption of the terminal and reduce listening time of the terminal, the terminal may apply a discontinuous reception mechanism on a Uu interface (an interface between the terminal and the network device) to help the terminal in a radio resource control (radio resource control, RRC) connected mode save power. A basic principle of DRX is as follows: When the terminal communicates with the network device, the network device may transmit data in a period of time, but the network device may have no data to transmit to the terminal in a subsequent long period of time. When the network device sends no data to the terminal, if the terminal remains in a listening state, the terminal consumes a large amount of power. Therefore, when the terminal has no data to receive, the terminal may be controlled to stop monitoring a physical downlink control channel (physical downlink control channel, PDCCH) to reduce power consumption of the terminal and further increase battery use time of the terminal.

In NR, a discontinuous reception (DRX) function is defined to reduce unnecessary power consumption when the terminal is in the RRC connected mode. The terminal using the DRX mechanism monitors the PDCCH in some time periods, and does not monitor the PDCCH in other time periods. Therefore, DRX reduces the power consumption of the terminal by controlling the terminal not to monitor the PDCCH in some time periods.

In NR, the DRX mechanism configured by the network device for the terminal further includes a corresponding DRX parameter. For example, in a 5G NR version, parameters mainly included in the DRX mechanism and functions of the parameters are as follows.

A DRX on duration timer (drx-onDurationTimer) indicates duration at the beginning of a DRX cycle (the duration at the beginning of a DRX Cycle). For the on duration at the beginning of the DRX cycle, it may be considered that the terminal is in an activated state in a running process of the DRX-on duration timer.

A DRX slot offset (drx-SlotOffset) is a delay before the drx-onDurationTimer is enabled.

A DRX inactivity timer (drx-InactivityTimer) indicates a time length in which the terminal remains in the activated state after successfully decoding a PDCCH, for scheduling initial transmission of new data, on a Uu interface. That is, after the terminal is scheduled, the drx-InactivityTimer should be enabled to prolong time in which the terminal is in the activated state. A corresponding scenario may be understood as that the terminal is very likely to continue to be scheduled in a next time period when currently scheduled. Therefore, the terminal needs to remain in the activated state to wait to receive data.

A DRX long cycle start offset (drx-LongCycleStartOffset) represents a long DRX cycle (Long DRX Cycle) and a DRX start offset (drx-StartOffset). The long DRX cycle specifies a quantity of subframes/milliseconds occupied by a long cycle, and the drx-StartOffset specifies start subframes of the long DRX cycle and a short DRX cycle.

A DRX downlink retransmission timer (drx-RetransmissionTimerDL) (for each HARQ process except a broadcast process) indicates maximum duration before the terminal receives downlink retransmitted data on the Uu interface. During running of the drx-RetransmissionTimerDL, the terminal waits to receive the downlink retransmitted data from the network device.

A DRX uplink retransmission timer (drx-RetransmissionTimerUL) (for each uplink HARQ process) indicates maximum duration before the terminal receives an uplink retransmission resource on the Uu interface (the maximum duration until a grant for UL retransmission is received). During running of the drx-RetransmissionTimerUL, the terminal retransmits uplink data.

A DRX short cycle (drx-ShortCycle) (optional) is a time length of the short DRX cycle (Short DRX cycle), in units of subframes/milliseconds.

A DRX downlink HARQ round-trip timer (drx-HARQ-RoundTripTime-TimerDL, drx-HARQ-RTT-TimerDL) (for each downlink HARQ procedure except the broadcast procedure) indicates duration before the terminal expects to receive downlink HARQ retransmitted data on the Uu interface, which may be understood as a time window. In the time window, a base station does not perform downlink retransmission on a data packet that fails to be transmitted currently, and the terminal may continue to receive downlink retransmitted data of the data packet only after the drx-HARQ-RTT-TimerDL expires. When the drx-HARQ-RTT-TimerDL of the terminal expires, the terminal may start to receive the downlink retransmitted data. In this case, drx-RetransmissionTimerDL is enabled. That is, the DRX downlink HARQ round-trip timer indicates minimum duration before a downlink assignment for HARQ retransmission may occur.

A DRX uplink HARQ round-trip timer (drx-HARQ-RTT-TimerUL) (for each uplink HARQ process) indicates duration before the terminal expects to receive an uplink HARQ retransmission resource on the Uu interface, which may be understood as a time window. In the time window, the terminal cannot perform uplink retransmission on a data packet that fails to be transmitted currently, and the terminal may continue to upload data of the data packet only after the drx-HARQ-RTT-TimerUL expires. When the drx-HARQ-RTT-TimerUL of the terminal expires, the terminal may start uplink retransmission. In this case, the drx-Retransmission-TimerUL is enabled. That is, the DRX uplink HARQ round-trip timer indicates minimum duration before an uplink HARQ retransmission grant may occur.

Therefore, after the DRX mechanism is configured for the terminal, that the terminal is in DRX-active time (active time) mainly includes the following cases.

Case 1: Any timer (timer) of the drx-onDurationTimer, the drx-InactivityTimer, the drx-RetransmissionTimerDL, the drx-RetransmissionTimerUL, or a random access contention resolution timer (ra-ContentionResolutionTimer) is running. The ra-ContentionResolutionTimer is a timer used by the terminal in a random access process, and is used by the terminal to wait to obtain an access resource of the base station.

Case 2: The terminal has sent a scheduling request (scheduling request, SR) on a physical uplink control channel (physical uplink control channel, PUCCH), and the SR is currently in a pending state. Pending may be understood as that the terminal prepares but has not sent the SR to the network device.

Case 3: Similar to the ra-ContentionResolutionTimer, the terminal successfully receives a random access response (random access response, RAR) used to respond to a preamble sequence (preamble) of contention-based random access that is not selected by the terminal, but does not receive a PDCCH indicating initial transmission (using a cell radio network temporary identifier (cell radio network temporary identifier, C-RNTI)).

Accordingly, in any one or more of the foregoing three cases, the terminal needs to detect the PDCCH. Detecting the PDCCH includes detecting a PDCCH corresponding to the following radio network temporary identifiers (radio network temporaryidentifier, RNTI): a cell RNTI (cell-RNTI, C-RNTI), a configured scheduling RNTI (configuredscheduling-RNTI, CS-RNTI), an interruption RNTI (interruption-RNTI, INT-RNTI), a slot format identifier RNTI (slot format indicator-RNTI, SFI-RNTI), a semi-permanent channel state information RNTI (semi-persistent channel state information, SP-CSI-RNTI), a PUCCH transmit power control RNTI (transmit power control-PUCCH-RNTI, TPC-PUCCH-RNTI), a PUSCH transmit power control RNTI (transmit power control-PUSCH-RNTI, TPC-PUSCH-RNTI), and a sounding reference signal transmit power control RNTI (transmit power control-sounding reference signal-RNTI, TPC-SRS-RNTI).

In the foregoing description, the PDCCH corresponding to the RNTI may refer to that a cyclic redundancy check (cyclic redundancy check, CRC) bit of DCI carried by the PDCCH is scrambled by using the RNTI.

It should be further noted that, in addition to the foregoing several cases, the active time may further include another case specified in a future communication protocol. This is not specifically limited in embodiments of this application.

Once various timers described in embodiments of this application are started, the timers are running until the timers stop or expire; otherwise, the timers are not running. If the timer is not running, the timer may be started. After the timer stops or expires, the timer is not running until the timer is started. If the timer is running, the timer may be restarted. A time length of the timer may be understood as a time length in which the timer keeps running from startup or restart to expiration. A value of the timer is an initial value of the timer when the timer is started or restarted. The initial value of the timer may be the time length of the timer. The value of the timer is a time length of the timer when the timer is started or restarted.

Names of the timers in various embodiments are merely examples. DRX parameters/timers in the following are DRX parameters/timers on SL.

When the DRX cycle is configured or DRX is configured, the active time includes running time of the drx-onDurationTimer, the drx-InactivityTimer, the drx-Retransmission-TimerDL, or the drx-RetransmissionTimerUL. In the active time, the terminal needs to monitor the PDCCH. Outside the active time, the terminal does not need to monitor the PDCCH, and thus the terminal may not monitor the PDCCH.

Figure 3:
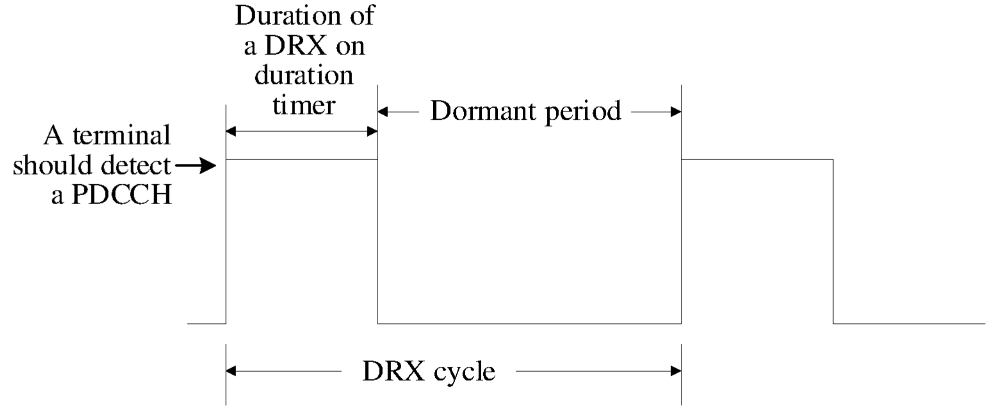
FIG. 3 is a schematic diagram of a DRX cycle of a terminal on a Uu interface according to an embodiment of this application.

FIG. 3 shows the DRX cycle. The on duration (On Duration) is periodically repeated. The DRX cycle is a cycle of on duration repetition. The drx-onDurationTimer is started at a start moment of the on duration, and duration of the drx-onDurationTimer is a length of the on duration. That is, the on duration is a running period of the drx-onDurationTimer. A DRX opportunity (Opportunity for DRX) is a non-active period. If no other timer that causes the DRX active time runs, the period is a dormant period.

Starting time of the Drx-onDurationTimer is determined based on the drx-StartOffset and the drx-SlotOffset. Specifically, a subframe in which the drx-onDurationTimer is started is determined based on the drx-StartOffset, and the drx-onDurationTimer is started after the drx-SlotOffset from the beginning of the subframe.

Figure 4:
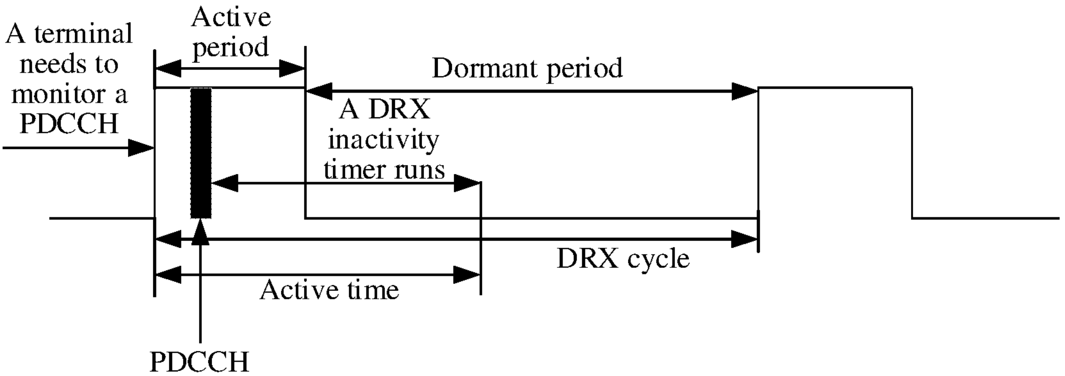
FIG. 4 is another schematic diagram of a DRX cycle of a terminal on a Uu interface according to an embodiment of this application.

As shown in FIG. 4, if the terminal receives, in the on duration, a PDCCH indicating new transmission, the drx-InactivityTimer is started or restarted at a first symbol after reception of the PDCCH ends. As shown in FIG. 4, the active time of the terminal is determined by the start moment of the on duration and an end moment of the drx-InactivityTimer. To be specific, a start moment of the active time of the terminal is the start moment of the on duration, and an end moment of the active time of the terminal is the end moment of the drx-InactivityTimer.

If the terminal receives a MAC PDU in a configured downlink assignment, a drx-HARQ-RTT-TimerDL of a corresponding HARQ process is started at a first symbol after a transmission carrying a downlink HARQ feedback ends, and a drx-RetransmissionTimerDL of the corresponding HARQ process is stopped. If a PDCCH indicating downlink transmission is received, a drx-HARQ-RTT-TimerDL of a corresponding HARQ process is started at a first symbol after a transmission carrying a downlink HARQ feedback ends, and a drx-RetransmissionTimerDL of the corresponding HARQ process is stopped. If the drx-HARQ-RTT-TimerDL expires, and data of the corresponding HARQ process fails to be decoded, the drx-RetransmissionTimerDL of the corresponding HARQ process is started at a first symbol after the drx-HARQ-RTT-TimerDL expires.

When sidelink communication is currently performed between a sender terminal (Tx UE) and a receiver terminal (Rx UE), scenarios that may be specifically considered include but are not limited to sidelink related communication scenarios, for example, V2X communication, device to device (device to device, D2D), public safety (public safety), and commercial communication (commercial). When the Rx UE does not use the DRX mechanism, the Rx UE keeps monitoring, in an entire time period, a PSCCH sent by the Tx UE, and the Rx UE remains in an activated state, and can receive scheduling data sent by the Tx UE. However, the Tx UE does not always send data to the receiver terminal. Therefore, if the Rx UE keeps monitoring, in the entire time period, the PSCCH sent by the Tx UE, power consumption of the Rx UE is inevitably wasted.

Based on the above description, introduction of DRX in the sidelink is discussed in 3GPP Release 17. For SL DRX timers, refer to the DRX timers on Uu. For example, a drx-onDurationTimer, a drx-InactivityTimer, a drx-HARQ-RTT-TimerSL, and a drx-RetransmissionTimerSL are also used on the SL. To facilitate distinguishing from the foregoing various timers on the Uu interface, in embodiments of this application, SL may be added to names of the various timers used on the SL for distinguishing. For example, the drx-onDurationTimer used on the SL may be named drx-onDurationTimer-SL. The drx-InactivityTimer used on the SL may be named drx-InactivityTimer-SL.

SL DRX-active time includes running time of the drx-onDurationTimer-SL (DRX on duration timer-SL), the drx-InactivityTimer-SL (DRX inactivity timer-SL), or a drx-RetransmissionTimer-SL (DRX retransmission timer-SL). The receiver terminal (Rx UE) monitors/receives a PSCCH, a PSSCH, SCI, or a MAC PDU in the SL DRX-active time. In a possible manner, each source and destination pair corresponds to a piece of SL DRX-active time. Each source and destination pair corresponds to a set of SL DRX timers.

The drx-onDudrationTimer-SL is used to indicate duration at the beginning of a sidelink DRX cycle, that is, the “on duration” of the DRX cycle. That is, the “on duration” represents a time period, is determined by a drx-onDurationTimerPC5, and has a length equal to a value of the drx-onDudrationTimer-SL. At a start moment of the sidelink DRX cycle, the terminal starts the drx-onDudrationTimer-SL, that is, enters the “on duration”. The drx-onDudrationTimer-SL starts to run, that is, enters the sidelink DRX active time.

The drx-InactivityTimer-SL (which may also be referred to as a drx-InactivityTimerPC5) is used to indicate duration after transmission of a PSCCH, a PSSCH, SCI, or a MAC PDU. The SCI includes first-level SCI, second-level SCI, or first-level SCI and second-level SCI. The first-level SCI may be carried on the PSCCH, and the second-level SCI may be carried on the PSSCH. Transmission of the PSSCH may be a new transmission.

Correspondingly, the PSCCH or the SCI is used to schedule the new transmission. Alternatively, transmission of the PSSCH may be a new transmission or a retransmission, and the PSCCH or SCI is used to schedule the new transmission or the retransmission. For example, if the terminal device receives the PSCCH or the SCI at the sidelink DRX active time to indicate new sidelink data transmission, the terminal device starts or restarts the drx-InactivityTimerPC5, so that the terminal is always in the sidelink DRX active time. This may be understood as that a time length in which the terminal device is originally in a sidelink DRX activated state is a time length of the “on duration”, and running the drx-InactivityTimerPC5 may prolong time in which the terminal device is in the sidelink DRX activated state. When the drx-InactivityTimerPC5 expires, or the terminal device receives related MAC CE signaling to stop the drx-onDurationTimerPC5 and the drx-InactivityTimerPC5, for example, a DRX command PC5 MAC CE, the terminal ends the sidelink DRX active time and enters sidelink DRX non-active time, that is, the terminal enters a sidelink DRX unactivated state from the sidelink DRX activated state.

The drx-RetransmissionTimer-SL (which may also be referred to as a drx-RetransmissionTimerPC5) is used to indicate maximum duration before sidelink HARQ retransmission or SCI for scheduling side-link HARQ retransmission is received. Different sidelink processes may correspond to different drx-RetransmissionTimerPC5.

The drx-HARQ-RTT-Timer-SL may also be referred to as a drx-HARQ-RTT-TimerPC5, and is used to indicate minimum duration before sidelink HARQ retransmission is expected to be performed or before SCI expected to schedule sidelink HARQ retransmission. Different sidelink processes may correspond to different drx-HARQ-RTT-TimerPC5.

The name of each timer used on the SL is not limited in embodiments of this application. The foregoing name is only an example.

Because a resource selection mechanism based on Mode 2 in the conventional technology does not consider SL DRX, the sender terminal is a destination selected for an SL grant according to the foregoing rule. However, a time domain location of a sidelink resource corresponding to/indicated/allocated by the SL grant may not be in the SL DRX-active time of the destination. If the terminal sends a PSCCH, a PSSCH, SCI, or a MAC PDU to the destination on the sidelink resource corresponding to/indicated/allocated by the SL grant, the destination does not listen to/receive the PSCCH, the PSSCH, the SCI, or the MAC PDU. In this case, the PSCCH, the PSSCH, the SCI, or the MAC PDU fails to be transmitted, and power consumption of the Tx UE is wasted. Based on this, in embodiments of this application, a solution described in FIG. 5 is used to resolve how to avoid a data packet transmission failure and avoid a power waste of the Tx UE.

A specific structure of an execution body of the communication method in embodiments of this application is not specially limited in embodiments of this application as long as a program recording a code for the communication method of embodiments of this application may be run to implement communication according to the communication method of embodiments of this application. For example, the execution body of the communication method provided in embodiments of this application may be a function module, capable of invoking and executing the program, in the first terminal, or may be a communication apparatus applied to the first terminal, for example, a chip, a chip system, or an integrated circuit. The chip, the chip system, or the integrated circuit may be disposed inside the first terminal, or may be independent of the first terminal. This is not limited in embodiments of this application.

Figure 5:
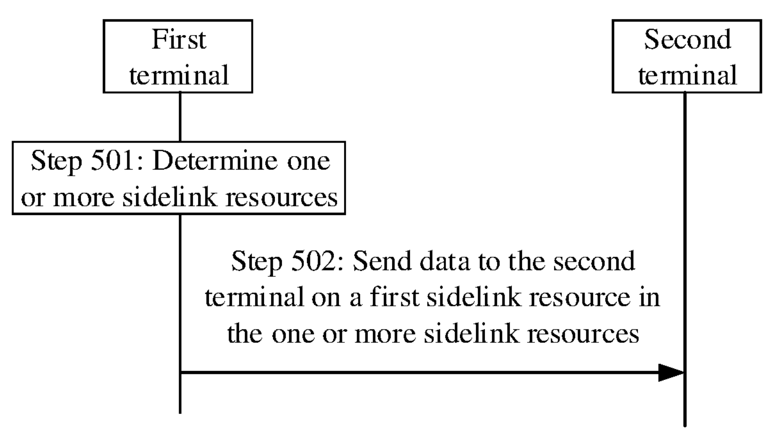
FIG. 5 is a schematic flowchart of a communication method according to an embodiment of this application.

FIG. 5 shows a communication method according to an embodiment of this application. The method includes the following steps.

Step 501: A first terminal determines one or more sidelink resources.

The one or more sidelink resources may be used to transmit data sent by the first terminal to a second terminal. In other words, the first terminal may send the data to the second terminal on a resource in the one or more sidelink resources. There is a sidelink resource located in sidelink discontinuous reception-active time of the second terminal in the one or more sidelink resources. The second terminal is in an activated state in the sidelink discontinuous reception-active time of the second terminal.

As described above, the sidelink discontinuous reception-active time of the second terminal includes time in a running period of any one or more timers of a drx-onDurationTimer-SL, a drx-InactivityTimer-SL, or a drx-Retransmission-Timer-SL of the second terminal. For example, when any one or more timers of the drx-InactivityTimer-SL or the drx-RetransmissionTimer-SL of the second terminal do not run, the sidelink discontinuous reception-active time of the second terminal includes at least a running period of the drx-onDurationTimer-SL. When any one or more timers of the drx-InactivityTimer-SL or drx-RetransmissionTimer-SL of the second terminal run, the second terminal remains in the activated state. In this case, the sidelink discontinuous reception-active time of the second terminal is determined by running duration of the drx-onDurationTimer-SL and one or more timers of the drx-InactivityTimer-SL or the drx-RetransmissionTimer-SL.

In this embodiment of this application, the first terminal and the second terminal may perform data transmission on a sidelink between the first terminal and the second terminal by using a sidelink resource.

In an embodiment of this application, the one or more sidelink resources may be resources specially used to send specific data, or the one or more sidelink resources may be resources for sending any data. This is not limited in this embodiment of this application.

In an embodiment of this application, the one or more sidelink resources may be obtained by the first terminal from a resource pool through sensing (which may also be referred to as listening, that is, sensing in English). For example, if the first terminal needs to send the data, the first terminal may perform a sensing technology in the resource pool to determine the one or more sidelink resources.

In an embodiment of this application, the one or more sidelink resources may be idle resources, that is, resources that are not used or reserved by another terminal other than the second terminal. Alternatively, the one or more sidelink resources may be non-idle resources, that is, resources used or reserved by another terminal other than the second terminal. Alternatively, the second terminal predicts, through sensing, that signal received power or signal strength on the one or more sidelink resources is relatively low, and even if another terminal other than the second terminal sends data on the one or more sidelink resources, signal received power or signal strength measured by the second terminal is relatively low.

In an embodiment of this application, the one or more sidelink resources may be sidelink resources that are recommended or scheduled by another terminal other than the second terminal to the first terminal and that are available to send the data. Because the another terminal other than the second terminal may not know time when the second terminal is in the activated state and a DRX off state, the sidelink resources that may be recommended or scheduled include a sidelink resource whose time range is in the sidelink discontinuous reception-active time of the second terminal.

In an embodiment of this application, the one or more sidelink resources may be sidelink resources that are allocated by a base station accessed by the first terminal to the first terminal and are available to send the data. To be specific, the one or more sidelink resources may be sidelink resources obtained by the first terminal in Manner 1.

In this embodiment of this application, the second terminal uses a DRX mechanism. The second terminal is in the activated state in the sidelink discontinuous reception-active time. When the second terminal is in the activated state, that is, when the second terminal is in the sidelink discontinuous reception-active time, the second terminal listens to/receives a PSCCH, a PSSCH, SCI, or a MAC PDU, that is, may receive data from another terminal.

Time of the second terminal other than the sidelink discontinuous reception-active time is discontinuous reception-non-active time, and may also be referred to as a sidelink discontinuous reception-dormant period.

In the sidelink discontinuous reception-non-active time, the second terminal is in an unactivated state, which may also be referred to as the DRX off state. When the second terminal is in the DRX off state, that is, when the second terminal is not in the sidelink discontinuous reception-active time, the second terminal may not listen to/receive the PSCCH, the PSSCH, the SCI, or the MAC PDU. When the second terminal is in the sidelink discontinuous reception-non-active time, the second terminal may also listen to/receive the PSCCH, the PSSCH, the SCI, or the MAC PDU. This is not limited in this embodiment of this application.

For example, the data sent by the first terminal to the second terminal may be one or more of a PSCCH, a PSSCH, SCI, or a MAC PDU that is sent by the first terminal to the second terminal on the sidelink. The SCI includes first-level SCI, or the SCI includes first-level SCI and second-level SCI. The PSCCH is used to indicate a time-frequency domain resource location for PSSCH transmission, a modulation and coding scheme, a priority of data carried on a sidelink data channel (PhysicalSidelinkSharedCHannel, PSSCH), and the like. The PSSCH is used to carry the data.

In this embodiment of this application, when the second terminal performs sidelink communication on a PC5 interface, a discontinuous reception mechanism used may be referred to as a sidelink connectionless reception mechanism (SL DRX).

In this embodiment of this application, SL DRX of a terminal may be understood as SL DRX when the terminal is used as a receiver terminal, or may be understood as SL DRX between the terminal and a receiver terminal when the terminal is used as a sender terminal, or SL DRX between a source and a destination. The source is a sender terminal identified by a source layer-2 ID, and the destination is a receiver terminal identified by a destination layer-2 ID. Alternatively, the source is a sender terminal identified by a source layer-1 ID, and the destination is a receiver terminal identified by a destination layer-1 ID.

When in an SL DRX activated state, a terminal device of a receiver listens to or receives a PSCCH, a PSSCH, SCI, or a MAC PDU in an SL DRX active period.

The second terminal may also be understood as a destination, a terminal identified by a destination layer-2 ID or a destination layer-1 ID. The first terminal may also be understood as a source, a terminal identified by a source layer-2 ID or a source layer-1 ID.

Step 502: The first terminal sends the data to the second terminal on a first sidelink resource in the one or more sidelink resources. Correspondingly, the second terminal receives the data from the first terminal on the first sidelink resource. The first sidelink resource is located in the sidelink discontinuous reception-active time of the second terminal.

In this embodiment of this application, that the first sidelink resource is located in the sidelink discontinuous reception-active time of the second terminal may mean that a time domain location of the first sidelink resource is located in the sidelink discontinuous reception-active time, that is, a start location to an end location of the first sidelink resource are all located in the sidelink discontinuous reception-active time. Alternatively, some time domain locations of the first sidelink resource are located in the sidelink discontinuous reception-active time. For example, a start location to a specific middle location of the first sidelink resource are located in the sidelink discontinuous reception-active time, and a remaining time domain location is not in the sidelink discontinuous reception-active time.

Figure 6:
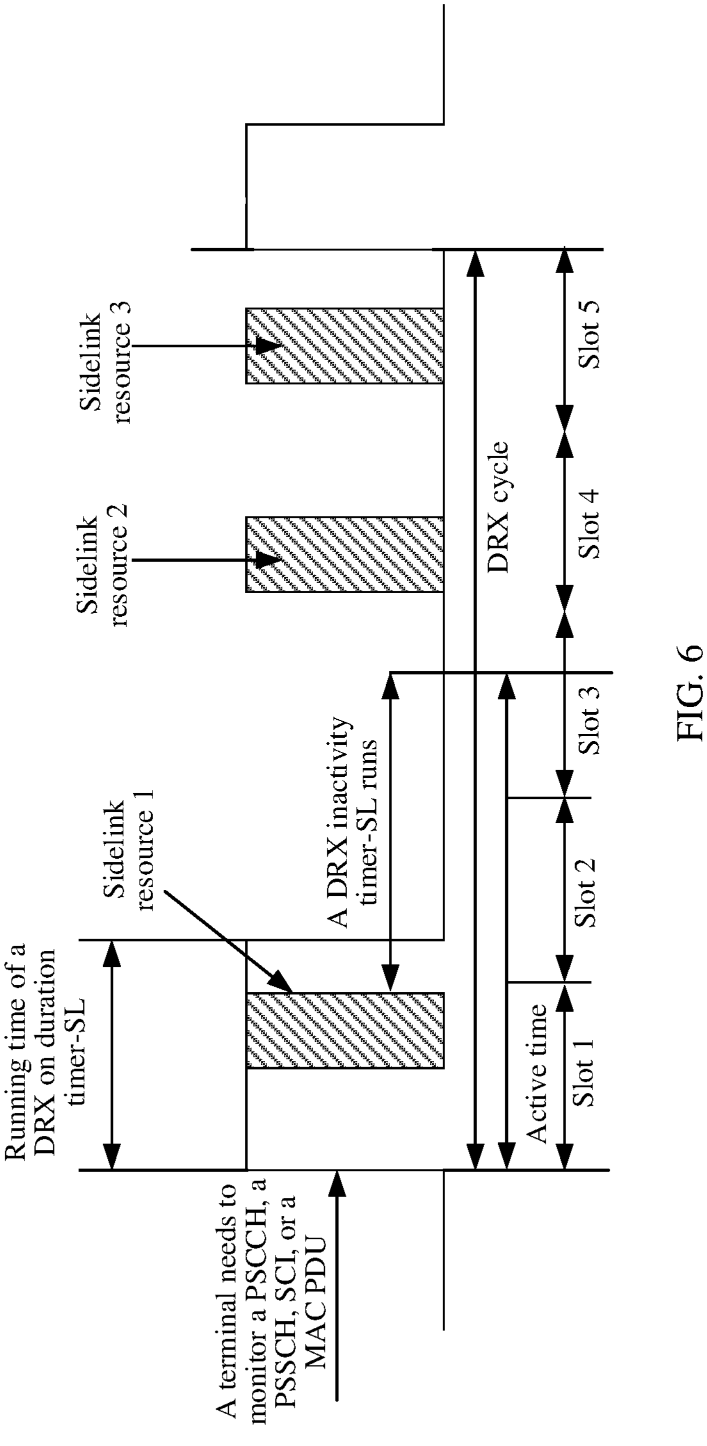
FIG. 6 is a schematic diagram of a relationship between a time domain location of a sidelink resource and a DRX cycle of a second terminal according to an embodiment of this application.

For example, as shown in FIG. 6, that the running period of the drx-onDurationTimer-SL of the second terminal includes a slot 1 and a slot 2 is used as an example. The one or more sidelink resources include a sidelink resource 1, a sidelink resource 2, and a sidelink resource 3. The sidelink resource 1 is located in the slot 1. The sidelink resource 2 and the sidelink resource 3 are respectively located in a slot 4 and a slot 5. Because the sidelink resource 1 is located in the sidelink discontinuous reception-active time, the first terminal may determine the sidelink resource 1 as the first sidelink resource.

In an example, when there are a plurality of sidelink resources located in the sidelink discontinuous reception-active time of the second terminal, the first terminal may determine the first sidelink resource based on priorities of the plurality of sidelink resources. For example, a sidelink resource with a highest priority in the plurality of sidelink resources located in the sidelink discontinuous reception-active time is determined as the first sidelink resource. Certainly, the first terminal may alternatively randomly select one sidelink resource from the plurality of sidelink resources located in the sidelink discontinuous reception-active time, and determine the sidelink resource as the first sidelink resource. This is not limited in this embodiment of this application.

This embodiment of this application provides the communication method. In the method, a first terminal first determines one or more sidelink resources. Then, the first terminal sends data to a second terminal on a first sidelink resource in the one or more sidelink resources. The first sidelink resource is located within sidelink discontinuous reception-active time of the second terminal, and the second terminal is in an activated state in the sidelink discontinuous reception-active time of the second terminal. Therefore, it can be ensured that when the first terminal sends the data on the first sidelink resource, the second terminal is in a state in which the data can be received. This not only can avoid a data transmission failure, but also can avoid wasting power consumption caused when the first terminal sends the data.

In an embodiment of this application, before step 502, the method provided in this embodiment of this application may further include: The first terminal determines the sidelink discontinuous reception-active time of the second terminal.

That the first terminal determines the sidelink discontinuous reception-active time of the second terminal may be implemented in the following manners.

Manner 1: The first terminal obtains the sidelink discontinuous reception-active time of the second terminal from the second terminal.

That the first terminal obtains the sidelink discontinuous reception-active time of the second terminal from the second terminal is classified into active obtaining and passive obtaining. Active obtaining means that the first terminal first sends a first request message to the second terminal. The first request message is used to request the sidelink discontinuous reception-active time of the second terminal. Then, the second terminal sends DRX configuration information of the second terminal to the first terminal. The DRX configuration information includes information used to determine the sidelink discontinuous reception-active time of the second terminal. For example, the information used to determine the discontinuous reception-active time of the sidelink of the second terminal is a discontinuous reception related parameter of the second terminal, for example, a DRX cycle, duration of the drx-onDurationTimer-SL, duration of the drx-InactivityTimer-SL, duration of the drx-Retransmission-Timer-SL, and a DRX start offset. Therefore, the first terminal may determine the sidelink discontinuous reception-active time of the second terminal based on the discontinuous reception related parameter.

Passive obtaining means that the first terminal may not send the first request message to the second terminal, and instead, the second terminal actively sends the DRX configuration information of the second terminal to the first terminal. For example, before determining that the second terminal needs to receive the data of the first terminal, the second terminal may first send the DRX configuration information of the second terminal to the first terminal.

Manner 2: The first terminal obtains the sidelink discontinuous reception-active time of the second terminal from a communication device that configures the DRX mechanism for the second terminal.

For example, the communication device may be a base station, or may be a terminal configured with the DRX mechanism. This is not limited in this embodiment of this application.

That the first terminal obtains the sidelink discontinuous reception-active time of the second terminal from a communication device in Manner 2 may also be classified into active obtaining and passive obtaining. For a specific implementation, refer to the foregoing manner in which the first terminal obtains the sidelink discontinuous reception-active time of the second terminal from the second terminal. Details are not described herein again.

To ensure that the first terminal can select, from the one or more sidelink resources, the sidelink resource located in the sidelink discontinuous reception-active time of the second terminal, and ensure reliability of sending data by the first terminal to the second terminal, in this embodiment of this application, a quantity of sidelink resources, located in a first time period, in the one or more sidelink resources is greater than or equal to a first threshold. A start moment of the first time period is a start moment corresponding to a candidate resource set, or a start moment of the first time period is a start moment of the sidelink discontinuous reception-active time or is later than a start moment of the sidelink discontinuous reception-active time. An end moment of the first time period is end time of the sidelink discontinuous reception-active time.

In an embodiment of this application, the first threshold may be a value predefined in a protocol. For example, the first threshold is a fixed value such as 2, 3, 4, or 5.

In an embodiment of this application, the first threshold is determined based on a total quantity of candidate sidelink resources in the first time period. For example, the first threshold is the total quantity of candidate sidelink resources in the first time period times M. M is greater than 0 and less than or equal to 1. M may be determined by the first terminal, predefined in the protocol, configured by a network device, or preconfigured. This is not limited in this embodiment of this application. For example, the first time period is [T1+n, T3], and the first threshold is determined by a total quantity of candidate sidelink resources, located in [T1+n, T3], in the candidate resource set times M. M may be determined by the first terminal, predefined in the protocol, configured by the network device, or preconfigured. This is not limited in this embodiment of this application. Herein, n represents a moment at which a MAC entity of the first terminal notifies a physical layer to sense sidelink resources. That is, the PHY layer of the first terminal receives, in a slot n, a request from the MAC entity to determine the one or more sidelink resources. T3 represents the end time of the discontinuous reception-active time. T1+n represents the start moment corresponding to the candidate resource set.

In this embodiment of this application, the candidate resource set includes s candidate sidelink resources, where s is an integer greater than or equal to 1. The following describes how the first terminal determines the candidate resource set.

For example, the first terminal determines the s candidate sidelink resources from sidelink resources as the candidate resource set based on a resource selection window of the first terminal. In this case, the start moment corresponding to the candidate resource set is a start moment of the resource selection window of the first terminal. Correspondingly, a start moment of a sidelink resource whose time domain location is earliest in the candidate resource set is later than or equal to the start moment of the resource selection window. An end moment corresponding to the candidate resource set is end time (for example, T2+n) of the resource selection window of the first terminal. That is, an end moment of a sidelink resource whose time domain location is latest in the candidate resource set should be earlier than or equal to T2+n.

For example, if [T1+n,T2+n] is used as the resource selection window of the first terminal, the first terminal may determine s sidelink resources located in [T1+n,T2+n] as candidate sidelink resources. T2+n represents the end time of the resource selection window. That is, an end moment of a sidelink resource whose time domain location is latest in the candidate resource set should be earlier than or equal to T2+n. The s sidelink resources include all sidelink resources in [T1+n,T2+n], and one sidelink resource is a resource of one frequency unit in one slot. Alternatively, the s sidelink resources include some sidelink resources in [T1+n,T2+n], for example, resources of some frequency units in some slots. The frequency unit may be L consecutive sub-channels, where L is an integer greater than or equal to 1.

For conditions met by T1 and T2, refer to the description in Table 1, or may be conditions described below. Details are not described herein again.

In a specific implementation, step 501 in this embodiment of this application may be implemented in the following manner: The first terminal uses all sidelink resources in the resource selection window (for example, [T1+n,T2+n]) as the candidate resource set. Then, the first terminal determines the one or more sidelink resources from the candidate resource set. Specifically, the physical layer of the first terminal determines the candidate resource set, and determines the one or more sidelink resources from the candidate resource set.

In an embodiment of this application, when T2+n is greater than or equal to T3 that is, the end moment corresponding to the candidate resource set is later than or equal to the end time of the sidelink discontinuous reception-active time, the quantity of sidelink resources, located in the first time period, in the one or more sidelink resources is greater than or equal to the first threshold.

For example, the candidate resource set includes 10 sidelink resources, the total quantity of sidelink resources, located in [T1+n,T3], in the 10 sidelink resources is 6, and M=0.5. In this case, the quantity of sidelink resources, located in [T1+n,T3], in the one or more sidelink resources should be greater than or equal to 3.

In a possible embodiment of this application, the one or more sidelink resources are sidelink resources determined from the candidate resource set, and the start moment corresponding to the candidate resource set is later than or equal to start time of the sidelink discontinuous reception-active time, or expressed as: The start time of the sidelink discontinuous reception-active time is earlier than or equal to the start moment corresponding to the candidate resource set. In this solution, to ensure that there is the sidelink resource located in the sidelink discontinuous reception-active time in the candidate resource set, so as to ensure that there is the sidelink resource located in the sidelink discontinuous reception-active time in the one or more sidelink resources subsequently determined from the candidate resource set, the first terminal may update the start moment corresponding to the candidate resource set.

For example, the first terminal sets the start moment corresponding to the candidate resource set to be later than or equal to the start time of the discontinuous reception-active time. Because the start moment corresponding to the candidate resource set is determined by T1+n the first terminal may adjust the condition met by T1 from $$0 \le T1 \le T_{proc,1}^{SL} \text{ to } T4 - n \le T1 \le T_{proc,1}^{SL},$$

where T4 is less than $$n + T_{proc,1}^{SL}.$$

If T4 is greater than or equal to $$n + T_{proc,1}^{SL},\ T1 = T4 - n.\ T4$$

represents the start time of the discontinuous reception-active time.

In a possible embodiment of this application, the end moment corresponding to the candidate resource set is earlier than or equal to the end time of the sidelink discontinuous reception-active time. This can ensure that the sidelink resource in the candidate resource set is earlier than or equal to the end time of the sidelink discontinuous reception-active time.

It should be noted that the candidate resource set meets one or more of the following conditions: The start moment is later than or equal to the start time of the sidelink discontinuous reception-active time, or the end moment is earlier than or equal to the end time of the sidelink discontinuous reception-active time.

When the start moment corresponding to the candidate resource set is later than or equal to the start time of the sidelink discontinuous reception-active time, and the end moment corresponding to the candidate resource set is earlier than or equal to the end time of the sidelink discontinuous reception-active time, it can be ensured that all sidelink resources in the candidate resource set are located in the sidelink discontinuous reception-active time.

In an example, the first terminal determines the start moment of the resource selection window based on start time of discontinuous reception-active time of the first terminal. Then, the first terminal determines, from the sidelink resources based on the start moment and the end time of the resource selection window, the s candidate sidelink resources in the resource selection window as the candidate resource set. The end time of the resource selection window is determined by T2+n.

In an embodiment of this application, the one or more sidelink resources are sidelink resources determined from the candidate resource set.

The end moment corresponding to the candidate resource set is earlier than or equal to retransmission end time of the data. Therefore, it can be ensured that there is a sidelink resource used to retransmit the data in the candidate resource set. For example, possible retransmission end time may be determined based on at least one of a quantity of retransmission times, duration of an RTT timer (timer), duration of a retransmission timer, and the end time of the discontinuous reception-active time. The RTT timer may be a drx-HARQ-RTT-Timer-SL. The retransmission timer may be a drx-RetransmissionTimer-SL.

For example, the first terminal sets the end moment corresponding to the candidate resource set to be earlier than or equal to the retransmission end time of the data. Because the end moment corresponding to the candidate resource set is determined by T2+n, the first terminal may adjust the condition met by T2 from $T2\ min \le T2 \le P$ to $T2\ min \le T2 \le$ the retransmission end time−n, or to $T2\ min \le T2 \cdot$min(the retransmission end time−n, P), where T2 min is less than the retransmission end time−n. If T2 min is greater than or equal to the retransmission end time−n, T2=the retransmission end time−n, or, T2=a minimum value in (the retransmission end time−n, P).

The foregoing describes the conditions met by the one or more sidelink resources and the conditions met by the start moment and the end moment that correspond to the candidate resource set. The following describes a process in which the physical (physical, PHY) layer and a medium access control (Medium Access Control, MAC) layer of the first terminal interact to determine the one or more sidelink resources.

Figures 7, 8, 9:
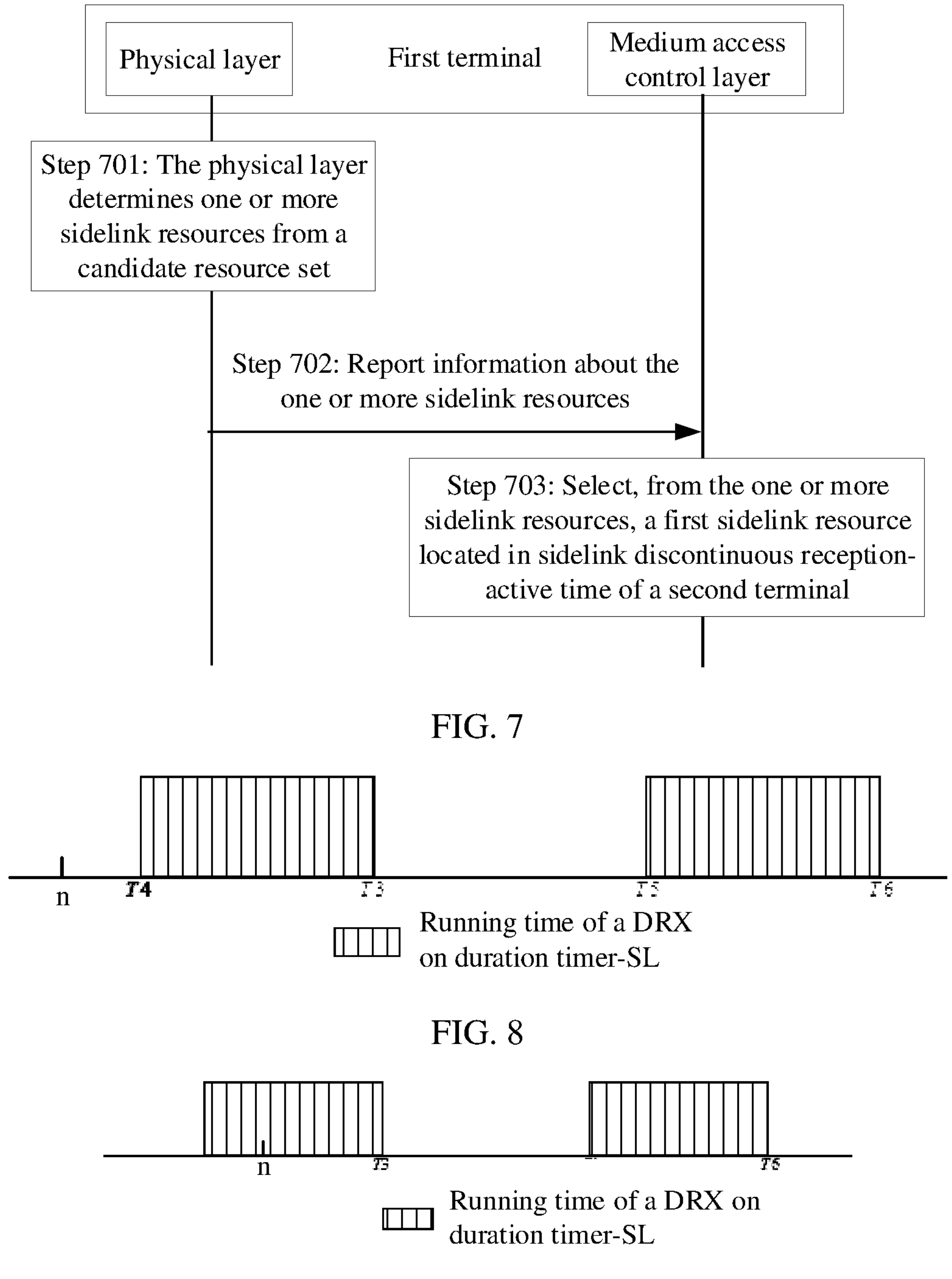
FIG. 7 is a schematic diagram of internal interaction of a first terminal according to an embodiment of this application.
FIG. 8 is a schematic diagram in which a moment n at which a MAC entity triggers a physical layer to sense a sidelink resource is before active time according to an embodiment of this application.
FIG. 9 is a schematic diagram in which a moment n at which a MAC entity triggers a physical layer to sense a sidelink resource is in active time according to an embodiment of this application.

In an embodiment of this application, the first terminal has the physical layer and a MAC entity. Correspondingly, as shown in FIG. 7, step 501 in this embodiment of this application may be implemented in the following manner.

Step 701: The physical layer of the first terminal determines the one or more sidelink resources from the candidate resource set.

In a possible embodiment of this application, before step 701, the method provided in this embodiment of this application may further include: The medium access control entity of the first terminal sends a sensing notification to the physical layer, where the sensing notification is used to notify the physical layer to sense the sidelink resource. That the medium access control entity of the first terminal sends a sensing notification to the physical layer may also be understood as that the MAC entity requires the physical layer to determine the one or more sidelink resources. The physical layer senses sidelink resources based on the sensing notification. The physical layer may determine candidate sidelink resources from the sidelink resources. In this embodiment of this application, the physical layer may sense the sidelink resources immediately or a preset time later after receiving the sensing notification, or may already sense the sidelink resources before receiving the sensing notification. The preset time may be determined by the first terminal, or may be predefined in the protocol. This is not limited in this embodiment of this application.

For example, the medium access control entity of the first terminal sends the sensing notification to the physical layer of the first terminal in a time unit 1. For example, the time unit 1 is n.

In a possible embodiment of this application, the physical layer may actively sense the sidelink resources. For example, when determining that the data needs to be transmitted, the physical layer may determine to sense the sidelink resources.

The following separately describes this application by using examples in which the medium access control entity provides first information for the physical layer or not when notifying the physical layer to sense the sidelink resources.

Example (1): The medium access control entity provides the first information for the physical layer.

In Example (1), in a possible embodiment of this application, before step 701, the method provided in this embodiment of this application may further include: the medium access control entity of the first terminal sends the first information to the physical layer of the first terminal. Correspondingly, the physical layer of the first terminal receives the first information from the medium access control entity of the first terminal.

The first information is used to determine the end time of the sidelink discontinuous reception-active time of the second terminal.

In an example, the first information is one or more of information used to indicate the end time of the sidelink discontinuous reception-active time or information used to indicate remaining time of the sidelink discontinuous reception-active time.

In an example, the first information and the sensing notification may be carried in a same message and sent to the PHY layer. For example, both the first information and the sensing notification are carried in a message 1, so that the first information and the sensing notification are simultaneously sent to the PHY layer.

In another example, the first information and the perception notification may alternatively be carried in different messages and sent to the PHY layer. This is not limited in this embodiment of this application. For example, the MAC entity first notifies the PHY layer to sense the sidelink resources, and then provides the first information for the PHY layer. Certainly, the MAC entity may first provide the first information for the PHY layer, and then notify the PHY to sense the sidelink resources.

For example, the information used to indicate the end time of the sidelink discontinuous reception-active time may be the end time of the sidelink discontinuous reception-active time, or a time length L. The time length L is provided, so that the physical layer determines the end time of the sidelink discontinuous reception-active time based on a current moment (for example, the time unit 1) and the time length L. The current moment may be understood as a moment at which the physical layer receives the time length L. It may be considered that a moment at which the medium access control entity sends the time length L to the physical layer is the moment at which the physical layer receives the time length L, and an error between receiving and sending may be ignored.

For example, the information used to indicate the remaining time of the sidelink discontinuous reception-active time may be the remaining time, or may be the end time of the sidelink discontinuous reception-active time. The end time of the sidelink discontinuous reception-active time is provided, so that the PHY layer selects, from the candidate resource set, a sidelink resource located before the end time of the sidelink discontinuous reception-active time.

For example, the MAC entity requires, in the slot n, the physical layer to determine a group of sidelink resources. For example, the MAC entity provides time Q for the physical layer. Q is the remaining time of the sidelink discontinuous reception-active time, and n+Q is the end time of the sidelink discontinuous reception-active time. It should be noted that the remaining time of the sidelink discontinuous reception-active time may be understood as remaining time of the sidelink discontinuous reception-active time determined at the current moment. Further, the sidelink discontinuous reception-active time is continuous discontinuous reception-active time.

For example, the first terminal may obtain periodic running time of the drx-onDurationTimer-SL based on the DRX cycle (cycle), the DRX start offset, and the duration of the drx-onDurationTimer-SL of the second terminal.

As shown in FIG. 8, in the slot n, the second terminal is in a dormant period, that is, the second terminal is not in the sidelink discontinuous reception-active time, but the drx-onDurationTimer-SL of the second terminal runs in a time period T4~T3 and a time period T5~T6. Therefore, the second terminal is in the sidelink discontinuous reception-active time in the time period T4~T3 and the time period T5~T6. Specifically, the second terminal is in the activated state in the discontinuous reception-active period. In the slot n, the MAC entity provides T3 or T3−n for the physical layer. T3 and T6 represent the end time of the sidelink discontinuous reception-active time, and T3−n represents the remaining time of the sidelink discontinuous reception-active time. In an embodiment shown in FIG. 8, the sidelink discontinuous reception-active time is the discontinuous reception-active period.

As shown in FIG. 9, in the slot n, the drx-onDurationTimer-SL of the second terminal is running, that is, a moment at which the MAC entity provides T3 or T3−n for the physical layer is located in the sidelink discontinuous reception-active time of the second terminal, and the MAC entity of the first terminal provides time T3 or T3−n for the physical layer in the slot n.

Figure 10:
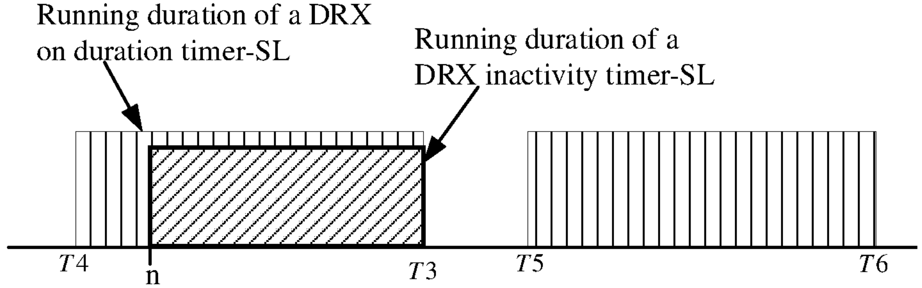
FIG. 10 is another schematic diagram in which a moment n at which a MAC entity triggers a physical layer to sense a sidelink resource is in active time according to an embodiment of this application.

As shown in FIG. 10, in the slot n, the drx-onDurationTimer-SL (DRX on duration timer-SL) of the second terminal is running, and the drx-InactivityTimer-SL (DRX inactivity timer-SL) is also running. A time period 1 is running time determined when the drx-InactivityTimer-SL is in the slot n. If the drx-InactivityTimer-SL is not restarted after the slot n, the drx-InactivityTimer-SL expires after the slot T3. The discontinuous reception-active time of the second terminal ends at T3. In the slot n, the MAC entity provides time T3 or T3−n for the physical layer.

Figure 11:
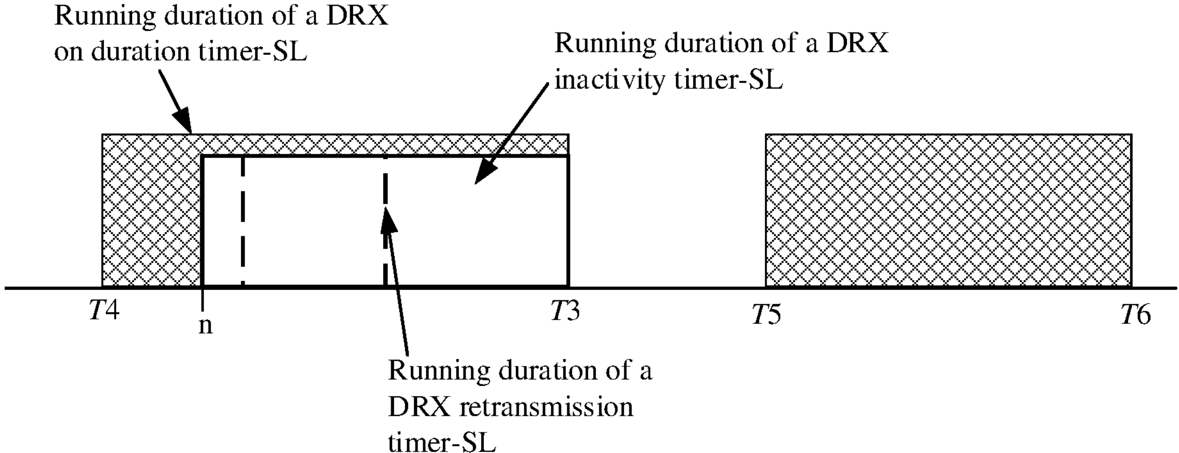
FIG. 11 to FIG. 12 are still another schematic diagrams of a relationship between a moment n at which a MAC entity triggers a physical layer to sense a sidelink resource and active time according to an embodiment of this application.

As shown in FIG. 11, in the slot n, the drx-onDurationTimer-SL is running, and the drx-InactivityTimer-SL is also running. A time period 2 is running time determined when the drx-InactivityTimer-SL is in the slot n. It may be determined that the drx-RetransmissionTimer-SL will run in the dashed box in the slot n. In this case, when the first terminal is in the slot n, it may be determined that the second terminal is not in the discontinuous reception-active time after T3. In the slot n, the MAC entity provides time T3 or T3−n for the physical layer.

In an embodiment of this application, when the MAC entity determines that the physical layer needs to sense sidelink resources, the MAC entity provides, for the first terminal, one or more of the information used to indicate the end time of the sidelink discontinuous reception-active time or the information used to indicate the remaining time of the sidelink discontinuous reception-active time.

In another embodiment of this application, the MAC entity may determine, based on a relationship between the remaining time of the sidelink discontinuous reception-active time and a remaining PDB, whether to provide, for the physical layer, one or more of the information used to indicate the end time of the sidelink discontinuous reception-active time or the information used to indicate the remaining time of the sidelink discontinuous reception-active time.

For example, when the remaining time (T3−n) of the sidelink discontinuous reception-active time is greater than or equal to the remaining (remaining) PDB, the MAC entity does not provide, for the physical layer, one or more of the information used to indicate the end time of the sidelink discontinuous reception-active time or the information used to indicate the remaining time of the sidelink discontinuous reception-active time. The information is not provided because T2 is less than or equal to the remaining PDB and an end of the resource selection window is earlier than an end of the sidelink discontinuous reception-active time. Therefore, the information does not need to be provided. The remaining PDB in this embodiment of this application may be the data sent by the first terminal to the second terminal on the sidelink.

For example, when the remaining time (T3−n) of the sidelink discontinuous reception-active time is less than or equal to the remaining (remaining) PDB, the MAC entity provides, for the physical layer, one or more of the information used to indicate the end time of the sidelink discontinuous reception-active time or the information used to indicate the remaining time of the sidelink discontinuous reception-active time.

When the medium access control entity provides the information related to the sidelink discontinuous reception-active time for the physical layer, it is convenient for the physical layer to select, from the candidate resource set, the sidelink resource located in the sidelink discontinuous reception-active time. This avoids a case in which the medium access control entity cannot determine the first sidelink resource for data transmission because the one or more sidelink resources reported by the physical layer to the medium access control entity do not include the sidelink resource located in the sidelink discontinuous reception-active time, and consequently, data transmission cannot be performed.

In Example (1), step 701 provided in this embodiment of this application may be implemented in the following manner: The physical layer determines the one or more sidelink resources from the candidate resource set based on the first information.

In an example, that the physical layer determines the one or more sidelink resources from the candidate resource set based on the first information includes: The physical layer selects, from the candidate resource set, a sidelink resource located before the end time of the sidelink discontinuous reception-active time, and determines the sidelink resource as the one or more sidelink resources.

It should be noted that, in this embodiment of this application, when the medium access control entity provides the first information for the physical layer, the physical layer refers to the first information when selecting one or more sidelink resources from the candidate resource set. Therefore, the one or more sidelink resources include a sidelink resource located before T3 and a sidelink resource located after T3. Alternatively, all of the one or more sidelink resources are located before T3.

Further, optionally, a sidelink resource included in the one or more sidelink resources further needs to be located after the time unit 1. This is because the physical layer determines, in the time unit 1, that sidelink resources need to be sensed, and there may be no reference value if a sidelink resource located before the time unit 1 is provided for the MAC entity. Therefore, the physical layer may not provide the sidelink resource located before the time unit 1 for the MAC entity of the first terminal. For example, the time unit 1 may be the slot n.

In an embodiment of this application, the one or more sidelink resources may be all or some sidelink resources in the candidate resource set. This is not limited in this embodiment of this application. The one or more sidelink resources may be reported by the PHY layer to the MAC entity one by one. Alternatively, the one or more sidelink resources may be reported by the PHY layer to the MAC entity in a unified manner. This is not limited in this embodiment of this application.

This helps the PHY layer of the first terminal determine the start moment of the sidelink discontinuous reception-active time of the second terminal, so as to ensure that there is the sidelink resource located in the sidelink discontinuous reception-active time in the one or more sidelink resources provided by the PHY layer for the MAC entity. In a possible embodiment of this application, the first information further includes information used to indicate the start time of the sidelink discontinuous reception-active time.

In an example, the information used to indicate the start time of the sidelink discontinuous reception-active time may be the start time of the sidelink discontinuous reception-active time, or the information used to indicate the start time of the sidelink discontinuous reception-active time may be the current moment+L1. L1 represents a time length from the current moment to the start time of the sidelink discontinuous reception-active time.

In a possible embodiment of this application, when the first information further includes the information used to indicate the start time of the sidelink discontinuous reception-active time, step 701 may be implemented through the following steps: The physical layer determines the sidelink discontinuous reception-active time based on the first information. Then, the physical layer determines the one or more sidelink resources from the candidate resource set based on the sidelink discontinuous reception-active time.

In a possible embodiment of this application, the MAC entity may provide, for the PHY layer, one or more of the information used to indicate the start time of the sidelink discontinuous reception-active time and the information used to indicate the end time of the sidelink discontinuous reception-active time.

In a possible embodiment of this application, when determining that the physical layer needs to sense sidelink resources, the MAC entity provides, for the PHY layer, the information used to indicate the start time of the sidelink discontinuous reception-active time.

In a possible embodiment of this application, the MAC entity determines, based on a relationship between the time unit 1 and the start time of the sidelink discontinuous reception-active time, whether to send, to the physical layer of the first terminal, the information used to indicate the start time of the sidelink discontinuous reception-active time. The time unit 1 is the moment at which the physical layer of the first terminal determines to sense the sidelink resources.

For example, when the time unit 1 is earlier than the start time of the sidelink discontinuous reception-active time, or the time unit 1 is the start time of the sidelink discontinuous reception-active time, the medium access control entity of the first terminal sends, to the physical layer of the first terminal, the information used to indicate the start time of the sidelink discontinuous reception-active time. This is because when the time unit 1 is earlier than the start time of the sidelink discontinuous reception-active time, it indicates that the second terminal is still in the DRX off state and has not entered the activated state from the DRX off state when the MAC entity notifies the PHY to sense the sidelink, and if the start time of the sidelink discontinuous reception-active time is not provided for the PHY layer of the first terminal, the one or more sidelink resources subsequently provided by the PHY layer for the MAC entity may include a sidelink resource located before the start time of the sidelink discontinuous reception-active time, but the sidelink resource located before the start time of the sidelink discontinuous reception-active time cannot carry the data sent to the second terminal.

With reference to FIG. 8, for example, the first terminal may obtain the periodic running time of the drx-onDurationTimer-SL based on the DRX cycle, the DRX start offset, and the duration of the drx-onDurationTimer-SL. In the slot n, the second terminal is not in SL active time (that is, the foregoing sidelink discontinuous reception-active time), but it is known that the drx-onDurationTimer-SL of the second terminal runs in the time period T4~T3 and the time period T5~T6. Therefore, the second terminal is in the sidelink discontinuous reception-active time in the time period T4~T3 and the time period T5~T6. In this case, in the slot n, the MAC entity provides T4 or $T_4$−n for the physical layer. T4−n represents a time length from the slot n to the start time of the sidelink discontinuous reception-active time.

For example, when the time unit 1 is later than the start time of the sidelink discontinuous reception-active time, or the time unit 1 is the start time of the sidelink discontinuous reception-active time, the medium access control entity of the first terminal does not send, to the physical layer of the first terminal, the information used to indicate the start time of the sidelink discontinuous reception-active time. This is because when the time unit 1 is later than the start time of the sidelink discontinuous reception-active time, it indicates that the second terminal is already in the activated state when the MAC entity notifies the PHY layer to sense the sidelink, and thus there is a relatively low probability that the one or more sidelink resources subsequently provided by the PHY layer for the MAC entity include a sidelink resource located before the time unit 1.

Still as shown in FIG. 9, the drx-onDurationTimer-SL is running in the slot n, that is, the second terminal is in the sidelink discontinuous reception-active time in the slot n. In this case, in the slot n, time of providing by the MAC entity for the physical layer is T4, T4−n or 0, or the MAC entity does not provide the start time of the sidelink discontinuous reception-active time for the physical layer.

Example (2): The medium access control entity does not provide the first information for the physical layer.

When the medium access control entity does not provide the first information for the physical layer, the physical layer does not consider the first information when selecting the one or more sidelink resources from the candidate resource set. Therefore, there may be the sidelink resource located in the sidelink discontinuous reception-active time in the one or more sidelink resources reported by the physical layer to the MAC entity. Alternatively, there may be no sidelink resource located in the sidelink discontinuous reception-active time in the one or more sidelink resources reported by the physical layer to the MAC entity.

If there is no sidelink resource located in the sidelink discontinuous reception-active time in the one or more sidelink resources reported by the physical layer to the MAC entity, the MAC entity may not select the resource located in the sidelink discontinuous reception-active time. In this case, the MAC entity does not select an initial transmission resource or a retransmission resource. Alternatively, the MAC entity may notify the physical layer to re-report sensed sidelink resources. This is not limited in this embodiment of this application.

In an embodiment of this application, if the time unit 1 in which the MAC entity requires the physical layer to determine a group of sidelink resources makes n+T1 not earlier than the start time of the sidelink discontinuous reception-active time, the MAC entity does not need to provide information about the start time of the sidelink discontinuous reception-active time for the physical layer. Details are as follows.

Figure 12:
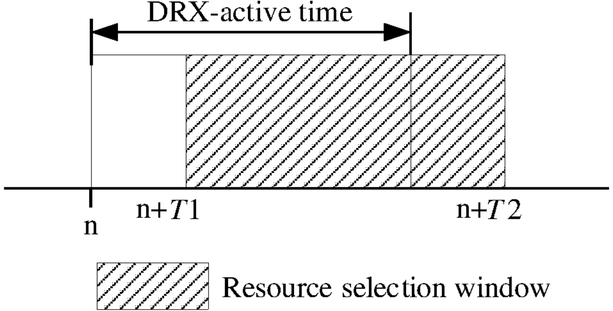

As shown in FIG. 12, for example, the time unit 1 is the slot n, and the slot n is in the discontinuous reception-active time. It can be learned from FIG. 12 that the start moment (n+T1) of the candidate resource set is later than the start time of the discontinuous reception-active time.

Figure 13:
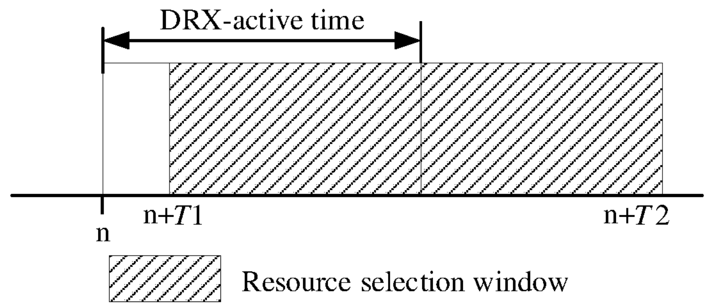
FIG. 13 is a schematic diagram of a relationship between a resource selection window and active time according to an embodiment of this application.

As shown in FIG. 13, the slot n is later than or equal to a slot that is T1 earlier than a start of the discontinuous reception-active time. For example, in FIG. 13, the slot n is equal to the slot that is T1 earlier than the start of the active time.

In a possible embodiment of this application, as described above, the PHY layer of the first terminal may determine, from the s candidate sidelink resources, the one or more sidelink resources to be reported to the MAC entity. In this case, when determining, from the s candidate sidelink resources, the one or more sidelink resources to be reported to the MAC entity, the PHY layer may refer to the following rule, so that a final quantity of sidelink resources, located in the first time period, in the one or more sidelink resources is greater than or equal to the first threshold.

For example, if n+T2 is greater than or equal to T3 (that is, the end moment of the candidate resource set is later than the end time of the discontinuous reception-active time), a quantity of sidelink resources, located in [n+T1, T3], in the one or more sidelink resources reported by the physical layer to the MAC entity needs to reach a specific value (the first threshold). For example, the first threshold may be obtained by multiplying M by a total quantity of candidate sidelink resources, located in [n+T1, T3], in the candidate resource set. If the physical layer determines that the quantity of sidelink resources, located in [n+T1, T3], in the one or more sidelink resources is less than the first threshold, the PHY layer increases an RSRP threshold for determining whether a candidate sidelink resource is excluded. The PHY layer determines, based on an increased RSRP threshold, the one or more sidelink resources to be reported to the MAC entity. The PHY layer may continuously increase the RSRP threshold until the quantity of resources, located in [n+T1, T3], in the one or more sidelink resources determined by the physical layer reaches this value.

Optionally, the one or more sidelink resources reported by the physical layer to the MAC entity further need to meet that a quantity of resources located in [T3+1, n+T2] is greater than or equal to the total quantity of candidate resources in [T3+1, n+T2] times M. If not met, this condition may be met by continuously increasing the RSRP threshold. Therefore, it can be ensured that a specific quantity of resources are available in the discontinuous reception-active time for the MAC entity to select a sidelink resource for initially transmitting the data and that a specific quantity of resources are available in the resource selection window for the MAC entity to select a sidelink resource for retransmitting the data.

Step 702: The physical layer reports information about the one or more sidelink resources to the medium access control entity of the first terminal.

As shown in FIG. 7, step 501 in this embodiment of this application may be implemented through the following step 703.

Step 703: The medium access control entity selects, from the one or more sidelink resources, the first sidelink resource located in the sidelink discontinuous reception-active time of the second terminal.

In an embodiment of this application, to ensure that the candidate resource set includes a sidelink resource used to retransmit the data, the method provided in this embodiment of this application further includes: The first terminal determines the retransmission end time of the data or remaining retransmission time of the data. The first terminal determines, based on the retransmission end time or the remaining retransmission time, the end moment corresponding to the candidate resource set. The end moment corresponding to the candidate resource set is earlier than or equal to the retransmission end time. That the end moment corresponding to the candidate resource set is earlier than or equal to the retransmission end time may be understood as follows: The end moment corresponding to the candidate resource set is earlier than the retransmission end time, or is the retransmission end time. Certainly, the end moment corresponding to the candidate resource set may alternatively be later than the retransmission end time. Therefore, it can be fully ensured that the candidate resource set includes the sidelink resource that can be used to retransmit the data before the retransmission end time. In this process, it may be considered that the first terminal re-determines the end moment corresponding to the candidate resource set.

It should be noted that, in this embodiment of this application, both the retransmission end time and the remaining retransmission time are time pre-estimated by the first terminal. In this case, the first terminal may not yet transmit the data to the second terminal for the first time. The retransmission end time may also be referred to as possible retransmission end time or latest retransmission end time. The retransmission end time may also be referred to as latest retransmission time, or may be referred to as possible latest retransmission time. The remaining retransmission time may also be referred to as possible remaining retransmission time or maximum remaining retransmission time. The possible remaining retransmission time is the possible retransmission end time−n.

For example, the MAC entity requires, in the slot n, the physical layer to determine the group of sidelink resources, and the physical layer uses resources in [T1+n,T2+n] as the s candidate sidelink resources. The s candidate sidelink resources form the candidate resource set. The physical layer determines, from the candidate resource set, the one or more sidelink resources to be reported to the MAC entity. If T2 min<the retransmission end time−n,T2 min<T2≤the retransmission end time−n. Otherwise, T2=the retransmission end time−n.

Alternatively, if T2 min<the retransmission end time−n, T2 min≤T2≤min(the retransmission end time−n, the remaining PDB). If T2 min is greater than or equal to the retransmission end time−n, and T2 min is greater than or equal to the remaining PDB, T2=min(the retransmission end time−n, the remaining PDB). If T2 min is greater than or equal to the retransmission end time−n, and T2 min is less than the remaining PDB, T2=the retransmission end time−n, or T2=min(the retransmission end time−n, the remaining PDB). If T2 min<the retransmission end time−n, and T2 min is greater than or equal to the remaining PDB, T2=the remaining PDB, or T2=min(the retransmission end time−n, the remaining PDB).

Alternatively, if T2 min<min(the retransmission end time−n, the remaining PDB), T2 min≤T2≤min(the retransmission end time−n, the remaining PDB). If T2 min is greater than or equal to min(the retransmission end time−n, the remaining PDB), T2=min(the retransmission end time−n, the remaining PDB).

The following describes a process in which the first terminal determines the retransmission end time of the data or the remaining retransmission time of the data by using interaction between the MAC entity and the physical layer of the first terminal as an example. For example, the medium access control entity sends second information to the physical layer, where the second information is used to indicate the retransmission end time of the data or used to indicate the remaining retransmission time of the data. That the first terminal determines the retransmission end time of the data or remaining retransmission time of the data includes: The physical layer of the first terminal determines the retransmission end time or the remaining retransmission time based on the second information.

It should be noted that the second information may be sent by the MAC entity of the first terminal to the PHY layer in the time unit 1, or sent by the MAC entity of the first terminal to the PHY layer after the time unit 1. The second information and the first information may be sent to the PHY layer together or separately. This is not limited in this embodiment of this application.

In an example, the second information includes the retransmission end time or the remaining retransmission time of the data. This prevents the PHY from calculating the retransmission end time or the remaining retransmission time of the data by itself. In this case, the MAC entity may determine the possible retransmission end time based on at least one of the quantity of retransmission times, the duration of the RTT timer, the duration of the retransmission timer, and the end time of the discontinuous reception-active time.

In another example, the second information is at least one of the quantity of retransmission times of the data, the duration of the RTT timer, and the duration of the retransmission timer. That the PHY layer determines the retransmission end time or the remaining retransmission time based on the second information may include: The PHY layer of the first terminal determines the retransmission end time or the remaining retransmission time of the data based on at least one of the quantity of retransmission times of the data, the duration of the RTT timer, and the duration of the retransmission timer. In this solution, the physical layer calculates the retransmission end time or the remaining retransmission time.

In a possible implementation of this application, the retransmission end time is equal to the end time of the sidelink discontinuous reception-active time+(the duration of the RTT timer+the duration of the retransmission timer)*the quantity of retransmission times. Alternatively, the retransmission end time is equal to the end time of the sidelink discontinuous reception-active time+the duration of the retransmission timer+the quantity of retransmission times. Alternatively, the retransmission end time is equal to end time of first data transmission+(the duration of the RTT timer+the duration of the retransmission timer)*the quantity of retransmission times. Alternatively, the retransmission end time is equal to end time of first data transmission+the duration of the retransmission timer+the quantity of retransmission times.

Figure 14:
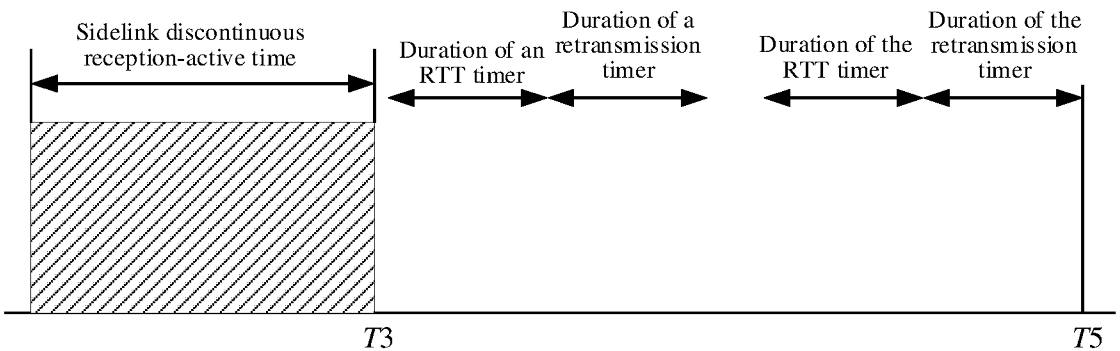
FIG. 14 is another schematic diagram of active time according to an embodiment of this application.

For example, as shown in FIG. 14, the quantity of retransmission times is 2, T3 is the end time of the sidelink discontinuous reception-active time, and T5 is the retransmission end time (or the latest retransmission end time). In this case, the end time of the candidate resource set may not be later than T5.

In a possible embodiment of this application, regardless of whether the remaining packet delay budget is less than a first value, that is, the MAC entity does not need to consider a relationship between the remaining packet delay budget and the first value, the medium access control entity provides a minimum value in the remaining packet delay budget and the retransmission end time for the physical layer.

In a possible embodiment of this application, the MAC entity determines, by considering the relationship between the remaining packet delay budget and the first value, whether to provide the minimum value in the remaining packet delay budget and the retransmission end time for the physical layer.

For example, if the remaining packet delay budget is less than the first value, or the remaining packet delay budget is less than the remaining retransmission time, the MAC entity does not provide the possible retransmission end time or the remaining retransmission time for the physical layer. The first value is the retransmission end time−n.

For example, if the remaining packet delay budget is less than the first value, or the remaining packet delay budget is less than the remaining retransmission time, the MAC entity provides the minimum value in the remaining PDB and the retransmission end time for the physical layer.

Step 703 may be implemented in the following manner.

The MAC entity selects the first sidelink resource from the one or more sidelink resources provided by the physical layer, so that the selected first sidelink resource is located in the sidelink discontinuous reception-active time. The sidelink discontinuous reception-active time in this embodiment of this application may be understood as including currently determined sidelink discontinuous reception-active time and possible sidelink discontinuous reception-active time. The possible sidelink discontinuous reception-active time is determined based on the selected first sidelink resource. There are several specific manners.

(1) The selected initial transmission resource (for example, the first sidelink resource) is in the currently determined sidelink discontinuous reception-active time, and if the retransmission resource (for example, a second sidelink resource) needs to be selected, the selected retransmission resource is in the currently determined sidelink discontinuous reception-active time or a possible running period of the retransmission timer. The possible running period of the retransmission timer is determined based on a resource before this resource. For example, one initial transmission resource and two retransmission resources are selected. In this case, a first running period of the retransmission timer is determined based on the initial transmission resource, and the first running period of the retransmission timer is determined based on the first retransmission resource. For example, one initial transmission resource and two retransmission resources are selected. In this case, the first retransmission resource may be indicated by SCI for initial transmission, and the second retransmission resource may be indicated by SCI for the first retransmission resource.

Currently, the terminal may determine, based on a time domain resource allocation field and a frequency domain resource allocation field that are included in SCI and a resource transmitted on a PSCCH, time domain and frequency domain resources for PSSCH transmission. The time domain resource allocation field indicates N resources and a slot offset of a resource in the N resources other than the first resource. N may be 1, 2, or 3. A slot in which the first resource is located is a slot in which the SCI is located. The slot offset of the resource other than the first resource is a slot offset relative to the first resource. The frequency domain resource allocation field indicates a quantity of consecutive sub-channels of each of the N resources, and a start sub-channel index of the resource other than the first resource. The N resources are used for N data transmissions.

Specifically, the MAC entity selects the sidelink resource from the one or more sidelink resources provided by the physical layer, so that the selected initial transmission resource is in the sidelink discontinuous reception-active time. If the retransmission resource needs to be selected, the retransmission resource may be indicated by previous SCI, or is in the currently determined sidelink discontinuous reception-active time or the possible running period of the retransmission timer. In a more specific manner, the MAC entity randomly selects one resource, as the first sidelink resource, from the sidelink resource, located in the sidelink discontinuous reception-active time, in the one or more sidelink resources provided by the physical layer. If at least one retransmission resource needs to be selected, the retransmission resource continues to be selected from one or more remaining sidelink resources provided by the physical layer, so that the selected initial transmission resource is in the sidelink discontinuous reception-active time, and the retransmission resource may be indicated by previous SCI, or is in the currently determined sidelink discontinuous reception-active time or the possible running period of the retransmission timer. The earliest resource in time is the initial transmission resource. Resource selection herein may be understood as selecting a resource of a transmission opportunity. The initial transmission resource may be understood as a resource of an initial transmission opportunity, and the retransmission resource may be understood as a resource of a retransmission opportunity. That a resource is in a possible running period of the retransmission timer may be understood as that a transmission opportunity corresponding to the resource is in the possible running period of the retransmission timer.

The initial transmission resource in this embodiment of this application is a resource used to transmit the data for the first time, that is, a resource used when the data is transmitted for the first time. The retransmission resource in this embodiment of this application is a resource used to transmit the data for the second time, that is, a resource used when the data is transmitted for the $X^{th}$ time. X is greater than or equal to 2.

In this embodiment of this application, the first terminal may determine a plurality of second sidelink resources, and a quantity of the second sidelink resources may be determined based on the quantity of retransmission times of the data. This is not limited in this embodiment of this application.

Possible running time of the retransmission timer may be determined based on the sidelink resource selected by the first terminal. For example, start time of running time of the retransmission timer may be a first time unit after a resource A ends. If the retransmission timer is a timer for a first retransmission, the resource A is a resource for initial transmission before the first retransmission. If the retransmission timer is a timer used in a $g^{th}$ retransmission, the resource A is a resource for retransmission before the $g^{th}$ retransmission, where g is an integer greater than or equal to 2. End time of the running time of the retransmission timer is a start of the running time of the retransmission timer+the duration of the retransmission timer−1. The possible running time of the retransmission timer may be further determined based on the selected first sidelink resource and the RTT timer. For example, the first terminal determines running time of the RTT timer based on the selected sidelink resource, a first time unit after the RTT timer expires is the start time of the running time of the retransmission timer, and the end time of the running time of the retransmission timer is the start of the running time of the retransmission timer+the duration of the retransmission timer−1. That the first terminal determines running time of the RTT timer based on the selected sidelink resource may be specifically as follows: The first terminal determines, based on the selected sidelink resource, a resource for a transmission carrying a HARQ feedback. A first time unit after the transmission carrying the HARQ feedback ends is start time of the running time of the RTT timer. End time of the running time of the RTT timer is a start of the running time of the RTT+the duration of the RTT timer−1. The time unit may be a symbol, a slot, a subframe, a millisecond, a frame, a mini-slot, or the like.

Figure 15:
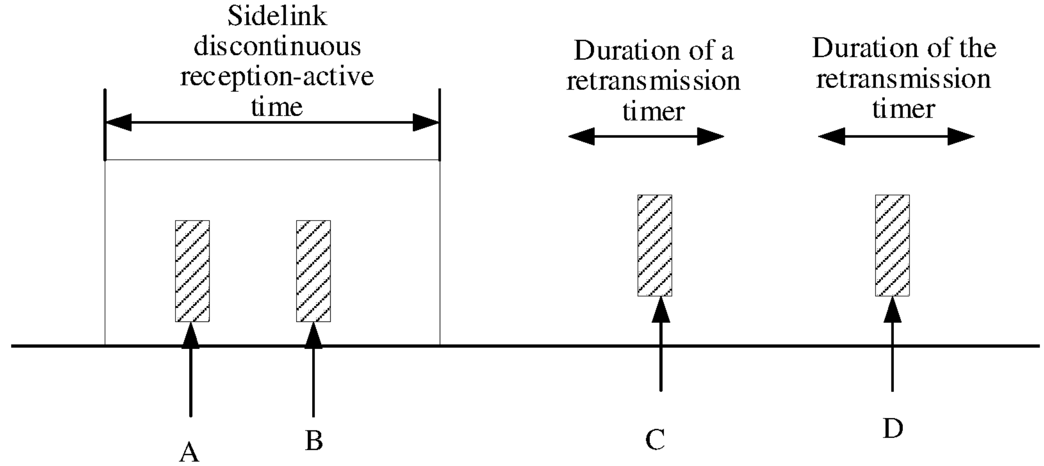
FIG. 15 is a schematic diagram of selecting a sidelink resource according to an embodiment of this application.

As shown in FIG. 15, the sidelink resource A, a sidelink resource B, a sidelink resource C, and a sidelink resource D represent sidelink resources selected by the MAC entity. The sidelink resource A is a sidelink resource whose time domain location is earliest in the four sidelink resources. The sidelink resource D is a sidelink resource whose time domain location is latest in the four sidelink resources. The sidelink resource A is the initial transmission resource. The sidelink resource B to the sidelink resource D are retransmission resources. The sidelink resource A and the sidelink resource B are in the currently determined sidelink discontinuous reception-active time. The sidelink resource C is in a running period of the retransmission timer determined based on the sidelink resource B. The sidelink resource D is in a running period of the retransmission timer determined based on the sidelink resource C.

That the retransmission resource may be indicated by previous SCI may be specifically that the retransmission resource may be indicated by a time domain resource allocation field in the previous SCI. If a resource may be indicated by previous SCI, an interval between a time domain location of the resource and a time domain location of the previous SCI needs to be less than or equal to a threshold. In a possible manner, a difference between a slot in which the resource is located and a slot in which the previous SCI is located is less than or equal to 31.

(2) The selected initial transmission resource is in the currently determined SL DRX-active time, and if the retransmission resource needs to be selected, the selected retransmission resource is in the currently determined sidelink discontinuous reception-active time or possible sidelink discontinuous reception-active time, where the possible sidelink discontinuous reception-active time is determined based on a resource before the resource. Specifically, the MAC entity selects the sidelink resource from the one or more sidelink resources provided by the physical layer, so that the selected initial transmission resource is in the sidelink discontinuous reception-active time. If the retransmission resource needs to be selected, the retransmission resource may be indicated by previous SCI, or is in the currently determined sidelink discontinuous reception-active time or the possible sidelink discontinuous reception-active time. In a more specific manner, the MAC entity randomly selects one sidelink resource, as the initial transmission resource, from the sidelink resource, located in the sidelink discontinuous reception-active time, in the one or more sidelink resources provided by the physical layer. If at least one retransmission resource needs to be selected, the resource continues to be selected from the remaining sidelink resources, except the initial transmission resource, in the one or more sidelink resources provided by the physical layer, so that the selected initial transmission resource is in the sidelink discontinuous reception-active time, and the retransmission resource may be indicated by previous SCI, or is in the currently determined sidelink discontinuous reception-active time or the possible sidelink discontinuous reception-active time. The earliest sidelink resource in time is the initial transmission resource. Selecting the sidelink resource herein may be understood as selecting a sidelink resource of a transmission opportunity. The initial transmission resource may be understood as a sidelink resource of an initial transmission opportunity, and the retransmission resource may be understood as a sidelink resource of a retransmission opportunity. That a sidelink resource is in the active time may be understood as that a transmission opportunity corresponding to the sidelink resource is in the sidelink discontinuous reception-active time.

The possible active time includes the possible running period of the retransmission timer in (1) and a possible running period of another timer, for example, a possible running period of the drx-InactivityTimerSL. The possible running period of the drx-InactivityTimerSL is determined based on the selected initial transmission resource. For example, the drx-InactivityTimerSL is started/restarted in a first time unit after the initial transmission resource ends, and expires after the duration of the drx-InactivityTimerSL.

Figure 16:
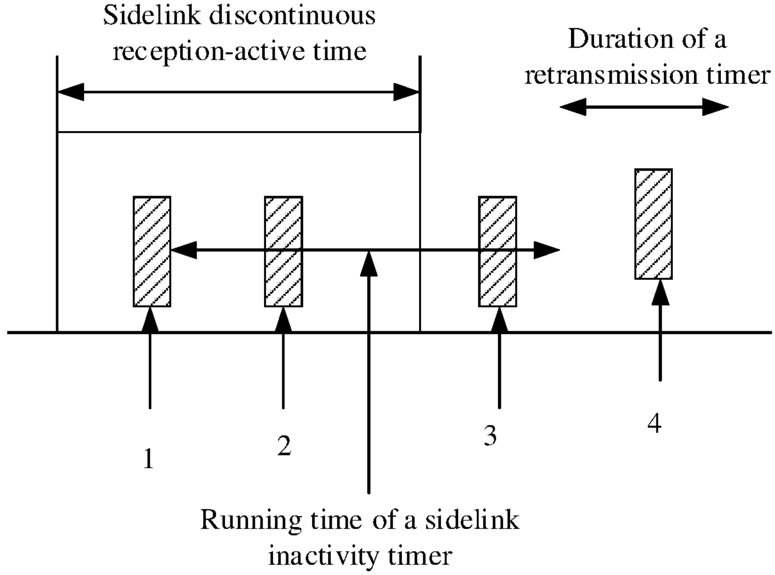
FIG. 16 is another schematic diagram of selecting a sidelink resource according to an embodiment of this application.

As shown in FIG. 16, the sidelink resource 1 to a sidelink resource 4 are sidelink resources selected by the MAC entity. The sidelink resource 1 is the initial transmission resource. The sidelink resource to the sidelink resource 4 are retransmission resources. The sidelink resource 1 and the sidelink resource 2 are in the currently determined sidelink discontinuous reception-active time. The sidelink resource 3 is located in a running period of the drx-InactivityTimerSL determined by the first terminal based on the sidelink resource 1. The sidelink resource 4 is located in a running period of the retransmission timer determined by the first terminal based on the sidelink resource 3.

Optionally, the sidelink resource selected by the MAC entity from the one or more sidelink resources provided by the physical layer further needs to meet that a time interval between any two selected sidelink resources is greater than or equal to a minimum time interval. Optionally, if a PSFCH resource is configured in a resource pool in which the resource is located, the foregoing condition about the minimum time interval needs to be met. For example, a time interval between the first sidelink resource and the second sidelink resource is greater than or equal to the minimum time interval.

A possible case is that the MAC entity may not select, from the one or more sidelink resources provided by the physical layer, X retransmission resources that meet the foregoing condition. X is the quantity of retransmission times determined by the MAC entity, and X is greater than or equal to 1. In this case, the MAC entity selects at most N retransmission resources capable of meeting the foregoing condition, where N is greater than or equal to 0.

In a possible embodiment of this application, the first terminal needs to send data to a plurality of destinations. The destination may be a destination selected by the first terminal for an SL grant according to an LCP process, specifically a destination of which at least one of a logical channel (logical channel, LCH) and a MAC CE has a highest priority in all logical channels and MAC CEs that meet a condition. The condition includes that SL data in the destination is transmittable.

Alternatively, the destination may be a destination to which data is to be transmitted. SL DRX-active time of the destination is determined based on active time of at least one destination to which data is to be transmitted, for example, is a union set or an intersection set of the active time of the destination to which the data is to be transmitted.

In a possible embodiment of this application, the first terminal may first determine the destination. For example, if there are a plurality of destinations of to-be-transmitted data, the first terminal may select a target destination from the plurality of destinations of the to-be-transmitted data (the plurality of destinations of the to-be-transmitted data may belong to a same terminal, or may belong to different terminals, and this is not limited in this embodiment of this application). For example, if the target destination is identified by a layer-2 ID of the second terminal, the first terminal may determine that a sidelink resource needs to be selected to send the data to the second terminal. Then, the first terminal selects, from the one or more sidelink resources based on the SL DRX-active time of the second terminal, the sidelink resource located in the SL DRX-active time as the first sidelink resource. Then, the first terminal sends the data to the second terminal on the first sidelink resource. For a manner in which the first terminal may select the target destination from the plurality of destinations of the to-be-transmitted data, refer to the foregoing descriptions. Details are not described herein again in this embodiment of this application.

It should be noted that when the second terminal has a plurality of destinations of to-be-transmitted data, the first terminal may also select a target destination with reference to the foregoing rule.

A DRX parameter considered when the MAC entity selects the first sidelink resource from the one or more sidelink resources provided by the physical layer may be a DRX parameter of a destination selected for an SL grant according to the LCP process, specifically a destination of which at least one of a logical channel (logical channel, LCH) and a MAC CE has a highest priority in all logical channels and MAC CEs that meet a condition. Alternatively, the destination may be a destination to which data is to be transmitted, and at least one resource provided by the physical layer is in SL DRX-active time of the destination. A destination of which at least one of a logical channel (logical channel, LCH) and a MAC CE has a highest priority in logical channels and MAC CEs of all destinations that meet the foregoing condition is selected.

In this application, a DRX state/active time/timer running state or the like of the destination may be understood as a DRX state/active time/timer running state maintained by the first terminal for the destination. Further, the DRX parameter/state/active time/timer running state or the like of the destination may be a DRX parameter/state/active time/timer running state of a source and the destination pair.

When a destination is selected for an SL grant in the LCP process, the SL grant further needs to be in SL DRX-active time of the destination. That is, a destination of which at least one of an LCH and a MAC CE has a highest priority in all logical channels and MAC CEs that meet the condition is selected from destinations with DRX-active time that the SL grant is in.

Figure 17:
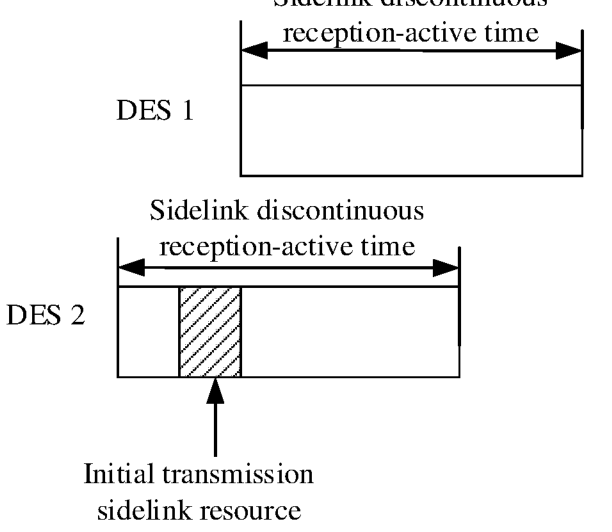
FIG. 17 is a schematic diagram in which an initial transmission resource is located in active time according to an embodiment of this application.

As shown in FIG. 17, an example in which destinations are DES 1 and DES 2 is used, and the destination selected by the first terminal is DES 2. Subsequently, the first terminal may select a sidelink resource located in DRX-active time of DES 2 to initially transmit data to be sent to DES 2.

In another embodiment of this application, the first terminal may determine the second terminal in the following manner. For example, the first terminal may first select an SL grant, and then determine, from the one or more sidelink resources, the first sidelink resource indicated by the SL grant. The first terminal determines a time range of the first sidelink resource. Then, the first terminal determines a first destination from the plurality of destinations of the to-be-transmitted data. Active time of the first destination includes the time range of the first sidelink resource. In other words, the time range of the first sidelink resource is in the SL DRX-active time of the first destination.

If a plurality of destinations include the time range of the first sidelink resource, the first terminal may determine the first destination from the plurality of destinations based on priorities of the plurality of destinations. It should be noted that the priority of the destination may also be considered as a priority of data transmitted on the destination.

Figure 18:
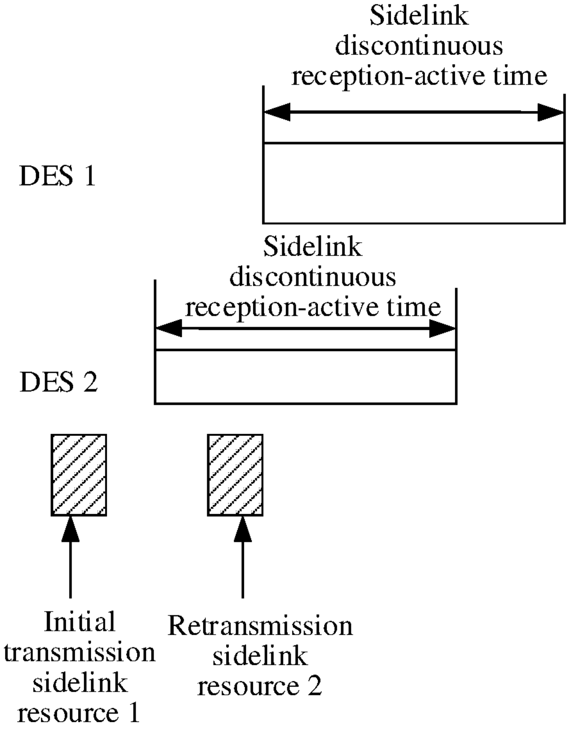
FIG. 18 is a schematic diagram in which an initial transmission resource is located outside active time and a retransmission resource is located in the active time according to an embodiment of this application.

For example, as shown in FIG. 18, a time range of a sidelink resource (for example, the initial transmission sidelink resource 1) selected by the first terminal does not overlap SL DRX-active time of DES 1 and DES 2. That is, neither DES 1 nor DES 2 is in the SL DRX-active time in the time range of the sidelink resource selected by the first terminal. In this case, the first terminal does not generate a MAC PDU. Therefore, an SL grant corresponding to the initial transmission sidelink resource 1 selected by the first terminal is not used.

In an existing standard, for a retransmission grant, a HARQ entity indicates a sidelink process to trigger retransmission, and the sidelink process notifies the physical layer to transmit SCI and generate a transmission. If no MAC PDU is generated during initial transmission, for the retransmission grant, the sidelink process cannot transmit the SCI and data. As shown in FIG. 18, even if the retransmission sidelink resource 2 is in the SL DRX-active time of DES 2, the first terminal does not perform transmission on the retransmission sidelink resource 2. In other words, the second terminal does not use a retransmission grant corresponding to the retransmission sidelink resource 2.

If the retransmission grant is not in the active time of the destination of the MAC PDU, the transmitted SCI and data may not be received by the destination. Therefore, if no MAC PDU is generated for the initial transmission grant, transmission is not performed on the corresponding retransmission grant.

Figure 19:
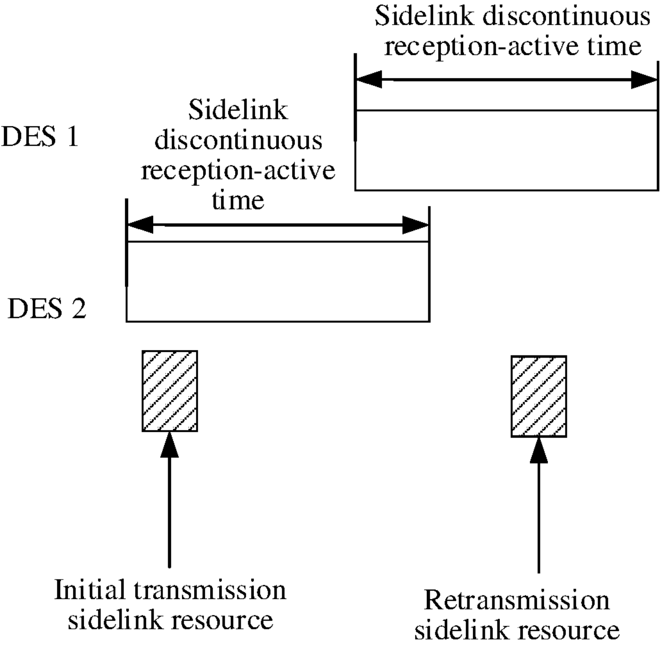
FIG. 19 is a schematic diagram in which an initial transmission resource is located in active time and a retransmission resource is located outside the active time according to an embodiment of this application.

In another possible embodiment of this application, as shown in FIG. 19, if no MAC PDU is generated during initial transmission, for a retransmission grant, if the retransmission grant is not in the SL DRX-active time of the selected destination (DES 2), the retransmission grant is not used. The retransmission grant corresponding to the initial transmission grant is a grant used to transmit a same MAC PDU/TB as the initial transmission grant.

If no MAC PDU is generated for the initial transmission grant, there are the following processing manners for the retransmission grant.

(1) If not obtaining the MAC PDU of the initial transmission grant, the MAC entity clears PSCCH duration and PSSCH duration that correspond to the retransmission grant associated with the initial transmission grant. Alternatively, if not obtaining the MAC PDU of the initial transmission grant, the MAC entity clears the retransmission grant associated with the initial transmission grant. Alternatively, if the MAC entity does not transmit data on the initial transmission grant, the MAC entity clears PSCCH duration and PSSCH duration that correspond to the retransmission grant associated with the initial transmission grant. Alternatively, if the MAC entity does not transmit data on the initial transmission grant, the MAC entity clears the retransmission grant associated with the initial transmission grant.

(2) If an SL grant can be used to transmit retransmission of a MAC PDU, and a transmission resource indicated by the SL grant is not in SL DRX-active time of a destination corresponding to the MAC PDU, the MAC entity clears PSCCH duration and PSSCH duration that correspond to the grant, or clears the grant.

(3) If a HARQ buffer associated with a sidelink process associated with a retransmission grant is not empty, and a transmission resource indicated by the SL grant is in SL DRX-active time of a destination corresponding to a MAC PDU, the HARQ entity delivers the grant to the sidelink process to indicate the sidelink process to trigger a retransmission. If a HARQ buffer associated with a sidelink process associated with a retransmission grant is empty, or a transmission resource indicated by the SL grant is not in SL DRX-active time of a destination corresponding to a MAC PDU, the HARQ entity does not deliver the grant to the sidelink process, and does not indicate the sidelink process to trigger a retransmission.

(4) If a HARQ buffer associated with a sidelink process is not empty, and a transmission resource indicated by a stored SL grant is in SL DRX-active time of a destination corresponding to a MAC PDU, the sidelink process indicates the physical layer to transmit SCI based on the stored SL grant. If a HARQ buffer associated with a sidelink process is empty, or a transmission resource indicated by a stored SL grant is not in SL DRX-active time of a destination corresponding to a MAC PDU, the sidelink process does not indicate the physical layer to transmit SCI based on the stored SL grant.

To enable the sidelink process to determine whether the SL grant is in the SL DRX-active time of the destination, the HARQ entity provides/delivers destination information of the MAC PDU to the sidelink process, for example, a destination layer-2 ID, a source and destination pair, a source layer-2 ID and destination layer-2 ID pair, or a source layer-1 ID and destination layer-1 ID pair.

In the foregoing solution, if the initial transmission grant is not used, the retransmission grant is not used either. This can avoid a waste of power consumption when the PSCCH, the PSSCH, the SCI, or the MAC PDU is sent when the destination does not listen to the PSCCH, the PSSCH, the SCI, or the MAC PDU.

In another embodiment of this application, if the time domain location of the first sidelink resource indicated by the initial transmission SL grant selected by the first terminal is not in the SL DRX-active time of the second terminal, but the time domain location of the sidelink resource indicated by the retransmission SL grant is in the SL DRX-active time of the second terminal, the first terminal may send the data to the second terminal by using the sidelink resource indicated by the retransmission SL grant.

When a destination is selected for an SL grant in the LCP process, at least one of an initial transmission SL grant and a corresponding retransmission SL grant needs to be in SL DRX-active time of the destination. That is, a destination of which at least one of a logical channel (logical channel, LCH) and a MAC CE has a highest priority in all logical channels and MAC CEs that meet the condition is selected from destinations with SL DRX-active time that at least one of the initial transmission SL grant and the retransmission SL grant is in. If no destination meets the condition, no MAC PDU is generated. As a result, the initial transmission SL grant is not used. If a grant is not in SL DRX-active time of a selected destination, the grant is not used.

On the other hand, if no MAC PDU is generated for the initial transmission grant, there are the following processing manners for the initial transmission grant and the retransmission grant.

(1) If the transmission resource indicated by the initial transmission SL grant is in the SL DRX-active time of the destination corresponding to the MAC PDU, the HARQ entity indicates the sidelink process to trigger a new transmission. If the transmission resource indicated by the initial transmission SL grant is not in the SL DRX-active time of the destination corresponding to the MAC PDU, the HARQ entity does not indicate the sidelink process to trigger a new transmission. If the transmission resource indicated by the initial transmission SL grant is not in the SL DRX-active time of the destination corresponding to the MAC PDU, the HARQ entity delivers the MAC PDU and the initial transmission SL grant to the sidelink process.

(2) If a HARQ buffer associated with a sidelink process associated with a retransmission grant is not empty, and a transmission resource indicated by the SL grant is in SL DRX-active time of a destination corresponding to a MAC PDU, the HARQ entity delivers the grant to the sidelink process to indicate the sidelink process to trigger a retransmission. If a HARQ buffer associated with a sidelink process associated with a retransmission grant is empty, or a transmission resource indicated by the SL grant is not in SL DRX-active time of a destination corresponding to a MAC PDU, the HARQ entity does not deliver the grant to the sidelink process, and does not indicate the sidelink process to trigger a retransmission.

(3) If a HARQ buffer associated with a sidelink process is not empty, and a transmission resource indicated by a stored SL grant is in SL DRX-active time of a destination corresponding to a MAC PDU, the sidelink process indicates the physical layer to transmit SCI based on the stored SL grant. If a HARQ buffer associated with a sidelink process is empty, or a transmission resource indicated by a stored SL grant is not in SL DRX-active time of a destination corresponding to a MAC PDU, the sidelink process does not indicate the physical layer to transmit SCI based on the stored SL grant.

To enable the sidelink process to determine whether the SL grant is in the SL DRX-active time of the destination, the HARQ entity provides/delivers destination information of the MAC PDU to the sidelink process, for example, a destination layer-2 ID, a source and destination pair, a source layer-2 ID and destination layer-2 ID pair, or a source layer-1 ID and destination layer-1 ID pair.

Figure 20:
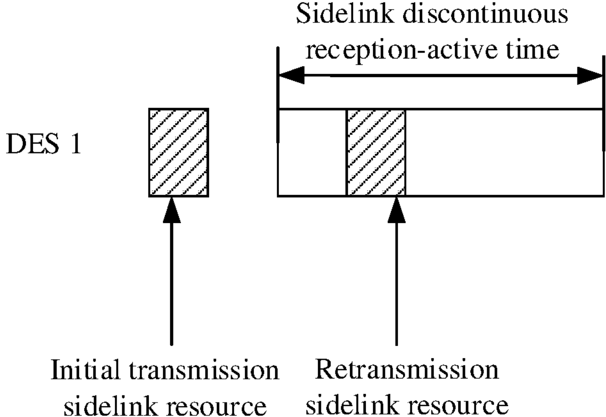
FIG. 20 is another schematic diagram in which an initial transmission resource is located outside active time and a retransmission resource is located in the active time according to an embodiment of this application.

As shown in FIG. 20, for example, the initial transmission sidelink resource indicated by the initial transmission grant selected by the terminal is not in the SL DRX-active time of DES 1, but the retransmission sidelink resource indicated by the retransmission grant selected by the terminal is in the SL DRX-active time of DES 1. Although the terminal does not transmit the data by using the initial transmission grant, the terminal may transmit the data by using the retransmission grant.

This avoids a waste of power consumption when the PSCCH, the PSSCH, the SCI, or the MAC PDU is sent when the destination does not listen to the PSCCH, the PSSCH, the SCI, or the MAC PDU.

In an embodiment of this application, an embodiment of this application provides a resource selection/reselection triggering method. The method includes the following steps.

Step A1: A first terminal determines one or more sidelink resources Y used to initially transmit data.

The sidelink resource Y used to initially transmit the data is indicated by an initial transmission grant.

Step B1: If the first terminal determines that there is no sidelink resource whose time domain location is located in DRX-active time of a second terminal in the one or more sidelink resources Y, the first terminal determines to trigger resource selection/reselection.

Step A1 and step B1 may be considered as a resource (re-)selection trigger condition of the first terminal. Check of the resource (re-)selection trigger condition is performed in a MAC entity. In another possible manner, check is performed in an LCP process: If there is no sidelink resource Y used to initially transmit the data in DRX-active time of a destination (for example, the second terminal) to which data is to be transmitted, resource selection/reselection is triggered.

It should be noted that the second terminal may be a specific terminal. For example, if there is no sidelink resource located in the DRX-active time of the second terminal, but there is a sidelink resource located in a DRX-active time of another terminal, the first terminal may select to trigger resource reselection, or may not trigger resource selection/reselection. However, if the second terminal represents one or more terminals, and the one or more sidelink resources Y do not include a sidelink resource located in DRX-active time of any one of the one or more terminals, the first terminal may select to trigger resource reselection.

In an embodiment of this application, an embodiment of this application provides a resource selection/reselection triggering method. The method includes the following steps.

Step A2: A first terminal determines one or more sidelink resources Y used to initially transmit data and sidelink resources Z for retransmission.

Step B2: If the first terminal determines that there is no sidelink resource, whose time domain location is located in DRX-active time of a second terminal and which is used for initial transmission, in the one or more sidelink resources Y, and that there is no sidelink resource, which is located in the DRX-active time and used for retransmission, in the sidelink resources Z for retransmission, the first terminal determines to trigger resource selection/reselection.

Check of a resource selection/reselection (Resource (re-) selection) trigger condition described in step A2 and step B2 is performed in a MAC entity. In another possible manner, check is performed in an LCP process: If neither a sidelink resource for initial transmission (an initial transmission SL grant) nor a sidelink resource for retransmission (for example, a sidelink resource indicated by a retransmission SL grant) is in the SL DRX-active time of the second terminal, resource selection/reselection is triggered.

It should be noted that the solution described in step A1 to step B2 or step A2 to step B2 may be used as an independent embodiment. Certainly, the solution described in step A1 to step B1 may alternatively be used in combination with the solution described in FIG. 5. The solution described in step A2 to step B2 may alternatively be used in combination with the solution described in FIG. 5. When used in combination, the solution described in step A1 to step B2 or step A2 to step B2 may be considered as the condition for triggering resource selection/reselection by the first terminal.

The foregoing mainly describes the solutions in embodiments of this application from a perspective of network element. It can be understood that, to implement the foregoing functions, each network element, for example, the first terminal, includes corresponding hardware structures and/or software modules for performing the functions. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, function unit division may be performed on the first terminal according to examples of the foregoing method. For example, function units may be obtained through division based on corresponding functions, or two or more functions may be integrated into a processing unit. The integrated unit may be implemented in a form of hardware, or may be implemented in a form of a software function unit. It should be noted that, division of the units in embodiments of this application is merely an example, and is only division of logical functions. Another division manner may be available in actual implementation.

The foregoing describes the method in embodiments of this application with reference to FIG. 5 to FIG. 20. The following describes a communication apparatus provided in embodiments of this application to perform the foregoing method. A person skilled in the art may understand that the method and the apparatus may be mutually combined and referenced, and the communication apparatus provided in embodiments of this application may perform the steps performed by the first terminal in the foregoing communication method.

Figure 21:
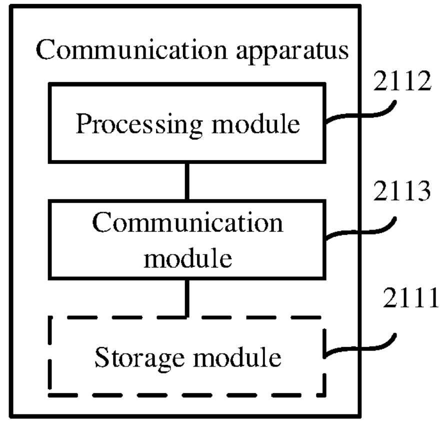
FIG. 21 is a schematic diagram depicting a structure of a communication apparatus according to an embodiment of this application.

When an integrated unit is used, FIG. 21 shows the communication apparatus included in the foregoing embodiments. The communication apparatus may include a communication module 2113 and a processing module 2112.

In an optional implementation, the communication apparatus may further include a storage module 2111, configured to store program code and data of the communication apparatus.

In an example, the communication apparatus is a first terminal, or a chip applied to the first terminal. In this case, the communication module 2113 is configured to support the communication apparatus in communicating with an external network element (for example, a second terminal). For example, the communication module 2113 is configured to perform receiving and sending operations of the first terminal in the foregoing method embodiment. The processing module 2112 is configured to perform processing operations of the first terminal in the foregoing method embodiment.

For example, the communication module 2113 is configured to perform a sending action performed by the first terminal in step 501 in FIG. 5 in the foregoing embodiment. The processing module 2112 is configured to support the communication apparatus in performing a processing action performed by the first terminal in the foregoing embodiment, for example, step 502.

It should be noted that the communication module 2113 shown in FIG. 21 may be alternatively replaced with a communication unit, and the processing module 2112 may be alternatively replaced with reference to a processing unit. Alternatively, the storage module 2111 may be replaced with a storage unit. The processing unit is configured to control and manage an action of the communication apparatus. For example, the processing unit is configured to perform an information/data processing step that is performed at the communication apparatus. The communication unit is configured to support the communication apparatus in performing an information/data sending or receiving step.

In a possible implementation, the communication unit may include a receiving unit and a sending unit. The receiving unit is configured to receive a signal. The sending unit is configured to send a signal.

The processing module 2112 may be a processor or a controller, for example, may be a central processing unit, a general-purpose processor, a digital signal processor, an application-specific integrated circuit, a field-programmable gate array or other programmable logic devices, a transistor logic device, a hardware device, or any combination thereof. The processor may implement or perform various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communication module may be a transceiver, a transceiver circuit, a communication interface, or the like. The storage module may be a memory.

When the processing module 2112 is a processor 21 or a processor 25, the communication module 2113 is a transceiver 23, and the storage module 2111 is a memory 22, the communication apparatus in this application may be the communication device shown in FIG. 2.

The foregoing communication module may be a communication interface of the apparatus, and is configured to receive a signal from another apparatus. For example, when the apparatus is implemented in a manner of a chip, the communication module is a communication interface of the chip, configured to receive a signal from another chip or apparatus or send a signal.

Figure 22:
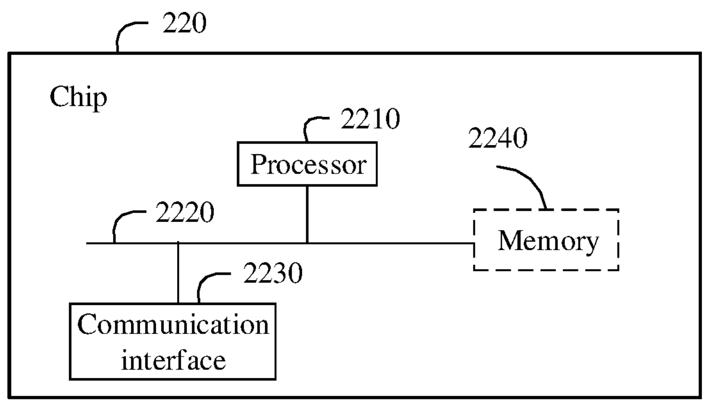
FIG. 22 is a schematic diagram depicting a structure of a chip according to an embodiment of this application.

FIG. 22 is a schematic diagram depicting a structure of a chip 220 according to an embodiment of this application. The chip 220 includes one or more (including two) processors 2210 and a communication interface 2230.

Optionally, the chip 220 further includes a memory 2240. The memory 2240 may include a read-only memory and a random access memory, and provide an operation instruction and data for the processor 2210. A part of the memory 2240 may further include a non-volatile random access memory (non-volatile random access memory, NVRAM).

In some implementations, the memory 2240 stores the following elements: executable modules or data structures, or subsets thereof, or extended sets thereof.

In this embodiment of this application, the operation instruction (the operation instruction may be stored in an operating system) stored in the memory 2240 is invoked to perform a corresponding operation.

The processor 2210 controls a processing operation of the first terminal. The processor 2210 may also be referred to as a central processing unit (central processing unit, CPU).

The memory 2240 may include a read-only memory and a random access memory, and provides instructions and data for the processor 2210. A part of the memory 2240 may further include an NVRAM. For example, in application, the memory 2240, the communication interface 2230, and the memory 2240 are coupled together through a bus system 2220. In addition to a data bus, the bus system 2220 may further include a power bus, a control bus, a status signal bus, and the like. However, for clarity of description, various buses in FIG. 22 are marked as the bus system 2220.

The method disclosed in the foregoing embodiment of this application may be applied to the processor 2210, or may be implemented by the processor 2210. The processor 2210 may be an integrated circuit chip and has a signal processing capability. During implementation, each step of the method may be completed by a hardware integrated logic circuit in the processor 2210 or an instruction in a software form. The processor 2210 may be a general purpose processor, a digital signal processor (digital signal processing, DSP), an ASIC, a field-programmable gate array (field-programmable gate array, FPGA) or other programmable logic devices, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 2240. The processor 2210 reads information in the memory 2240 and completes the steps in the foregoing methods in combination with hardware of the processor.

In a possible implementation, the communication interface 2230 is configured to perform receiving and sending steps that are performed by the first terminal in the embodiment shown in FIG. 5 or FIG. 7. The processor 2210 is configured to perform processing steps that are performed by the first terminal in the embodiment shown in FIG. 5 or FIG. 7.

According to an aspect, a computer-readable storage medium is provided. The computer-readable storage medium stores instructions. When the instructions are run, functions performed by the first terminal in FIG. 5 or FIG. 7 are implemented.

According to an aspect, a computer program product including instructions is provided. The computer program product includes the instructions. When the instructions are run, functions performed by the first terminal in FIG. 5 or FIG. 7 are implemented.

According to an aspect, a chip is provided. The chip is applied to a first terminal. The chip includes at least one processor and a communication interface. The communication interface is coupled to the at least one processor. The processor is configured to run instructions to perform functions performed by the first terminal in FIG. 5 or FIG. 7.

An embodiment of this application provides a communication system. The communication system includes a first terminal and a second terminal. The first terminal is configured to perform a function performed by the first terminal in FIG. 5 or FIG. 7. The second terminal is configured to receive data from the first terminal on a first sidelink resource. The first sidelink resource is located in sidelink discontinuous reception-active time of the second terminal.

Embodiment 1: A communication method, where the method is applied to a first terminal, and the method includes:

the first terminal determines one or more sidelink resources, where the one or more sidelink resources include at least a sidelink resource located in sidelink discontinuous reception-active time of a second terminal; and the first terminal sends data to the second terminal on a first sidelink resource in the one or more sidelink resources, where the first sidelink resource is located in the sidelink discontinuous reception-active time.

Embodiment 2: The method according to Embodiment 1, where a quantity of sidelink resources, located in a first time period, in the one or more sidelink resources is greater than or equal to a first threshold.

A start moment of the first time period is a start moment corresponding to a candidate resource set. An end moment of the first time period is end time of the sidelink discontinuous reception-active time.

Embodiment 3: The method according to Embodiment 1 or Embodiment 2, where the one or more sidelink resources are sidelink resources determined from the candidate resource set, and the start moment corresponding to the candidate resource set is later than or equal to start time of the sidelink discontinuous reception-active time.

Alternatively, the one or more sidelink resources are sidelink resources determined from the candidate resource set, and an end moment corresponding to the candidate resource set is earlier than or equal to retransmission end time of the data.

Embodiment 4: The method according to any one of Embodiment 1 to Embodiment 3, where that the first terminal determines one or more sidelink resources includes: A physical layer of the first terminal determines the one or more sidelink resources from a candidate resource set.

The physical layer reports the one or more sidelink resources to a medium access control entity of the first terminal.

Before the first terminal sends the data to the second terminal on the first sidelink resource in the one or more sidelink resources, the method provided in this embodiment of this application further includes: The medium access control entity selects, from the one or more sidelink resources, the first sidelink resource located in the sidelink discontinuous reception-active time.

Embodiment 5: The method according to Embodiment 4, where the method provided in this embodiment of this application further includes: The medium access control entity sends first information to the physical layer. The first information includes information used to indicate the end time of the sidelink discontinuous reception-active time or information used to indicate remaining time of the sidelink discontinuous reception-active time.

That the physical layer of the first terminal determines the one or more sidelink resources from the candidate resource set includes:

the physical layer determines the one or more sidelink resources from the candidate resource set based on the first information.

Embodiment 6: The method according to Embodiment 5, where that the medium access control entity sends first information to the physical layer includes: When the remaining time of the sidelink discontinuous reception-active time is less than or equal to a remaining packet delay budget, the medium access control entity sends the first information to the physical layer.

Embodiment 7: The method according to Embodiment 5 or Embodiment 6, where the first information further includes information used to indicate the start time of the sidelink discontinuous reception-active time.

Embodiment 8: The method according to Embodiment 7, where when a time unit 1 is earlier than the start time of the sidelink discontinuous reception-active time, the medium access control entity of the first terminal sends, to the physical layer of the first terminal, the information used to indicate the start time of the sidelink discontinuous reception-active time. The time unit 1 is a moment at which the physical layer of the first terminal determines to sense sidelink resources.

Embodiment 9: The method according to any one of Embodiment 4 to Embodiment 8, where the method provided in this embodiment of this application further includes: The first terminal determines the retransmission end time of the data or remaining retransmission time of the data. The first terminal determines, based on the retransmission end time or the remaining retransmission time, the end moment corresponding to the candidate resource set. The end moment corresponding to the candidate resource set is earlier than or equal to the retransmission end time.

Embodiment 10: The method according to Embodiment 9, where the method provided in this embodiment of this application further includes: The medium access control entity sends second information to the physical layer. The second information is used to indicate the retransmission end time of the data or used to indicate the remaining retransmission time of the data.

That the first terminal determines the retransmission end time of the data or remaining retransmission time of the data includes:

the physical layer determines the retransmission end time or the remaining retransmission time based on the second information.

Embodiment 11: The method according to Embodiment 10, where if the remaining packet delay budget is greater than or equal to the remaining retransmission time, the medium access control entity provides one or more of the retransmission end time or the remaining retransmission time for the physical layer, or the medium access control entity provides a minimum value in the remaining packet delay budget and the retransmission end time for the physical layer.

Embodiment 12: The method according to any one of Embodiment 2 to Embodiment 11, where the method provided in this embodiment of this application further includes:

if the quantity of sidelink resources located in the first time period is less than or equal to the first threshold, the first terminal updates a threshold indicating whether the candidate resource set is excluded; and the first terminal determines the one or more sidelink resources from the candidate resource set based on an updated threshold.

Embodiment 13: The method according to any one of Embodiment 1 to Embodiment 12, where a quantity of sidelink resources, located in a second time period, in the one or more sidelink resources is greater than or equal to a second threshold.

The second time period is determined based on an end moment of the sidelink discontinuous reception-active time and the end moment corresponding to the candidate resource set.

Embodiment 14: The method according to any one of Embodiment 1 to Embodiment 13, where the first sidelink resource is a sidelink resource used to transmit the data for the first time. The method further includes:

the first terminal determines a second sidelink resource. The second sidelink resource is a resource used to retransmit the data. The second sidelink resource is located in the sidelink discontinuous reception-active time or a third time period. The third time period is determined based on the first sidelink resource. For example, the first terminal may determine the second sidelink resource from the one or more sidelink resources. In this case, the one or more sidelink resources may further include a sidelink resource in the third time period.

Embodiment 15: The method according to Embodiment 14, where a time interval between the first sidelink resource and the second sidelink resource is greater than or equal to a minimum time interval.

Embodiment 16: The method according to any one of Embodiments 1 to 14, where when a resource pool in which the first sidelink resource and the second sidelink resource are located is configured with a physical sidelink feedback control channel resource, a time interval between the first sidelink resource and the second sidelink resource is greater than or equal to a minimum time interval.

Embodiment 17: The method according to any one of Embodiment 1 to Embodiment 16, where if there is no sidelink resource used to transmit the data for the first time in the sidelink discontinuous reception-active time, the first terminal triggers a sidelink resource selection/reselection process.

Embodiment 18: The method according to Embodiment 17, where if there is no sidelink resource used to retransmit the data in the sidelink discontinuous reception-active time, the first terminal triggers the sidelink resource selection/reselection process.

Embodiment 19: The method according to any one of Embodiments 1 to 13 and Embodiment 17, where if the sidelink resource used to initially transmit the data is not located in the sidelink discontinuous reception-active time, the first sidelink resource is a sidelink resource used to retransmit the data.

Embodiment 20: The method according to any one of Embodiments 1 to 13 and Embodiment 17, where the method further includes:

if the sidelink resource used to initially transmit the data is not located in the sidelink discontinuous reception-active time, the first terminal stops sending the data on the second sidelink resource used to retransmit the data.

Embodiment 21: A communication apparatus, where the apparatus is applied to a first terminal, and the apparatus includes:

a processor, configured to determine one or more sidelink resources, where the one or more sidelink resources include at least a sidelink resource located in sidelink discontinuous reception-active time of a second terminal; and a transceiver, configured to send data to the second terminal on a first sidelink resource in the one or more sidelink resources, where the first sidelink resource is located in the sidelink discontinuous reception-active time.

Embodiment 22: The apparatus according to Embodiment 21, where a quantity of sidelink resources, located in a first time period, in the one or more sidelink resources is greater than or equal to a first threshold.

A start moment of the first time period is a start moment corresponding to a candidate resource set. An end moment of the first time period is end time of the sidelink discontinuous reception-active time.

Embodiment 23: The apparatus according to Embodiment 21 or Embodiment 22, where the one or more sidelink resources are sidelink resources determined from the candidate resource set, and the start moment corresponding to the candidate resource set is later than or equal to start time of the sidelink discontinuous reception-active time.

Alternatively, the one or more sidelink resources are sidelink resources determined from the candidate resource set, and an end moment corresponding to the candidate resource set is earlier than or equal to retransmission end time of the data.

Embodiment 24: The apparatus according to any one of Embodiment 21 to Embodiment 23, where that a processor is configured to determine one or more sidelink resources includes: The processor is configured to determine the one or more sidelink resources from a candidate resource set through a physical layer of the first terminal. The processor is configured to report the one or more sidelink resources to a medium access control entity of the first terminal through the physical layer.

The apparatus provided in this embodiment of this application further includes: the processor, configured to select, from the one or more sidelink resources through the medium access control entity, the first sidelink resource located in the sidelink discontinuous reception-active time.

Embodiment 25: The apparatus according to Embodiment 24, where in this embodiment of this application, the processor is configured to send first information to the physical layer of the first terminal through the medium access control entity of the first terminal. The first information includes information used to indicate the end time of the sidelink discontinuous reception-active time or information used to indicate remaining time of the sidelink discontinuous reception-active time.

That the processor is configured to determine the one or more sidelink resources from a candidate resource set through a physical layer of the first terminal includes: The processor is configured to determine the one or more sidelink resources from the candidate resource set through the physical layer of the first terminal based on the first information.

Embodiment 26: The apparatus according to Embodiment 25, where that the processor is configured to send first information to the physical layer through the medium access control entity includes: When the remaining time of the sidelink discontinuous reception-active time is less than or equal to a remaining packet delay budget, the processor is configured to send the first information to the physical layer through the medium access control entity.

Embodiment 27: The apparatus according to Embodiment 25 or Embodiment 26, where the first information further includes information used to indicate the start time of the sidelink discontinuous reception-active time.

Embodiment 28: The apparatus according to Embodiment 26, where when a time unit 1 is earlier than the start time of the sidelink discontinuous reception-active time, the medium access control entity of the first terminal sends, to the physical layer of the first terminal, the information used to indicate the start time of the sidelink discontinuous reception-active time. The time unit 1 is a moment at which the physical layer of the first terminal determines to sense sidelink resources.

Embodiment 29: The apparatus according to any one of Embodiment 24 to Embodiment 28, where the processor is further configured to determine the retransmission end time of the data or remaining retransmission time of the data. The processor is further configured to determine, based on the retransmission end time or the remaining retransmission time, the end moment corresponding to the candidate resource set. The end moment corresponding to the candidate resource set is earlier than or equal to the retransmission end time.

Embodiment 30: The apparatus according to Embodiment 29, where the processor is further configured to send second information to the physical layer through the medium access control entity. The second information is used to indicate the retransmission end time of the data or used to indicate the remaining retransmission time of the data.

That the processor is configured to determine the retransmission end time of the data or remaining retransmission time of the data includes:

the processor is configured to determine the retransmission end time or the remaining retransmission time through the physical layer based on the second information.

Embodiment 31: The apparatus according to Embodiment 30, where if the remaining packet delay budget is greater than or equal to the remaining retransmission time, the processor is configured to provide one or more of the retransmission end time or the remaining retransmission time for the physical layer through the medium access control entity, or the processor is configured to provide a minimum value in the remaining packet delay budget and the retransmission end time for the physical layer through the medium access control entity.

Embodiment 32: The apparatus according to any one of Embodiment 22 to Embodiment 31, where if the quantity of sidelink resources located in the first time period is less than or equal to the first threshold, the processor is further configured to update a threshold indicating whether the candidate resource set is excluded.

The processor is further configured to determine the one or more sidelink resources from the candidate resource set based on an updated threshold.

Embodiment 33: The apparatus according to any one of Embodiment 21 to Embodiment 32, where a quantity of sidelink resources, located in a second time period, in the one or more sidelink resources is greater than or equal to a second threshold.

The second time period is determined based on an end moment of the sidelink discontinuous reception-active time and the end moment corresponding to the candidate resource set.

Embodiment 34: The apparatus according to any one of Embodiment 21 to Embodiment 33, where the first sidelink resource is a sidelink resource used to initially transmit the data. The processor is further configured to determine a second sidelink resource. The second sidelink resource is a resource used to retransmit the data. The second sidelink resource is located in the sidelink discontinuous reception-active time or a third time period. The third time period is determined based on the first sidelink resource. For example, the first terminal may determine the second sidelink resource from the one or more sidelink resources. In this case, the one or more sidelink resources may further include a sidelink resource in the third time period.

Embodiment 35: The apparatus according to Embodiment 34, where a time interval between the first sidelink resource and the second sidelink resource is greater than or equal to a minimum time interval.

Embodiment 36: The apparatus according to any one of Embodiment 21 to embodiment 35, where when a resource pool in which the first sidelink resource and the second sidelink resource are located is configured with a physical sidelink feedback control channel resource, a time interval between the first sidelink resource and the second sidelink resource is greater than or equal to a minimum time interval.

Embodiment 37: The apparatus according to any one of Embodiment 21 to Embodiment 36, where if there is no sidelink resource used to transmit the data for the first time in the sidelink discontinuous reception-active time, the transceiver triggers a sidelink resource selection/reselection process.

Embodiment 38: The apparatus according to Embodiment 37, where if there is no sidelink resource used to retransmit the data in the sidelink discontinuous reception-active time, the processor triggers the sidelink resource selection/reselection process.

Embodiment 39: The apparatus according to any one of Embodiments 21 to 33 and Embodiment 38, where if the sidelink resource used to initially transmit the data is not located in the sidelink discontinuous reception-active time, the first sidelink resource is a sidelink resource used to retransmit the data.

Embodiment 40: The apparatus according to any one of Embodiments 21 to 33 and Embodiment 38, where if the sidelink resource used to initially transmit the data is not located in the sidelink discontinuous reception-active time, the processor stops sending, through the transceiver, the data on the second sidelink resource used to retransmit the data.

Embodiment 41: A communication method, where the method includes:

a first terminal determines a first sidelink resource used to initially transmit data; and if the first terminal determines that the first sidelink resource is not located in SL DRX-active time of a second terminal, the first terminal stops sending the data to the second terminal on a second sidelink resource used to retransmit the data.

A first grant is an initial transmission grant. A sidelink resource indicated by the initial transmission grant is used to initially transmit the data. A second grant is a retransmission grant. A sidelink resource indicated by the second grant is used to retransmit the data. The second grant corresponding to the first grant is a grant used to transmit same data that is carried on the initial transmission grant.

Embodiment 42: The method according to Embodiment 41, where that the first terminal determines a first sidelink resource used to initially transmit data may include: The first terminal determines the first grant used to initially transmit the data. The first terminal determines the sidelink resource indicated by the first grant as the first sidelink resource used to initially transmit the data.

Embodiment 43: The method according to Embodiment 41 or Embodiment 42, where the first terminal determines the second sidelink resource.

Embodiment 44: The method according to Embodiment 43, where that the first terminal determines the second sidelink resource includes: The first terminal determines the second grant corresponding to the first grant. The first terminal determines the sidelink resource indicated by the second grant as the second sidelink resource.

Embodiment 45: The method according to any one of Embodiment 41 to Embodiment 44, where that the first terminal stops sending the data to the second terminal on a second sidelink resource used to retransmit the data includes: If the second sidelink resource is not located in the DRX-active time of the second terminal, the first terminal stops sending the data to the second terminal on the sidelink resource indicated by the second grant corresponding to the first grant.

Embodiment 46: The method according to any one of Embodiment 41 to Embodiment 45, where the method provided in this embodiment of this application may further include: If the first terminal determines that the second sidelink resource is located in the DRX-active time of the second terminal, the first terminal sends the data to the second terminal on the second sidelink resource used to retransmit the data.

Embodiment 47: The method according to any one of Embodiment 41 to Embodiment 46, where the second terminal is any one of a plurality of terminals that need to receive the data sent by the first terminal, or the second terminal is a terminal with a highest priority in a plurality of terminals that need to receive the data sent by the first terminal.

Embodiment 48: A communication method, where the method includes: A first terminal determines a first sidelink resource used to initially transmit data. If the first terminal determines that the first sidelink resource is not located in sidelink DRX-active time of a second terminal, the first terminal sends the data to the second terminal on a second sidelink resource used to retransmit the data.

If the first terminal determines that the first sidelink resource is not located in the SL DRX-active time of the second terminal, the first terminal sends the data to the second terminal on a sidelink resource indicated by a second grant corresponding to a first grant.

The first grant is an initial transmission grant. A sidelink resource indicated by the initial transmission grant is used to initially transmit the data. The second grant is a retransmission grant. The sidelink resource indicated by the second grant is used to retransmit the data. The second grant corresponding to the first grant is a grant used to transmit same data that is carried on the initial transmission grant.

Embodiment 49: The method according to Embodiment 48, where that the first terminal determines a first sidelink resource used to initially transmit data may include: The first terminal determines the first grant used to initially transmit the data. The first terminal determines the sidelink resource indicated by the first grant as the first sidelink resource used to initially transmit the data.

Embodiment 50: The method according to Embodiment 48 or Embodiment 49, where the method provided in this embodiment of this application may further include: The first terminal determines the second sidelink resource.

Embodiment 51: The method according to Embodiment 50, where that the first terminal determines the second sidelink resource includes: The first terminal determines the second grant corresponding to the first grant. The first terminal determines the sidelink resource indicated by the second grant as the second sidelink resource.

Embodiment 52: The method according to Embodiment 48 to Embodiment 51, where that the first terminal sends the data to the second terminal on a second sidelink resource used to retransmit the data includes: If the second sidelink resource is located in the DRX-active time of the second terminal, the first terminal sends the data to the second terminal on the second sidelink resource.

Embodiment 53: The method according to Embodiment 48 to Embodiment 52, where the second terminal is any one of a plurality of terminals that need to receive the data sent by the first terminal, or the second terminal is a terminal with a highest priority in a plurality of terminals that need to receive the data sent by the first terminal.

Embodiment 54: A communication apparatus, where the apparatus is a first terminal or a chip applied to the first terminal, and the apparatus includes:

a processor, configured to determine a first sidelink resource used to initially transmit data; and a transceiver, configured to, if the first terminal determines that the first sidelink resource is not located in SL DRX-active time of a second terminal, stop sending the data to the second terminal on a second sidelink resource used to retransmit the data.

A first grant is an initial transmission grant. A sidelink resource indicated by the initial transmission grant is used to initially transmit the data. A second grant is a retransmission grant. A sidelink resource indicated by the second grant is used to retransmit the data. The second grant corresponding to the first grant is a grant used to transmit same data that is carried on the initial transmission grant.

Embodiment 55: The apparatus according to Embodiment 54, where that the first terminal determines a first sidelink resource used to initially transmit data may include: The first terminal determines the first grant used to initially transmit the data. The first terminal determines the sidelink resource indicated by the first grant as the first sidelink resource used to initially transmit the data.

Embodiment 56: The apparatus according to Embodiment 54 or Embodiment 55, where the first terminal determines the second sidelink resource.

Embodiment 57: The apparatus according to Embodiment 56, where that the first terminal determines the second sidelink resource includes: The first terminal determines the second grant corresponding to the first grant. The first terminal determines the sidelink resource indicated by the second grant as the second sidelink resource.

Embodiment 58: The apparatus according to any one of Embodiment 54 to Embodiment 47, where that a transceiver is configured to stop sending the data to the second terminal on a second sidelink resource used to retransmit the data includes: If the second sidelink resource is not located in the DRX-active time of the second terminal, the transceiver stops sending the data to the second terminal on the sidelink resource indicated by the second grant corresponding to the first grant.

Embodiment 59: The apparatus according to any one of Embodiment 54 to Embodiment 58, where if the processor determines that the second sidelink resource is located in the DRX-active time of the second terminal, the transceiver is configured to send the data to the second terminal on the second sidelink resource used to retransmit the data.

Embodiment 60: The method according to any one of Embodiment 54 to Embodiment 59, where the second terminal is any one of a plurality of terminals that need to receive the data sent by the first terminal, or the second terminal is a terminal with a highest priority in a plurality of terminals that need to receive the data sent by the first terminal.

Embodiment 61: A communication apparatus, where the apparatus includes: a processor, configured to determine a first sidelink resource used to initially transmit data; and a transceiver, configured to, if the processor determines that the first sidelink resource is not located in sidelink DRX-active time of a second terminal, send the data to the second terminal on a second sidelink resource used to retransmit the data.

A first grant is an initial transmission grant. A sidelink resource indicated by the initial transmission grant is used to initially transmit the data. A second grant is a retransmission grant. A sidelink resource indicated by the second grant is used to retransmit the data. The second grant corresponding to the first grant is a grant used to transmit same data that is carried on the initial transmission grant.

Embodiment 62: The apparatus according to Embodiment 61, where that the first terminal determines a first sidelink resource used to initially transmit data may include: The first terminal determines the first grant used to initially transmit the data. The first terminal determines the sidelink resource indicated by the first grant as the first sidelink resource used to initially transmit the data.

Embodiment 63: The apparatus according to Embodiment 61 or Embodiment 62, where the processor is further configured to determine the second sidelink resource.

Embodiment 64: The apparatus according to Embodiment 63, where that the processor is further configured to determine the second sidelink resource includes: The processor is further configured to determine the second grant corresponding to the first grant. The processor is further configured to determine the sidelink resource indicated by the second grant as the second sidelink resource.

Embodiment 65: The apparatus according to Embodiment 61 to Embodiment 64, where that a transceiver is configured to send the data to the second terminal on a second sidelink resource used to retransmit the data includes: If the processor determines that the second sidelink resource is located in the DRX-active time of the second terminal, the transceiver is configured to send the data to the second terminal on the second sidelink resource.

Embodiment 66: The apparatus according to Embodiment 61 to Embodiment 65, where the second terminal is any one of a plurality of terminals that need to receive the data sent by the first terminal, or the second terminal is a terminal with a highest priority in a plurality of terminals that need to receive the data sent by the first terminal.

Embodiment 67: A computer-readable storage medium, where the readable storage medium stores instructions, and when the instructions are executed, the method according to any one of Embodiment 1 to Embodiment 20 is implemented.

Embodiment 68: A computer-readable storage medium, where the readable storage medium stores instructions, and when the instructions are executed, the method according to any one of Embodiment 41 to Embodiment 47 is implemented.

Embodiment 69: A computer-readable storage medium, where the readable storage medium stores instructions, and when the instructions are executed, the method according to any one of Embodiment 48 to Embodiment 53 is implemented.

Embodiment 70: A chip, where the chip includes a processor, the processor is coupled to a communication interface, the processor is configured to run a computer program or instructions to implement the method according to any one of Embodiment 1 to Embodiment 20, and the communication interface is configured to communicate with another module other than the chip.

Embodiment 71: A chip, where the chip includes a processor, the processor is coupled to a communication interface, the processor is configured to run a computer program or instructions to implement the method according to any one of Embodiment 41 to Embodiment 47, and the communication interface is configured to communicate with another module other than the chip.

Embodiment 72: A chip, where the chip includes a processor, the processor is coupled to a communication interface, the processor is configured to run a computer program or instructions to implement the method according to any one of Embodiment 48 to Embodiment 53, and the communication interface is configured to communicate with another module other than the chip.

Embodiment 73: A terminal, including at least one processor, where the at least one processor is coupled to a memory, and the at least one processor is configured to run instructions stored in the memory to implement the method according to any one of Embodiment 1 to Embodiment 20.

Embodiment 74: A terminal, including at least one processor, where the at least one processor is coupled to a memory, and the at least one processor is configured to run instructions stored in the memory to implement the method according to any one of Embodiment 41 to Embodiment 47.

Embodiment 75: A terminal, including at least one processor, where the at least one processor is coupled to a memory, and the at least one processor is configured to run instructions stored in the memory to implement the method according to any one of Embodiment 48 to Embodiment 53.

What is claimed is:

1. A method, applied to a first terminal, the method comprising:

sending, by a medium access control entity of the first terminal, first information to a physical layer of the first terminal, wherein the first information indicates a sidelink discontinuous reception-active time of a second terminal;

sending, by the medium access control entity, second information to the physical layer, wherein the second information indicates a retransmission end time of data or indicates a remaining retransmission time of the data;

determining, by the physical layer of the first terminal based on the first information and the second information, one or more sidelink resources, wherein the one or more sidelink resources comprise a first sidelink resource located in the sidelink discontinuous reception-active time of the second terminal; and sending the data to the second terminal on the first sidelink resource in the one or more sidelink resources.

2. The method according to claim 1, wherein determining the one or more sidelink resources comprises:

determining, by the physical layer of the first terminal, the one or more sidelink resources from a candidate resource set; and reporting, by the physical layer, the one or more sidelink resources to the medium access control entity of the first terminal; and wherein the method further comprises:

selecting, by the medium access control entity from the one or more sidelink resources, the first sidelink resource located in the sidelink discontinuous reception-active time.

3. The method according to claim 1, further comprising:

selecting, from the one or more sidelink resources, a second sidelink resource within a first time, wherein the first time comprises the sidelink discontinuous reception-active time and a running time of a sidelink retransmission timer assumed according to the first sidelink resource; and sending data to the second terminal on the second sidelink resource.

4. The method according to claim 1, wherein sending, by the medium access control entity, the first information to the physical layer comprises:

when the remaining time of the sidelink discontinuous reception-active time is less than or equal to a remaining packet delay budget, sending, by the medium access control entity, the first information to the physical layer.

5. The method according to claim 3, wherein the first information further comprises information indicating a start time of the sidelink discontinuous reception-active time.

6. The method according to claim 5, wherein when a time unit 1 is earlier than the start time of the sidelink discontinuous reception-active time, the medium access control entity of the first terminal sends, to the physical layer of the first terminal, the first information indicating the start time of the sidelink discontinuous reception-active time, wherein the time unit 1 is a moment at which the physical layer of the first terminal determines to sense sidelink resources.

7. The method according to claim 2, further comprising:

determining the retransmission end time of the data or the remaining retransmission time of the data; and determining, based on the retransmission end time or the remaining retransmission time, an end moment corresponding to the candidate resource set, wherein the end moment corresponding to the candidate resource set is earlier than or equal to the retransmission end time.

8. The method according to claim 7, wherein determining the retransmission end time of the data or the remaining retransmission time of the data comprises:

determining, by the physical layer, the retransmission end time or the remaining retransmission time based on the second information.

9. The method according to claim 8, wherein when a remaining packet delay budget is greater than or equal to the remaining retransmission time, the medium access control entity provides one or more of the retransmission end time or the remaining retransmission time for the physical layer, or the medium access control entity provides a minimum value in the remaining packet delay budget and the retransmission end time for the physical layer.

10. The method according to claim 1, wherein a quantity of sidelink resources, located in a second time period in the one or more sidelink resources, is greater than or equal to a second threshold; and wherein the second time period is determined based on an end moment of the sidelink discontinuous reception-active time and the end moment corresponding to a candidate resource set.

11. The method according to claim 10, wherein the first sidelink resource is a sidelink resource used to initially transmit the data, and the method further comprises:

determining, by the first terminal, a second sidelink resource used to retransmit the data, wherein the second sidelink resource is located in the sidelink discontinuous reception-active time or a third time period, and the third time period is determined based on the first sidelink resource.

12. The method according to claim 11, wherein:

a time interval between the first sidelink resource and the second sidelink resource is greater than or equal to a minimum time interval; or when a resource pool in which the first sidelink resource and the second sidelink resource are located is configured with a physical sidelink feedback control channel resource, a time interval between the first sidelink resource and the second sidelink resource is greater than or equal to a minimum time interval.

13. The method according to claim 10, wherein when there is no sidelink resource used to transmit the data for a first time, or no sidelink resource used to retransmit the data in the sidelink discontinuous reception-active time, the first terminal triggers a sidelink resource selection/reselection process.

14. The method according to claim 10, wherein when the sidelink resource used to initially transmit the data is not located in the sidelink discontinuous reception-active time, the first sidelink resource is a sidelink resource used to retransmit the data; and wherein the method further comprises:

when the sidelink resource used to initially transmit the data is not located in the sidelink discontinuous reception-active time, stopping, by the first terminal, sending the data on a second sidelink resource used to retransmit the data.

15. A terminal, comprising:

at least one processor, wherein the at least one processor is coupled to a memory, and the at least one processor is configured to run instructions stored in the memory to perform the following:

sending, by a medium access control entity of the terminal, first information to a physical layer of the terminal, wherein the first information indicates a sidelink discontinuous reception-active time of a second terminal;

sending, by the medium access control entity, second information to the physical layer, wherein the second information indicates a retransmission end time of data or indicates a remaining retransmission time of the data;

determining, by the physical layer based on the first information and the second information, one or more sidelink resources, wherein the one or more sidelink resources comprise a first sidelink resource located in the sidelink discontinuous reception-active time of the second terminal; and sending the data to the second terminal on the first sidelink resource in the one or more sidelink resources.

16. The terminal according to claim 15, wherein determining the one or more sidelink resources comprises:

determining, by the physical layer of the terminal based on the first information and the second information, the one or more sidelink resources from a candidate resource set; and reporting, by the physical layer, the one or more sidelink resources to the medium access control entity of the terminal; and wherein the at least one processor is configured to run instructions stored in the memory to perform the following:

selecting, by the medium access control entity from the one or more sidelink resources, the first sidelink resource located in the sidelink discontinuous reception-active time.

17. The terminal according to claim 15, wherein the at least one processor is configured to run instructions stored in the memory to perform the following:

selecting, from the one or more sidelink resources, a second sidelink resource within a first time, wherein the first time comprises the sidelink discontinuous reception-active time and a running time of a sidelink retransmission timer assumed according to the first sidelink resource; and sending data to the second terminal on the second sidelink resource.

18. A non-transitory computer-readable storage medium, wherein at least one processor is coupled to a memory, and the at least one processor is configured to run instructions stored in the memory to perform the following:

sending, by a medium access control entity of a first terminal, first information to a physical layer of the first terminal, wherein the first information indicates a sidelink discontinuous reception-active time of a second terminal;

sending, by the medium access control entity, second information to the physical layer, wherein the second information indicates a retransmission end time of data or indicates a remaining retransmission time of the data;

determining, by the physical layer of the first terminal, one or more sidelink resources, wherein the one or more sidelink resources comprise a first sidelink resource located in the sidelink discontinuous reception-active time of the second terminal; and sending the data to the second terminal on the first sidelink resource in the one or more sidelink resources.

19. The non-transitory computer-readable storage medium according to claim 18, wherein the at least one processor is configured to run the instructions stored in the memory to further perform the following:

selecting, from the one or more sidelink resources, a second sidelink resource within a first time, wherein the first time comprises the sidelink discontinuous reception-active time and a running time of a sidelink retransmission timer assumed according to the first sidelink resource; and sending data to the second terminal on the second sidelink resource.

20. The non-transitory computer-readable storage medium according to claim 18, wherein sending, by the medium access control entity, the first information to the physical layer comprises:

when the remaining time of the sidelink discontinuous reception-active time is less than or equal to a remaining packet delay budget, sending, by the medium access control entity, the first information to the physical layer.

* * * * *